(12) United States Patent
Cheng et al.

(10) Patent No.: US 12,111,484 B2
(45) Date of Patent: Oct. 8, 2024

(54) IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Chih-Wei Cheng, Taichung (TW); Yu-Chen Lai, Taichung (TW); Ming-Ta Chou, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 641 days.

(21) Appl. No.: 17/412,433

(22) Filed: Aug. 26, 2021

(65) Prior Publication Data
US 2022/0221623 A1 Jul. 14, 2022

(30) Foreign Application Priority Data
Jan. 13, 2021 (TW) .................................. 110101327

(51) Int. Cl.
*G02B 5/00* (2006.01)
*G02B 13/00* (2006.01)

(52) U.S. Cl.
CPC ......... *G02B 5/003* (2013.01); *G02B 13/0045* (2013.01)

(58) Field of Classification Search
None
See application file for complete search history.

(56) References Cited

U.S. PATENT DOCUMENTS

| | | |
|---|---|---|
| 7,502,183 B2 | 3/2009 | Jao et al. |
| 7,982,979 B2 | 7/2011 | Wu |
| 8,070,304 B2 | 12/2011 | Matsuoka |
| 8,292,524 B1 | 10/2012 | Yu |
| 8,320,059 B2 | 11/2012 | Lin |
| 8,967,814 B2 | 3/2015 | Chang |
| 9,016,876 B2 | 4/2015 | Lai |
| 9,442,268 B2 | 9/2016 | Chang |

(Continued)

FOREIGN PATENT DOCUMENTS

| | | |
|---|---|---|
| CN | 205643818 U | 10/2016 |
| CN | 206601517 U | 10/2017 |

(Continued)

*Primary Examiner* — Bao-Luan Q Le
*Assistant Examiner* — Danell L Owens
(74) *Attorney, Agent, or Firm* — McClure, Qualey & Rodack, LLP

(57) ABSTRACT

An imaging lens assembly has an optical axis, and includes a plurality of optical elements. The optical elements include a light blocking sheet, and the light blocking sheet includes a through hole surface, a first surface, a second surface, a peripheral surface and a plurality of basin structures. The through hole surface surrounds the optical axis. The first surface and the second surface are connected to and surround the through hole surface. The peripheral surface is connected to the first surface and the second surface, and the peripheral surface is farther from the optical axis than the through hole surface from the optical axis. The basin structures are arranged in interval and around the optical axis, each of the basin structures is caved in from the first surface to the second surface, and each of the basin structures protrudes on the second surface.

25 Claims, 47 Drawing Sheets

(56) References Cited

U.S. PATENT DOCUMENTS

| | | | |
|---|---|---|---|
| 9,678,336 B2 | 6/2017 | Cho et al. | |
| 10,021,283 B2 | 7/2018 | Dobashi | |
| 2015/0234145 A1* | 8/2015 | Chang | G02B 7/022 |
| | | | 359/811 |
| 2020/0301092 A1* | 9/2020 | Shirotori | H04N 23/55 |

FOREIGN PATENT DOCUMENTS

| | | |
|---|---|---|
| CN | 207352246 U | 5/2018 |
| CN | 207528993 U | 6/2018 |
| CN | 211014775 U | 7/2020 |
| CN | 211528886 U | 9/2020 |

\* cited by examiner

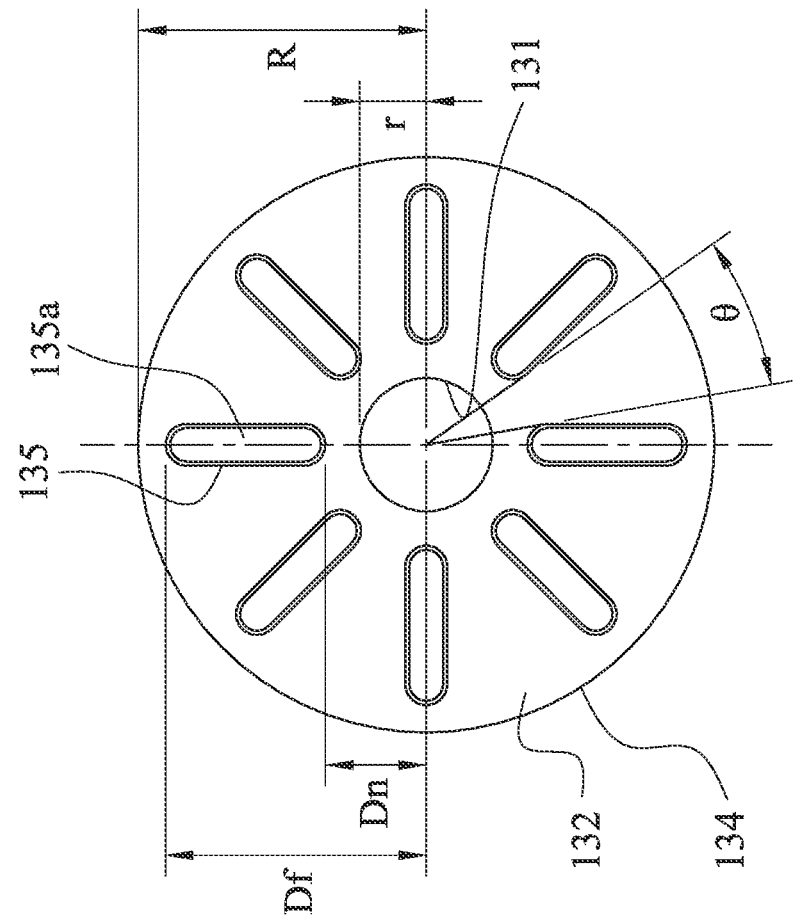

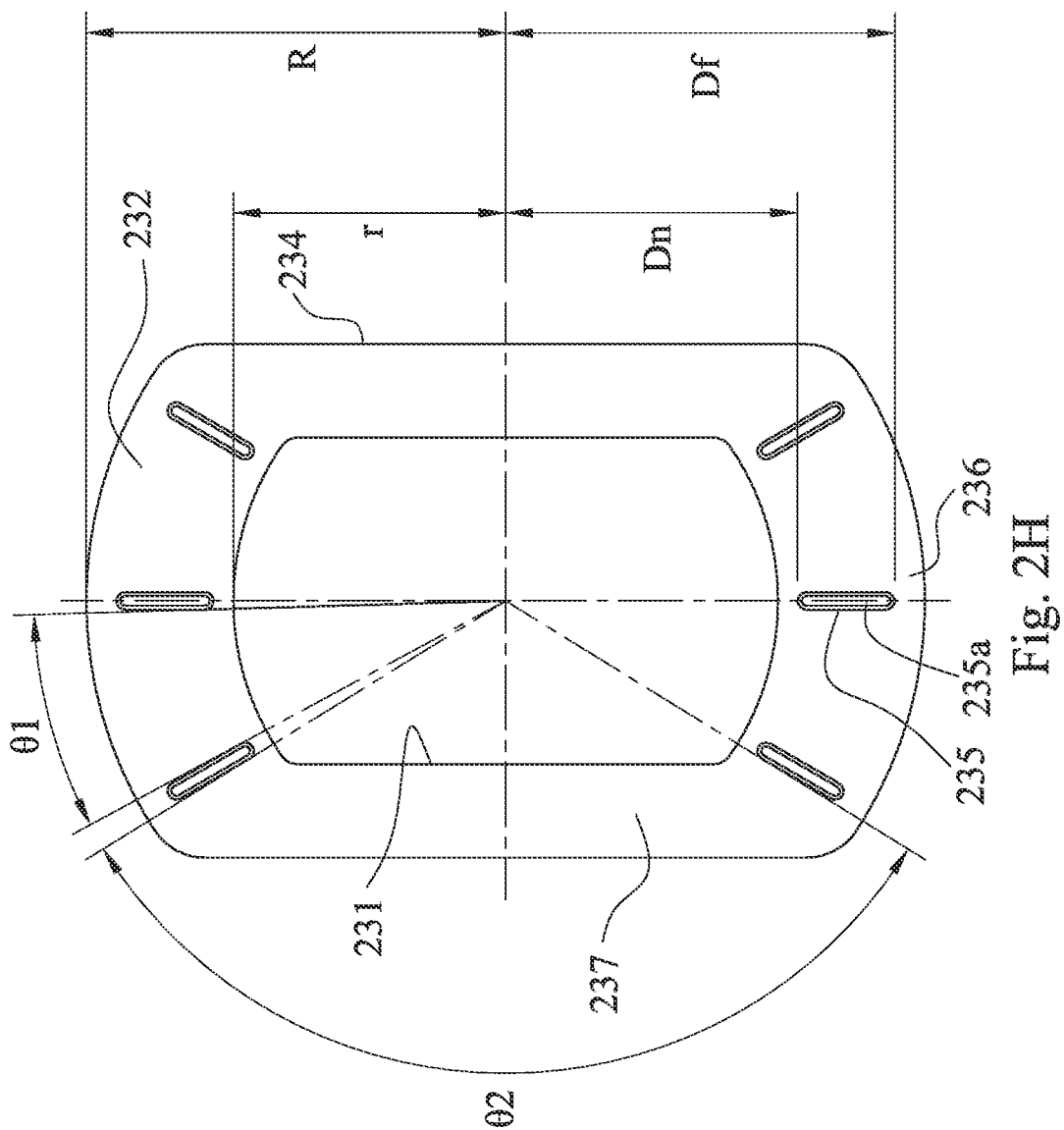

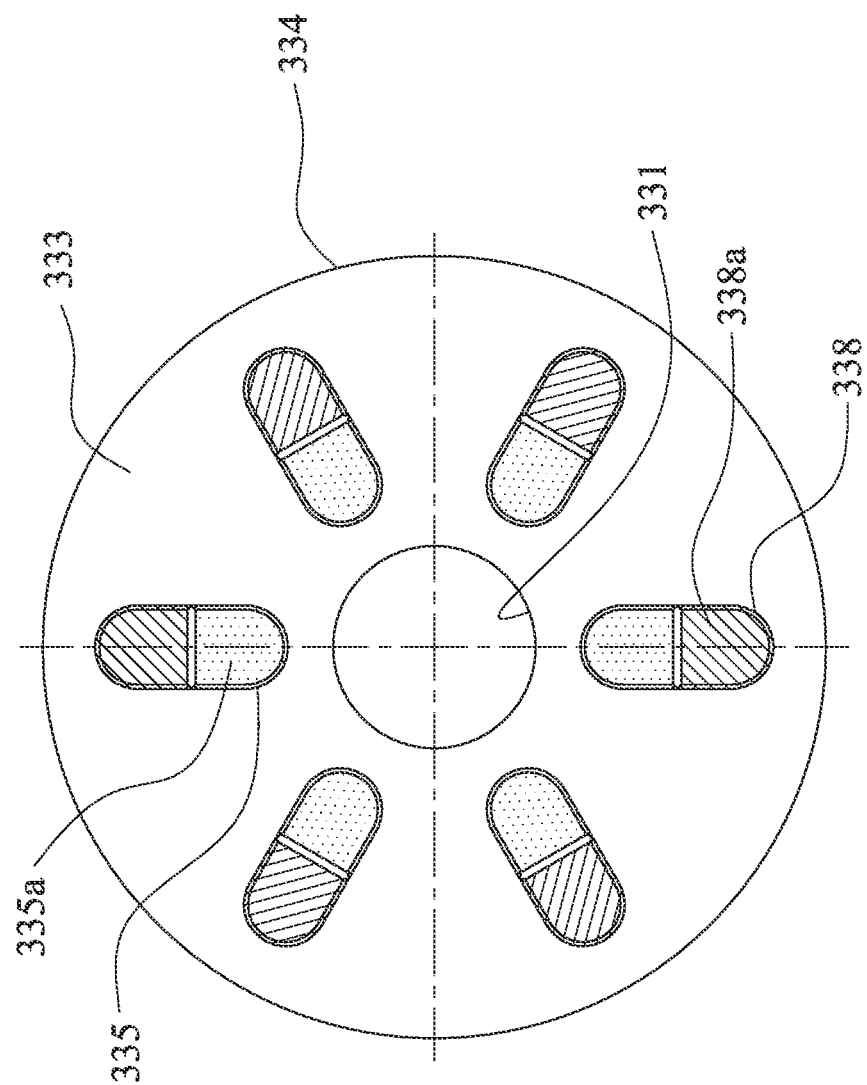

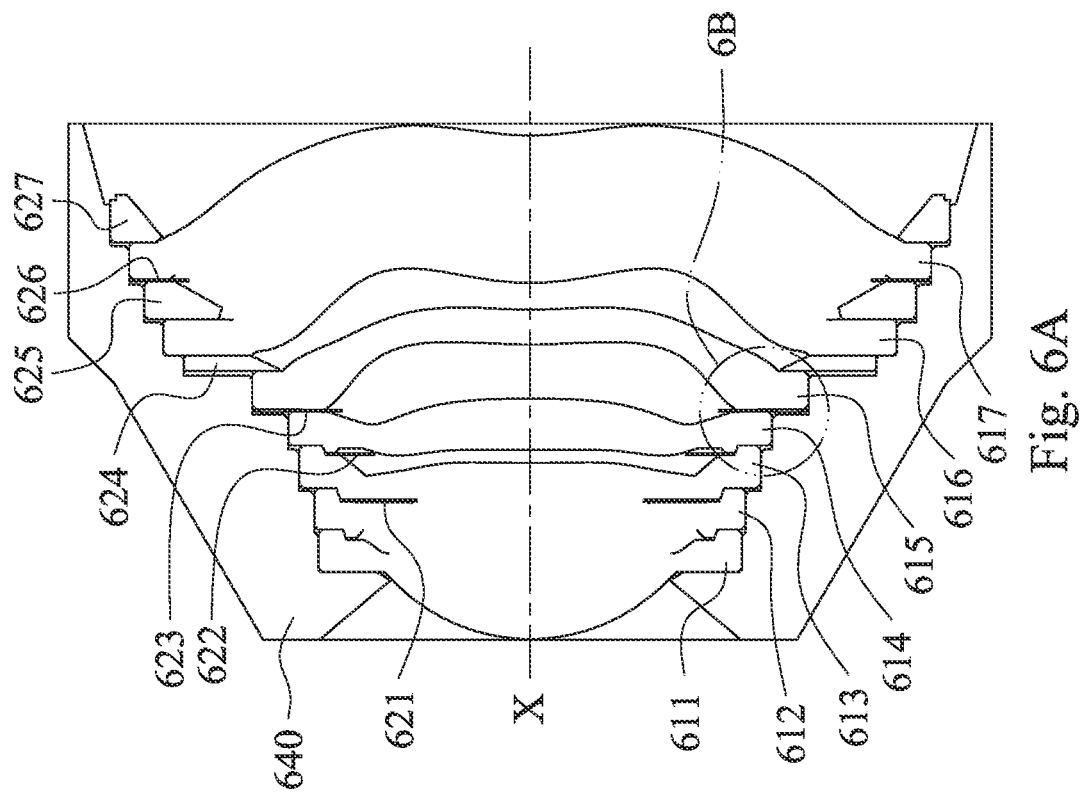

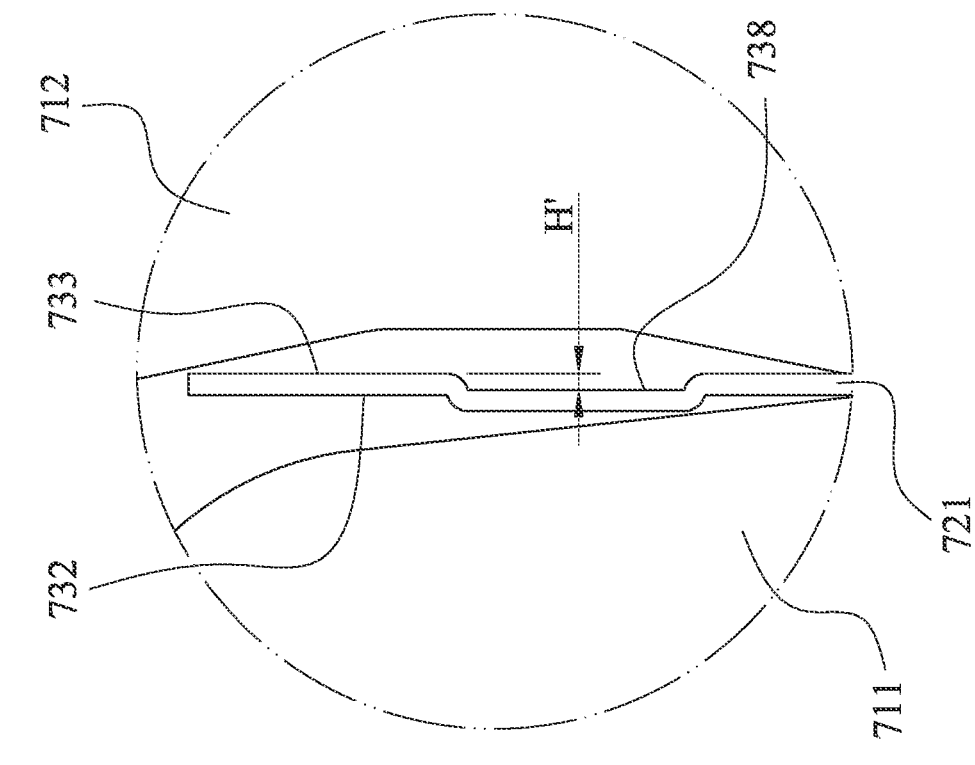
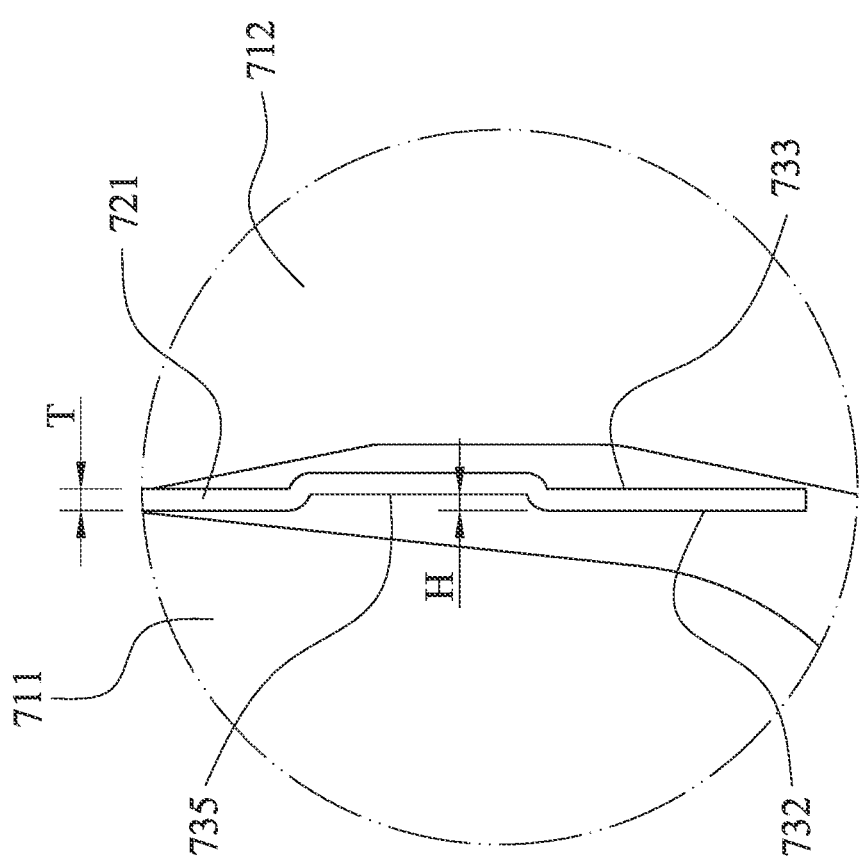
Fig. 7C
Fig. 7B ial number 110101327, filed Jan. 13, 2021, which is
IMAGING LENS ASSEMBLY, IMAGE CAPTURING APPARATUS AND ELECTRONIC DEVICE

RELATED APPLICATIONS

This application claims priority to Taiwan Application Serial Number 110101327, filed Jan. 13, 2021, which is herein incorporated by reference.

BACKGROUND

Technical Field

The present disclosure relates to an imaging lens assembly and an image capturing apparatus. More particularly, the present disclosure relates to an imaging lens assembly and an image capturing apparatus applicable to portable electronic devices.

Description of Related Art

In recent years, portable electronic devices have developed rapidly. For example, intelligent electronic devices and tablets have been filled in the lives of modern people, and image capturing apparatuses and imaging lens assemblies thereof mounted on portable electronic devices have also prospered. However, as technology advances, the quality requirements of the imaging lens assemblies are becoming higher and higher. Therefore, an imaging lens assembly, which can resist the foreign factors and maintain the imaging quality, needs to be developed.

SUMMARY

According to one aspect of the present disclosure, an imaging lens assembly has an optical axis, and includes a plurality of optical elements. The optical elements are arranged along the optical axis, wherein the optical elements include a light blocking sheet, and the light blocking sheet includes a through hole surface, a first surface, a second surface, a peripheral surface and a plurality of basin structures. The through hole surface surrounds the optical axis. The first surface is connected to and surrounds the through hole surface. The second surface is connected to and surrounds the through hole surface, and the first surface and the second surface are relatively disposed. The peripheral surface is connected to the first surface and the second surface, and the peripheral surface is farther from the optical axis than the through hole surface from the optical axis. The basin structures are arranged in interval and around the optical axis, each of the basin structures is caved in from the first surface to the second surface, and each of the basin structures protrudes on the second surface. When on a direction passing through each of the basin structures and vertical to the optical axis, a nearest distance between each of the basin structures and the optical axis is Dn, a farthest distance between each of the basin structures and the optical axis is Df, a distance between the through hole surface and the optical axis is r, and a distance between the peripheral surface and the optical axis is R, the following condition is satisfied: $0.2 \leq (Df-Dn)/(R-r) \leq 0.98$.

According to one aspect of the present disclosure, an image capturing apparatus includes the imaging lens assembly of the aforementioned aspect.

According to one aspect of the present disclosure, an electronic device includes the image capturing apparatus of the aforementioned aspect and an image sensor, wherein the image sensor is corresponding to the image capturing apparatus, and the image sensor is disposed on an image surface of the imaging lens assembly.

BRIEF DESCRIPTION OF THE DRAWINGS

FIG. 1G is a schematic view of parameters of the light blocking sheet according to the 1st example in FIG. 1A.

FIG. 2H is a schematic view of parameters of the light blocking sheet according to the 2nd example in FIG. 2A.

FIG. 3C is a schematic view of the light blocking sheet according to the 3rd example in FIG. 3A.

FIG. 6A is a schematic view of an imaging lens assembly according to the 6th example of the present disclosure.

FIG. 7B is a partial enlarged view of the imaging lens assembly according to the 7th example in FIG. 7A.

FIG. 7C is another partial enlarged view of the imaging lens assembly according to the 7th example in FIG. 7A.

DETAILED DESCRIPTION

Figure 1A:
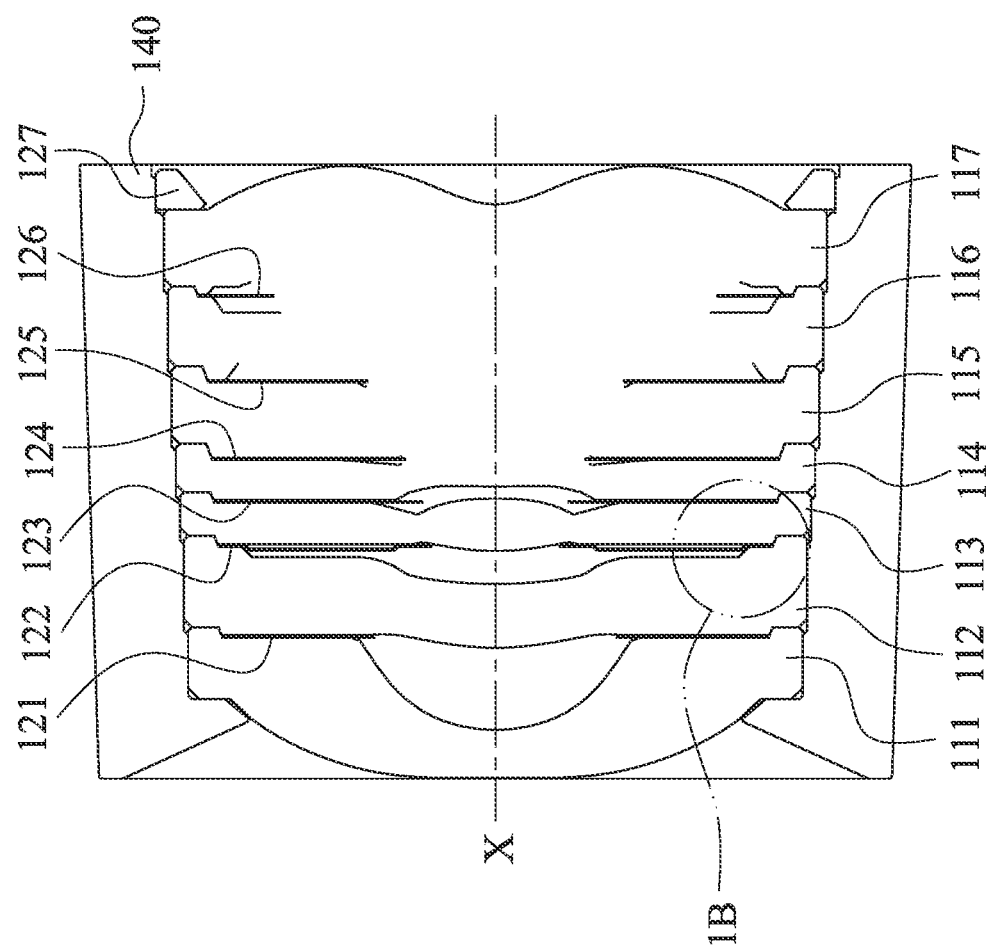
FIG. 1A is a schematic view of an imaging lens assembly according to the 1st example of the present disclosure.

The present disclosure provides an imaging lens assembly, and the imaging lens assembly has an optical axis and includes a plurality of optical elements. The optical elements are arranged along the optical axis, wherein the optical elements include a light blocking sheet, and the light blocking sheet includes a through hole surface, a first surface, a second surface, a peripheral surface and a plurality of basin structures. The through hole surface surrounds the optical axis to form a through hole. The first surface is connected to and surrounds the through hole surface. The second surface is connected to and surrounds the through hole surface, and the first surface and the second surface are relatively disposed. The peripheral surface is connected to the first surface and the second surface, and the peripheral surface is farther from the optical axis than the through hole surface from the optical axis. The basin structures are arranged in interval and around the optical axis, each of the basin structures are caved in from the first surface to the second surface, and each of the basin structures protrudes on the second surface. When on a direction passing through each of the basin structures and vertical to the optical axis, a nearest distance between each of the basin structures and the optical axis is Dn, a farthest distance between each of the basin structures and the optical axis is Df, a distance between the through hole surface and the optical axis is r, and a distance between the peripheral surface and the optical axis is R, the following condition is satisfied: $0.2 \leq (Df-Dn)/(R-r) \leq 0.98$.

In detail, the light blocking sheet can be manufactured via the stamping process. The residual stress is possibly acted on the light blocking sheet after the stamping process, and the light blocking sheet may be deformed by the residual stress. The imaging quality would be influenced by the deformation of the light blocking sheet. Especially, when the through hole of the light blocking sheet is deformed or shifted, the occurrence of unexpected stray light may take place. Hence, the resistant to the deformation along the optical axis of the light blocking sheet can be provided by the basin structures of the light blocking sheet, and the deformation and the displacement of the through hole can be reduced. Therefore, the imaging quality can be maintained, the imaging quality is hardly changed over time, and the foreign factors, which influence the light blocking sheet, can be further resisted. In particular, the foreign factors are the impact caused by falling, the temperature variation, the humidity variation or the high temperature and high humidity environment, but the present disclosure is not limited thereto.

Furthermore, each of the basin structures at a radiation direction away from the optical axis has a certain proportion length, and the resistance to the deformation of the light blocking sheet along the optical axis can be provided to reduce the deformation and the displacement of the through hole.

The through hole is formed by the through hole surface surrounding the optical axis, and the through hole can be an aperture stop of the imaging lens assembly. Therefore, the non-imaging light can be blocked, and a clear aperture can be adjusted.

Each of the basin structures can extend and gradually expand towards a direction away from the optical axis. Therefore, the residual stress during the process can be further dispersed.

The first surface of the light blocking sheet can face towards one of an object side and an image side of the imaging lens assembly. In particular, the second surface of the light blocking sheet is relatively disposed on the other one of the object side and the image side of the imaging lens assembly.

The light blocking sheet can further include a plurality of reverse basin structures arranged in interval and around the optical axis, each of the reverse basin structures is caved in from the second surface to the first surface, and each of the reverse basin structures protrudes on the first surface to form a convex surface. The displacement of the through hole along the optical axis can be further resisted by the cooperation between the basin structures and the reverse basin structures.

The basin structures and the reverse basin structures can be arranged in interval on a circumferential direction centered on the optical axis. Or, the reverse basin structures can be farther from the optical axis than the basin structures from the optical axis. Therefore, the foreign factors, which influence the light blocking sheet, can be further resisted.

The light blocking sheet can be made of a plastic material, and the light blocking sheet can further include a coating layer formed on at least one of the first surface and the second surface. In particular, the plastic material can be polyamide (PA), polyethylene (PE), polyethylene terephthalate (PET), polyimide (PI), polymethyl methacrylate (PMMA) or polypropylene (PP), and the light blocking sheet can be a transparent plastic flake or an opaque plastic flake. When the light blocking sheet is the transparent plastic flake, both sides of the transparent plastic flake can be coated via the coating layer, and the light blocking sheet can be opaque, dark, low-reflected or light-absorbed to obtain the light-blocking effect. When the light blocking sheet is the opaque plastic flake or a dark plastic flake, one side of the opaque plastic flake is coated via the coating layer, the light blocking sheet can have the low reflectivity, and the non-imaging light can be absorbed by the light blocking sheet to further promote the imaging quality. Therefore, the light-blocking effect of the light blocking sheet can be further enhanced, and the stray light can be reduced.

When on the direction passing through each of the basin structures and vertical to the optical axis, the nearest distance between each of the basin structures and the optical axis is Dn, the farthest distance between each of the basin structures and the optical axis is Df, the distance between the through hole surface and the optical axis is r, and the distance between the peripheral surface and the optical axis is R, the following condition can be satisfied: $0.45 \leq (Df-Dn)/(R-r) \leq 0.95$.

When on the direction passing through each of the basin structures and vertical to the optical axis, the nearest distance between each of the basin structures and the optical axis is Dn, the farthest distance between each of the basin structures and the optical axis is Df, the distance between the through hole surface and the optical axis is r, and the distance between the peripheral surface and the optical axis is R, the following conditions can be satisfied: $1.01 \leq Dn/r \leq 2$; and $0.5 \leq Df/R \leq 0.99$. In particular, when a proper distance between each of the basin structures and the through hole surface is obtained, the deformation of the light blocking sheet can be resisted, and the shape of the through hole can be hardly influenced. Moreover, when a proper distance between each of the basin structures and the peripheral surface is obtained, the warpage of the light blocking sheet is not easily formed. Therefore, the deformation of the light blocking sheet can be avoided when the light blocking sheet bears the adjacent optical elements or a lens barrel of the imaging lens assembly.

When on the direction passing through each of the basin structures and vertical to the optical axis, the nearest distance between each of the basin structures and the optical axis is Dn, and the distance between the through hole surface and the optical axis is r, the following condition can be satisfied: $0.03 \text{ mm} \leq Dn-r \leq 2.0 \text{ mm}$. Therefore, the shape of the through hole can be further maintained.

When on the direction passing through each of the basin structures and vertical to the optical axis, the farthest distance between each of the basin structures and the optical axis is Df, and the distance between the peripheral surface and the optical axis is R, the following condition can be satisfied: $0.05 \text{ mm} \leq R-Df \leq 3.0 \text{ mm}$. Therefore, the deformation and the displacement of the through hole can be further avoided.

When on the direction passing through each of the basin structures and vertical to the optical axis, the distance between the peripheral surface and the optical axis is R, and the distance between the through hole surface and the optical axis is r, the following condition can be satisfied: $0.1 \leq r/R \leq 0.6$. Therefore, the damage of the light blocking sheet owing to the basin structures can be avoided to promote the manufacturability.

When a focal length of the imaging lens assembly is f, and on the direction passing through each of the basin structures and vertical to the optical axis, the distance between the through hole surface and the optical axis is r, the following condition can be satisfied: $0.5 \leq f/2r \leq 6.4$. In particular, f/2r can be defined as the maximum aperture, which the imaging lens assembly can accommodate, that is, the minimum aperture value. The actual aperture is decided by the location and the dimension of the aperture stop of the imaging lens assembly.

When a minimum spacing angle between two adjacent of the basin structures on the first surface centered on the optical axis is θ, the following condition can be satisfied: $1.5 \text{ degrees} \leq \theta < 180 \text{ degrees}$. By a spacing angle between the adjacent of the basin structures, an area of the light blocking sheet excluding the basin structures can be avoided being influenced, and the yield rate can be further enhanced. Further, the following condition can be satisfied: $5 \text{ degrees} \leq \theta < 150 \text{ degrees}$.

When the minimum spacing angle between the two adjacent of the basin structures on the first surface centered on the optical axis is θ, and a total of all of the minimum spacing angles is sum(θ), the following condition can be satisfied: $10 \text{ degrees} \leq sum(\theta) \leq 350 \text{ degrees}$. Therefore, a total number of the basin structures and the spacing angles are in a controllable and proper range to promote the possibility of the mass production. Further, the following condition can be satisfied: $40 \text{ degrees} \leq sum(\theta) \leq 340 \text{ degrees}$. Moreover, the following condition can be satisfied: $180 \text{ degrees} \leq sum(\theta) \leq 300 \text{ degrees}$.

When each of the basin structures is caved in from the first surface to the second surface to form a concave surface, and an area of the concave surface is A, the following condition can be satisfied: $0.02 \text{ mm}^2 \leq A \leq 1.2 \text{ mm}^2$. By the proper area of the concave surface, the strength, which resists the foreign factors, of the basin structures can be obtained, and the area of the light blocking sheet excluding the basin structures can be avoided being influenced.

When the area of the concave surface is A, and a ratio between a total of the areas of the concave surfaces of the basin structures and an area of the first surface is ratio(A), the following condition can be satisfied: $0.2\% \leq ratio(A) \leq 63.0\%$. By the proper ratio between the areas of the concave surfaces and the area of the first surface, the deformation and the displacement of the through hole can be reduced to maintain the imaging quality.

When on the first surface, a depth of each of the basin structures on the optical axis is H, the following condition can be satisfied: $0.005 \text{ mm} \leq H \leq 0.07 \text{ mm}$. By the proper depth of each of the basin structures, the deformation of the area of the light blocking sheet excluding the basin structures can be avoided to maintain the dimension of the light blocking sheet in a direction vertical to the optical axis. In particular, a datum surface of the first surface can be defined as a connection between an intersection of the first surface and the peripheral surface and an intersection of the first surface and the through hole surface. Further, the following condition can be satisfied: $0.015 \text{ mm} \leq H \leq 0.05 \text{ mm}$.

When a distance between the first surface and the second surface of the light blocking sheet on the optical axis is T, and on the first surface, the depth of each of the basin structures on the optical axis is H, the following condition can be satisfied: $0.2 \leq H/T \leq 5.0$. Therefore, the light blocking sheet can be avoided being broken owing to the basin structures.

When a number of the basin structures is N, the following condition can be satisfied: $3 \leq N \leq 32$. Therefore, the strength, which resists the foreign factors, of the basin structures can be promoted, and the area of the light blocking sheet excluding the basin structures can be avoided being influenced. Further, the following condition can be satisfied: 4≤N≤12.

Each of the aforementioned features of the imaging lens assembly can be utilized in various combinations for achieving the corresponding effects.

The present disclosure provides an image capturing apparatus, which includes the aforementioned imaging lens assembly.

The present disclosure provides an electronic device, which includes the aforementioned image capturing apparatus and an image sensor. The image sensor is corresponding to the image capturing apparatus, and the image sensor is disposed on an image surface of the imaging lens assembly.

According to the aforementioned embodiment, specific examples are provided, and illustrated via figures.

1st Example

FIG. 1A is a schematic view of an imaging lens assembly 100 according to the 1st example of the present disclosure. In FIG. 1A, the imaging lens assembly 100 has an optical axis X, and includes a plurality of optical elements and a lens barrel 140. It should be mentioned that the imaging lens assembly 100 can further include a plurality of lens barrels, each of the lens barrels includes at least one optical element, and the optical elements are arranged along the optical axis X, but the present disclosure is not limited thereto.

Furthermore, the optical elements can be a lens element, a flat lens element, a light blocking sheet, a spacer, a retainer or a light-folding element, wherein the imaging lens assembly 100 can focus, the light path can be adjusted or the imaging quality can be improved by the aforementioned optical elements, and the lens barrel 140 can accommodate the optical elements. According to the 1st example, the imaging lens assembly 100, in order from an object side to an image side, includes a lens element 111, a light blocking sheet 121, a lens element 112, a light blocking sheet 122, a lens element 113, a light blocking sheet 123, a lens element 114, a light blocking sheet 124, a lens element 115, a light blocking sheet 125, a lens element 116, a light blocking sheet 126, a lens element 117 and a retainer 127. Further, numbers, structures, surface shapes and so on of the optical elements can be disposed according to different imaging demand, other optical elements can be disposed on demands, and the present disclosure is not limited thereto.

Figure 1B:
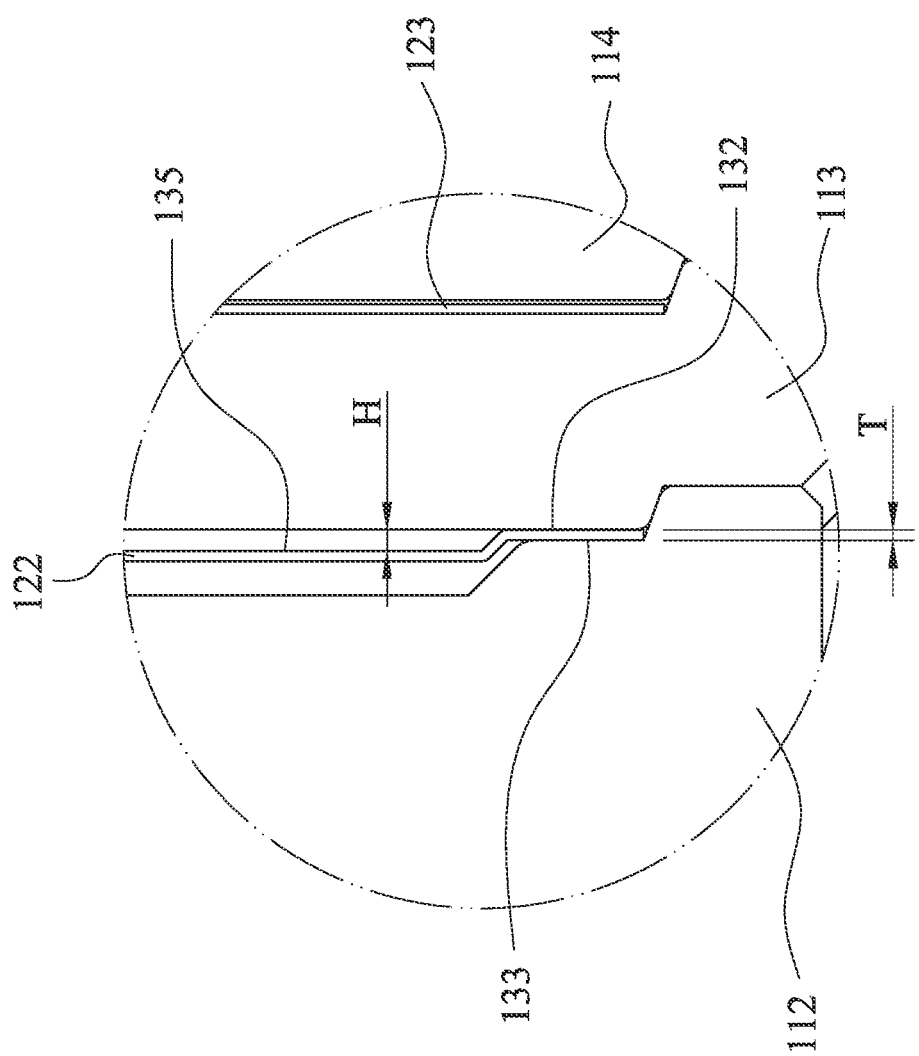
FIG. 1B is a partial enlarged view of the imaging lens assembly according to the 1st example in FIG. 1A.
Figure 1C:
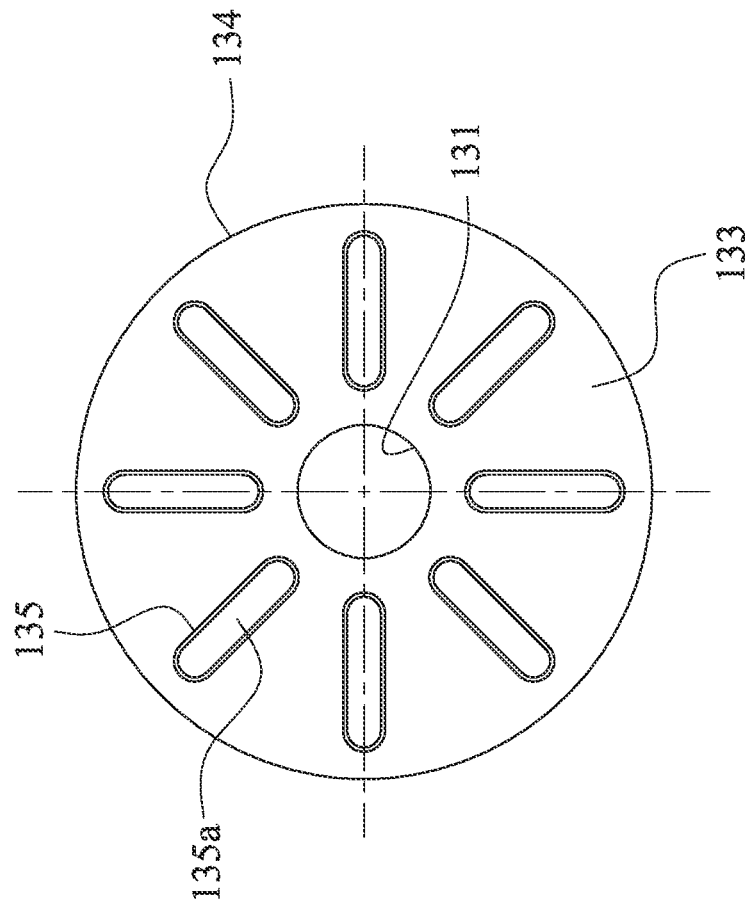
FIG. 1C is a schematic view of the light blocking sheet according to the 1st example in FIG. 1A.
Figure 1D:
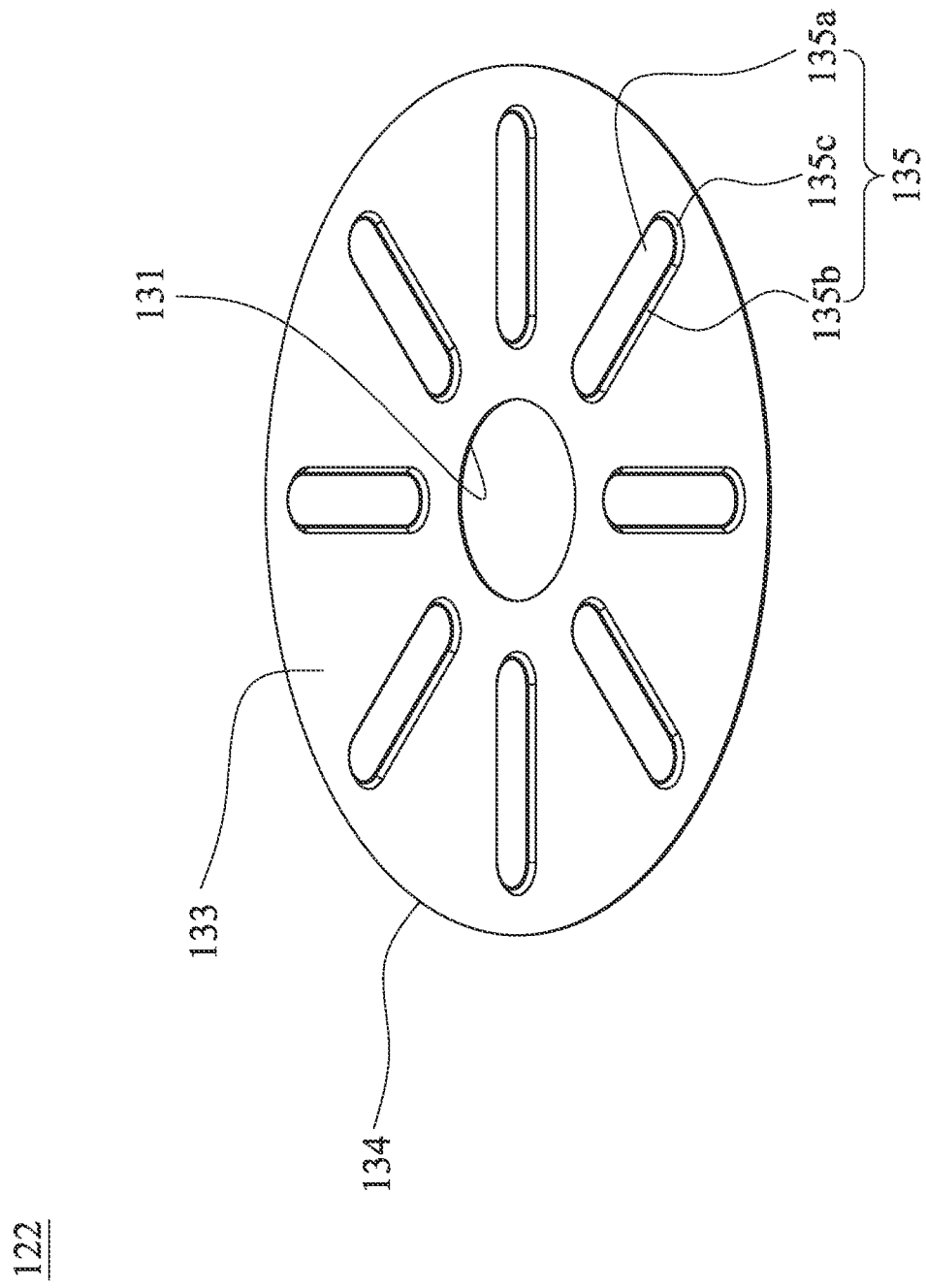
FIG. 1D is another schematic view of the light blocking sheet according to the 1st example in FIG. 1A.

FIG. 1B is a partial enlarged view of the imaging lens assembly 100 according to the 1st example in FIG. 1A. FIG. 10 is a schematic view of the light blocking sheet 122 according to the 1st example in FIG. 1A. FIG. 1D is another schematic view of the light blocking sheet 122 according to the 1st example in FIG. 1A. In FIGS. 1B to 1D, the light blocking sheet 122 includes a through hole surface 131, a first surface 132, a second surface 133, a peripheral surface 134 and a plurality of basin structures 135. The through hole surface 131 surrounds the optical axis X to form an aperture stop of the imaging lens assembly 100. In particular, a through hole is formed by the through hole surface 131 surrounding the optical axis X, and the through hole can be the aperture stop of the imaging lens assembly 100. The first surface 132 is connected to and surrounds the through hole surface 131. The second surface 133 is connected to and surrounds the through hole surface 131, and the first surface 132 and the second surface 133 are relatively disposed. The peripheral surface 134 is connected to the first surface 132 and the second surface 133, and the peripheral surface 134 is farther from the optical axis X than the through hole surface 131 from the optical axis X.

In detail, the light blocking sheet 122 can be used to block the non-imaging light and adjust the clear aperture. Further, the light blocking sheet 122 can be manufactured via the stamping process. The residual stress is possibly acted on the light blocking sheet 122 after the stamping process, and the light blocking sheet 122 may be deformed by the residual stress. The imaging quality would be influenced by the deformation of the light blocking sheet 122. Especially, when the through hole is deformed or shifted, the occurrence of unexpected stray light may take place. Hence, the resistant to the deformation along the optical axis X of the light blocking sheet 122 can be provided by the basin structures 135 of the light blocking sheet 122, and the deformation and the displacement of the through hole can be reduced. Therefore, the imaging quality can be maintained, the imaging quality is hardly changed over time, and the foreign factors, which influence the light blocking sheet 122, can be further resisted. In particular, the foreign factors are the impact caused by falling, the temperature variation, the humidity variation or the high temperature and high humidity environment.

In FIG. 1B, the first surface 132 of the light blocking sheet 122 faces towards an image side of the imaging lens assembly 100, the second surface 133 of the light blocking sheet 122 faces towards an object side of the imaging lens assembly 100, the light blocking sheet 122 is interposed between the lens elements 112, 113, and the interposing position is farther from the optical axis X than the basin structures 135 from the optical axis X.

In FIGS. 1C and 1D, the basin structures 135 are arranged in interval and around the optical axis X, each of the basin structures 135 is caved in from the first surface 132 to the second surface 133, and each of the basin structures 135 protrudes on the second surface 133 to form a concave surface 135a. In detail, the shape of each of the concave surfaces 135a is oblong, wherein each of the concave surfaces 135a has two parallel line segments 135b and two semi arcs 135c, the parallel line segments 135b extend towards a direction away from the optical axis X and are parallel to each other, and the semi arcs 135c are connected to two sides of the parallel line segments 135b away from the optical axis X and the other two sides of the parallel line segments 135b close to the optical axis X, respectively.

Figure 1E:
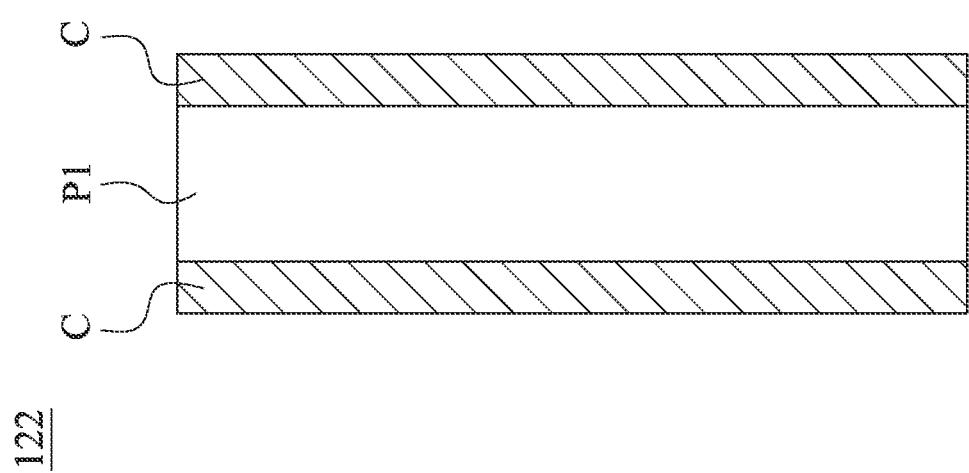
FIG. 1E is a coating schematic view of the light blocking sheet according to the 1st example in FIG. 1A.
Figure 1F:
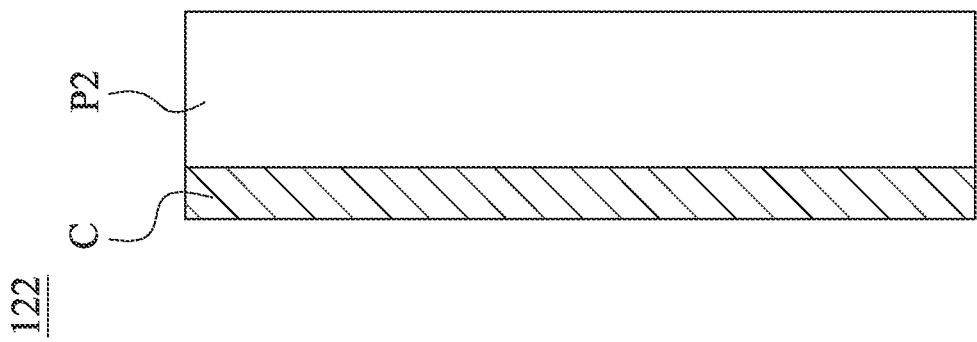
FIG. 1F is another coating schematic view of the light blocking sheet according to the 1st example in FIG. 1A.

FIG. 1E is a coating schematic view of the light blocking sheet 122 according to the 1st example in FIG. 1A. FIG. 1F is another coating schematic view of the light blocking sheet 122 according to the 1st example in FIG. 1A. In FIGS. 1E and 1F, the light blocking sheet 122 can be made of a plastic material, and the light blocking sheet 122 can further include a coating layer C formed on at least one of the first surface 132 and the second surface 133. In particular, the plastic material can be PA, PE, PET, PI, PMMA or PP, and the light blocking sheet 122 can be a transparent plastic flake P1 or an opaque plastic flake P2.

In FIG. 1E, when the light blocking sheet 122 is the transparent plastic flake P1, both sides of the transparent plastic flake P1 are coated via the coating layer C. By the coating layer C, the light blocking sheet 122 can be opaque and dark, and the light blocking sheet 122 has the low-reflected effect or the light-absorbed effect to promote the light-blocking effect and reduce the stray light.

In FIG. 1F, when the light blocking sheet 122 is the opaque plastic flake P2, the light blocking sheet 122 can be dark, and at least one side of the opaque plastic flake P2 can be coated via the coating layer C. Therefore, the light blocking sheet 122 can be low-reflected, and the non-imaging light can be absorbed by the light blocking sheet 122 to further promote the imaging quality.

In FIGS. 1E and 1F, it should be mentioned that a thickness ratio of the coating layer C to the transparent plastic flake P1 and a thickness ratio of the coating layer C to the opaque plastic flake P2 are not illustrated according to the real ratio in order to clearly indicate the composition of the light blocking sheet 122.

FIG. 1G is a schematic view of parameters of the light blocking sheet 122 according to the 1st example in FIG. 1A. In FIGS. 1B and 1G, when on a direction passing through each of the basin structures 135 and vertical to the optical axis X, a nearest distance between each of the basin structures 135 and the optical axis X is Dn, a farthest distance between each of the basin structures 135 and the optical axis X is Df, a distance between the through hole surface 131 and the optical axis X is r, and a distance between the peripheral surface 134 and the optical axis X is R; a focal length of the imaging lens assembly 100 is f; a minimum spacing angle between two adjacent of the basin structures 135 on the first surface 132 centered on the optical axis X is θ, each of the minimum spacing angles of each two adjacent of the basin structures 135 is the same, and a total of all of the minimum spacing angles is sum(θ), an area of the concave surface 135a is A, and a ratio between a total of the areas of the concave surfaces 135a of the basin structures 135 and an area of the first surface 132 is ratio(A); on the first surface 132, a depth of each of the basin structures 135 on the optical axis X is H; a distance between the first surface 132 and the second surface 133 of the light blocking sheet 122 on the optical axis X is T; a number of the basin structures 135 is N, the following conditions of the Table 1 are satisfied.

TABLE 1

| 1st example | | | |
|---|---|---|---|
| r (mm) | 0.795 | r/R | 0.232 |
| R (mm) | 3.425 | f/2r | 1.509 |
| Df (mm) | 3.1 | H (mm) | 0.05 |
| Dn (mm) | 1.2 | H/T | 2.00 |
| (Df-Dn)/(R-r) | 0.72 | N | 8 |
| Dn/r | 1.509 | θ (degrees) | 25.1 |
| Df/R | 0.905 | sum(θ) (degrees) | 200.8 |
| Dn-r (mm) | 0.405 | A (mm²) | 0.6857 |
| R-Df (mm) | 0.325 | ratio(A) (%) | 15.73 |

2nd Example

Figure 2A:
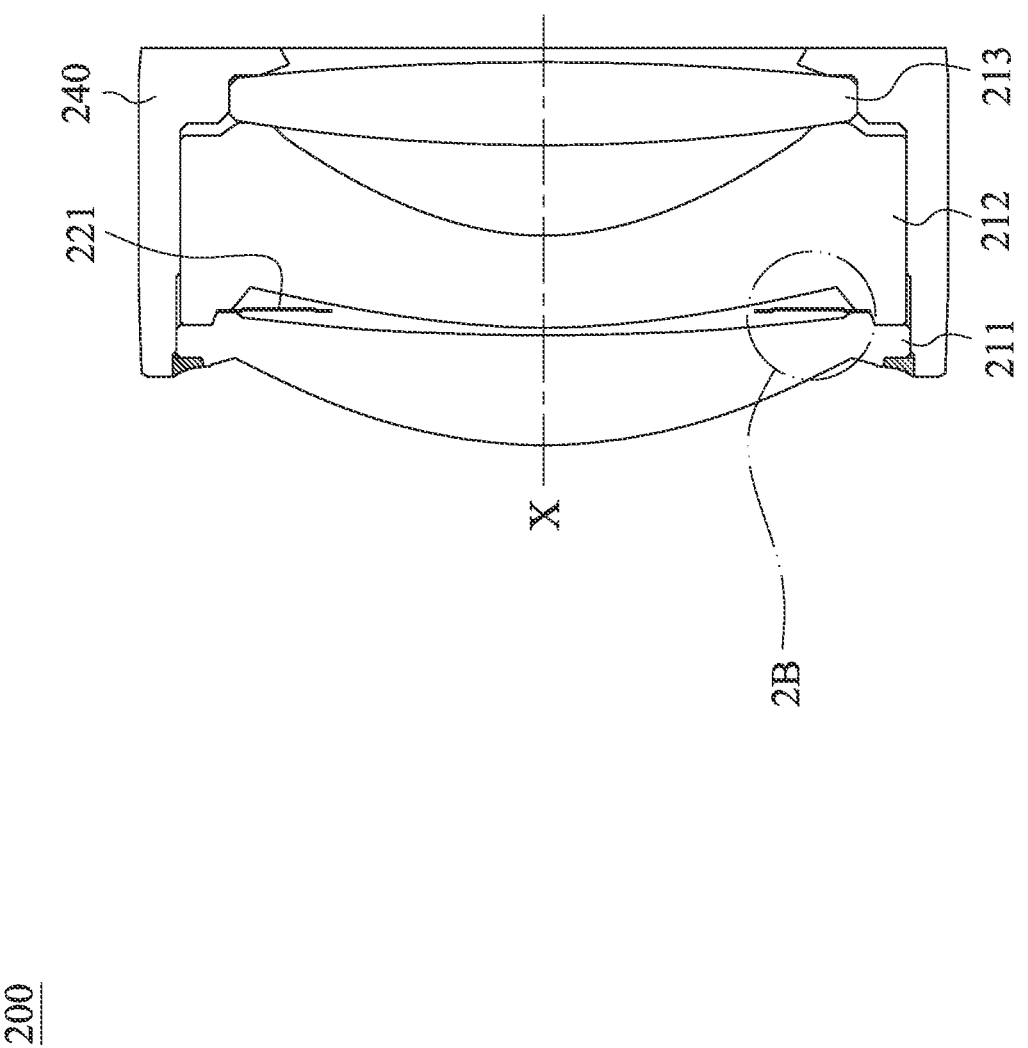
FIG. 2A is a schematic view of an imaging lens assembly according to the 2nd example of the present disclosure.

FIG. 2A is a schematic view of an imaging lens assembly 200 according to the 2nd example of the present disclosure. In FIG. 2A, the imaging lens assembly 200 has an optical axis X, and includes a plurality of optical elements and a lens barrel 240. It should be mentioned that the imaging lens assembly 200 can further include a plurality of lens barrels, each of the lens barrels includes at least one optical element, and the optical elements are arranged along the optical axis X, but the present disclosure is not limited thereto.

Furthermore, the optical elements can be a lens element, a flat lens element, a light blocking sheet, a spacer, a retainer or a light-folding element, wherein the imaging lens assembly 200 can focus, the light path can be adjusted or the imaging quality can be improved by the aforementioned optical elements, and the lens barrel 240 can accommodate the optical elements. According to the 2nd example, the imaging lens assembly 200, in order from an object side to an image side, includes a lens element 211, a light blocking sheet 221, a lens element 212 and a lens element 213. Further, numbers, structures, surface shapes and so on of the optical elements can be disposed according to different imaging demand, other optical elements can be disposed on demands, and the present disclosure is not limited thereto.

Figure 2B:
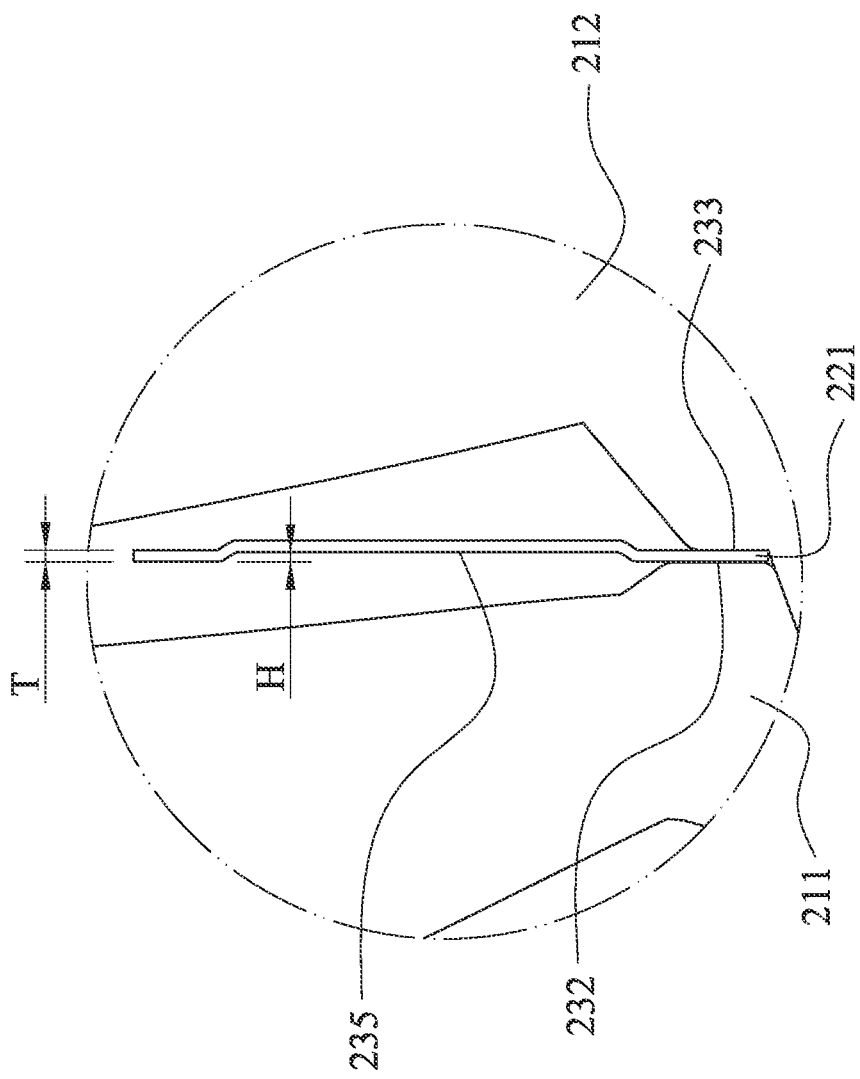
FIG. 2B is a partial enlarged view of the imaging lens assembly according to the 2nd example in FIG. 2A.
Figure 2C:
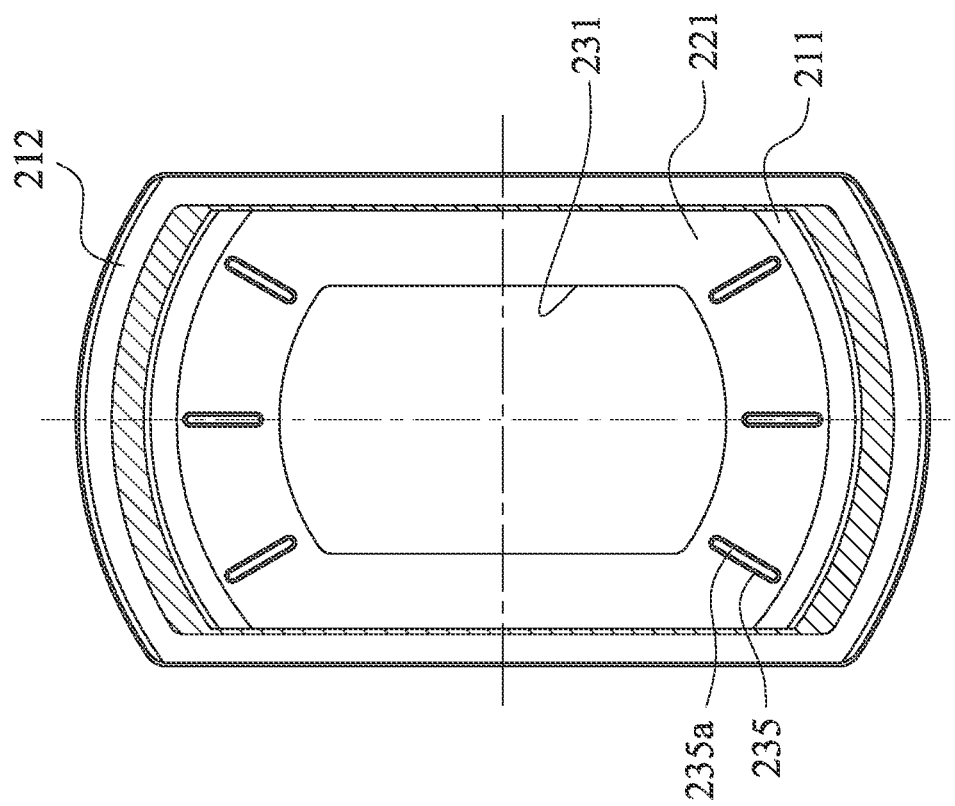
FIG. 2C is a partial schematic view of the imaging lens assembly according to the 2nd example in FIG. 2A.
Figure 2D:
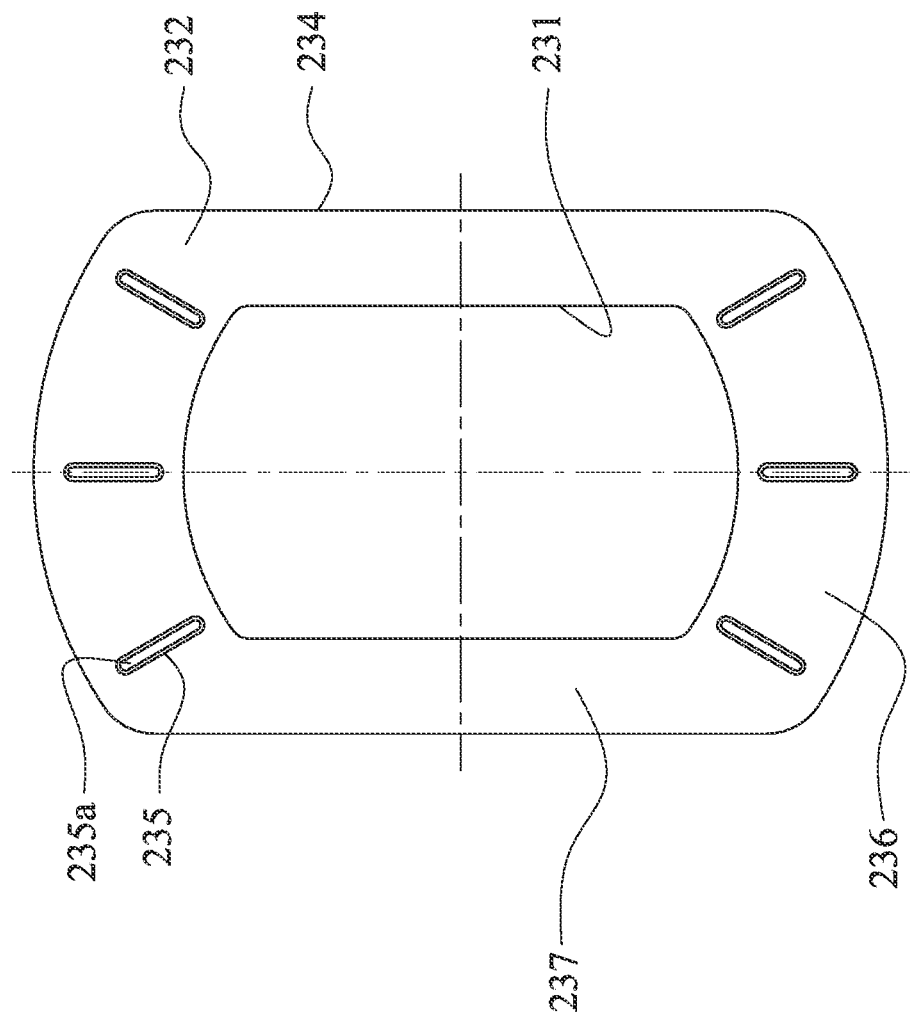
FIG. 2D is a schematic view of the light blocking sheet according to the 2nd example in FIG. 2A.
Figure 2E:
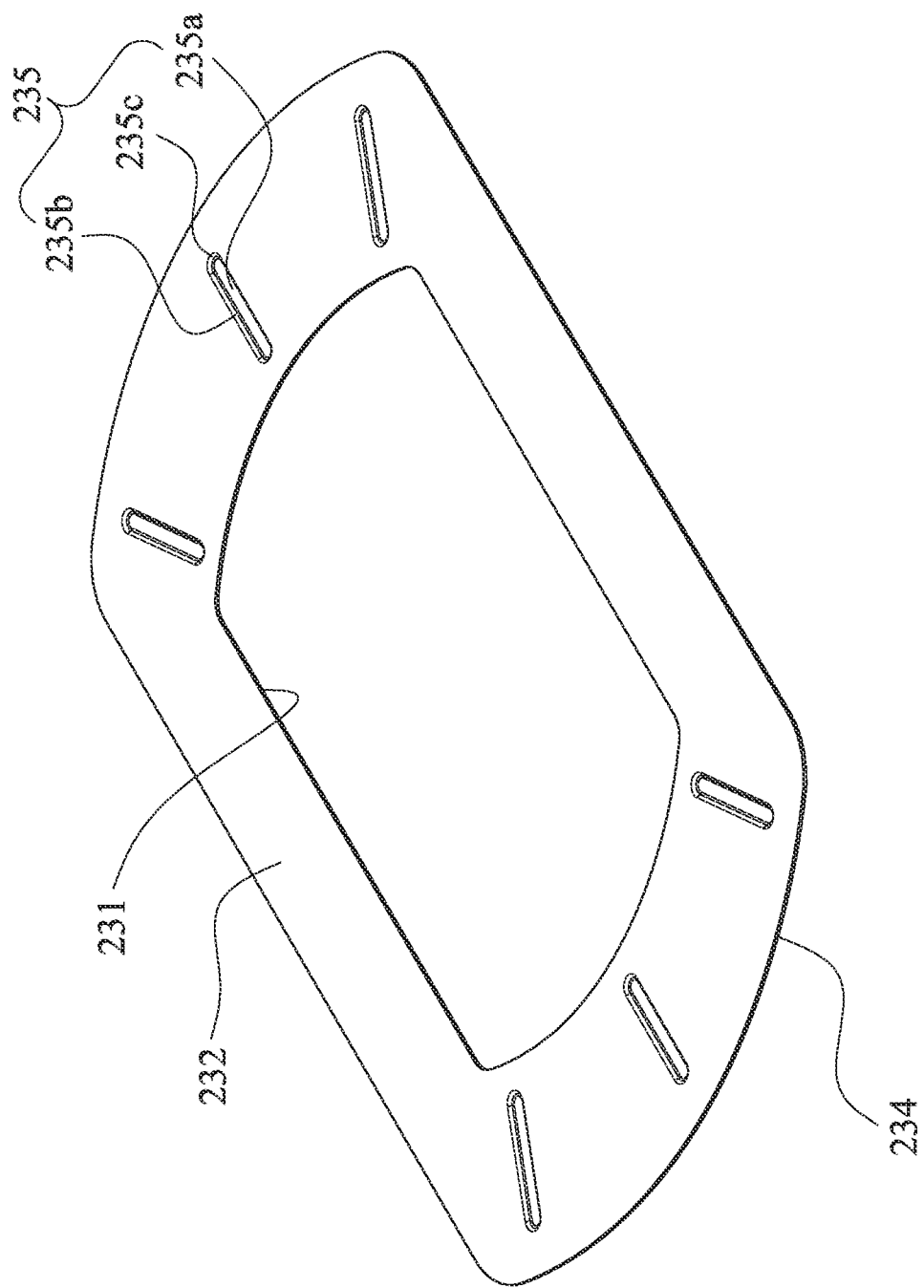
FIG. 2E is another schematic view of the light blocking sheet according to the 2nd example in FIG. 2A.
Figure 2F:
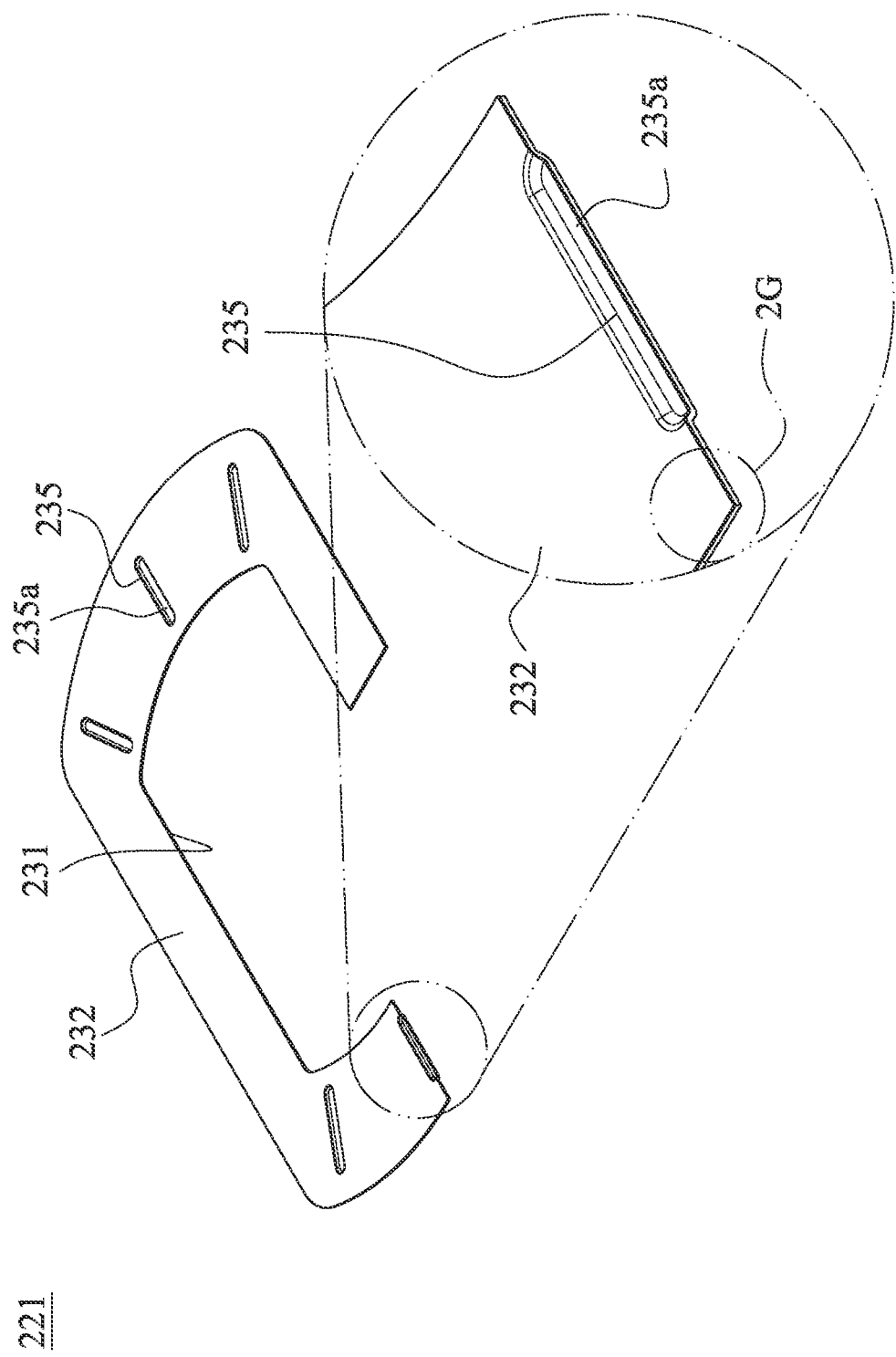
FIG. 2F is a partial cross-sectional view of the light blocking sheet according to the 2nd example in FIG. 2A.

FIG. 2B is a partial enlarged view of the imaging lens assembly 200 according to the 2nd example in FIG. 2A. FIG. 2C is a partial schematic view of the imaging lens assembly 200 according to the 2nd example in FIG. 2A. FIG. 2D is a schematic view of the light blocking sheet 221 according to the 2nd example in FIG. 2A. FIG. 2E is another schematic view of the light blocking sheet 221 according to the 2nd example in FIG. 2A. FIG. 2F is a partial cross-sectional view of the light blocking sheet 221 according to the 2nd example in FIG. 2A. In FIGS. 2B to 2F, the light blocking sheet 221 includes a through hole surface 231, a first surface 232, a second surface 233, a peripheral surface 234 and a plurality of basin structures 235, and each of the basin structures 235 can be seen a U-shaped structure from a cross-section parallel to the optical axis X. The through hole surface 231 surrounds the optical axis X to form an aperture stop of the imaging lens assembly 200. In particular, a through hole is formed by the through hole surface 231 surrounding the optical axis X, and the through hole can be the aperture stop of the imaging lens assembly 200. The first surface 232 is connected to and surrounds the through hole surface 231. The second surface 233 is connected to and surrounds the through hole surface 231, and the first surface 232 and the second surface 233 are relatively disposed. The peripheral surface 234 is connected to the first surface 232 and the second surface 233, and the peripheral surface 234 is farther from the optical axis X than the through hole surface 231 from the optical axis X.

In detail, the light blocking sheet 221 can be used to block the non-imaging light and adjust the clear aperture. Further, the light blocking sheet 221 can be manufactured via the stamping process. The residual stress is possibly acted on the light blocking sheet 221 after the stamping process, and the light blocking sheet 221 may be deformed by the residual stress. The imaging quality would be influenced by the deformation of the light blocking sheet 221. Especially, when the through hole of the light blocking sheet 221 is deformed or shifted, the occurrence of unexpected stray light may take place. Hence, the resistant to the deformation along the optical axis X of the light blocking sheet 221 can be provided by the basin structures 235 of the light blocking sheet 221, and the deformation and the displacement of the through hole can be reduced. Therefore, the imaging quality can be maintained, the imaging quality is hardly changed over time, and the foreign factors, which influence the light blocking sheet 221, can be further resisted. In particular, the foreign factors are the impact caused by falling, the temperature variation, the humidity variation or the high temperature and high humidity environment, but the present disclosure is not limited thereto.

In FIG. 2B, the first surface 232 of the light blocking sheet 221 faces towards an object side of the imaging lens assembly 200, the second surface 233 of the light blocking sheet 221 faces towards an image side of the imaging lens assembly 200, the light blocking sheet 221 is interposed between the lens elements 211, 212, and the interposing position is farther from the optical axis X than the basin structures 235 from the optical axis X.

In FIGS. 2C to 2E, the shape of the light blocking sheet 221 is oblong, and the first surface 232 can include two arc-shaped surfaces 236 and two connecting surfaces 237, wherein the arc-shaped surfaces 236 are relatively disposed, and each of the connecting surfaces 237 is connected to two sides of the arc-shaped surfaces 236. Furthermore, the basin structures 235 can be disposed on the arc-shaped surfaces 236.

In FIGS. 2D and 2E, the basin structures 235 are arranged in interval and around the optical axis X, each of the basin structures 235 is caved in from the first surface 232 to the second surface 233, and each of the basin structures 235 protrudes on the second surface 233 to form a concave surface 235a. In detail, the shape of each of the concave surfaces 235a is oblong, wherein each of the concave surfaces 235a has two parallel line segments 235b and two semi arcs 235c, the parallel line segments 235b extend towards a direction away from the optical axis X and are parallel to each other, and the semi arcs 235c are connected to two sides of the parallel line segments 235b away from the optical axis X and the other two sides of the parallel line segments 235b close to the optical axis X, respectively.

Figure 2G:
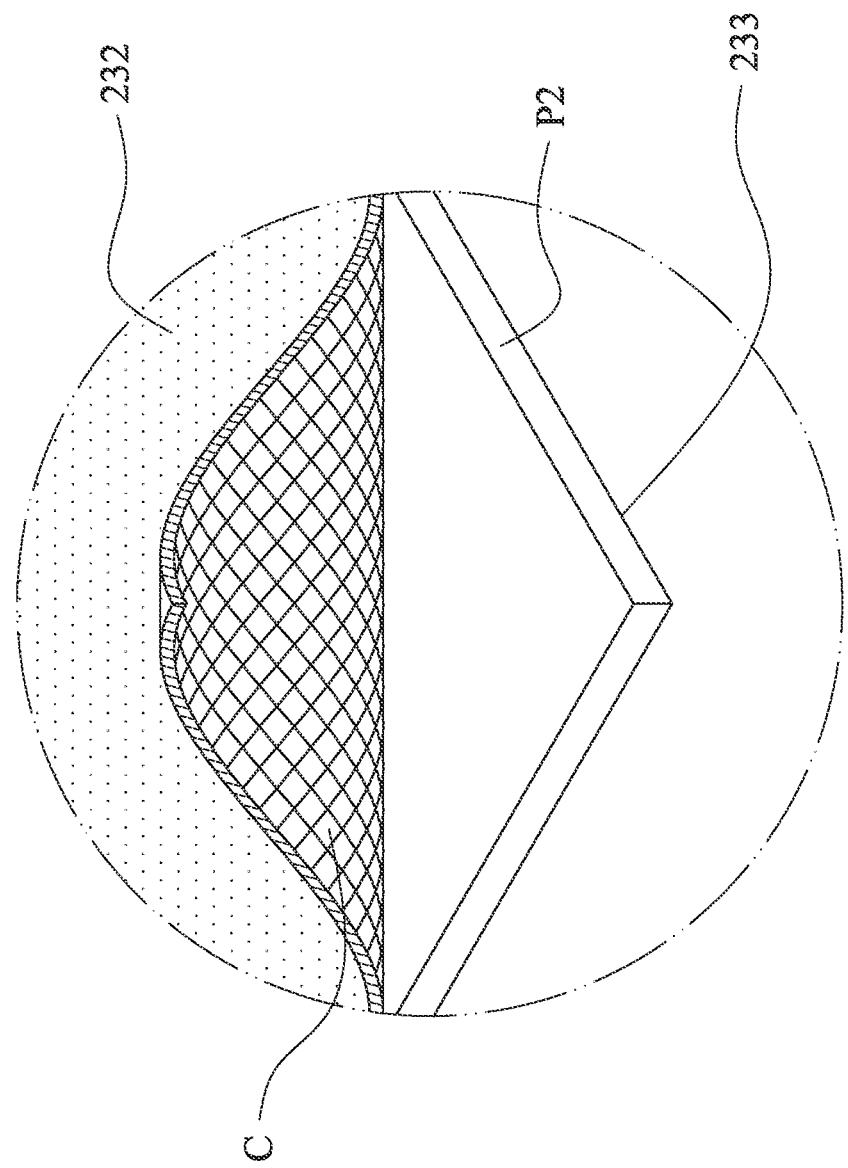
FIG. 2G is a coating schematic view of the light blocking sheet according to the 2nd example in FIG. 2F.

FIG. 2G is a coating schematic view of the light blocking sheet 221 according to the 2nd example in FIG. 2F. In FIG. 2G, the light blocking sheet 221 can be made of a plastic material, and the light blocking sheet 221 further includes a coating layer C formed on at least one of the first surface 232 and the second surface 233. In particular, the plastic material can be PA, PE, PET, PI, PMMA or PP. According to the 2nd example, the light blocking sheet 221 is an opaque plastic flake P2, the light blocking sheet 221 is dark, and an object side of the opaque plastic flake P2 is coated via the coating layer C. That is, the coating layer C is formed on the first surface 232 of the light blocking sheet 221. By the coating layer C, the transmittance of the light blocking sheet 221 can be lowered, the reflectivity of the light blocking sheet 221 can be lowered, the color of the light blocking sheet 221 can be changed, the invisible light can be absorbed, and one of or multiple of the aforementioned effects can be obtained, the present disclosure is not limited thereto. In FIG. 2G, it should be mentioned that a thickness ratio of the coating layer C to the opaque plastic flake P2 is not illustrated according to the real ratio in order to clearly indicate the composition of the light blocking sheet 221.

FIG. 2H is a schematic view of parameters of the light blocking sheet 221 according to the 2nd example in FIG. 2A. In FIGS. 2B and 2H, when on a direction passing through each of the basin structures 235 and vertical to the optical axis X, a nearest distance between each of the basin structures 235 and the optical axis X is Dn, a farthest distance between each of the basin structures 235 and the optical axis X is Df, a distance between the through hole surface 231 and the optical axis X is r, and a distance between the peripheral surface 234 and the optical axis X is R; a focal length of the imaging lens assembly 200 is f; a minimum spacing angle between two adjacent of the basin structures 235 on the first surface 232 (that is, on the same arc-shaped surfaces 236) centered on the optical axis X is θ1, a minimum spacing angle between two adjacent of the basin structures 235 on the first surface 232 (that is, on the different arc-shaped surfaces 236) centered on the optical axis X is θ2, and a total of all of the minimum spacing angles (that is, a total of the minimum spacing angles θ1 and the minimum spacing angles θ2) is sum(θ), an area of the concave surface 235a is A, and a ratio between a total of the areas of the concave surfaces 235a of the basin structures 235 and an area of the first surface 232 is ratio(A); on the first surface 232, a depth of each of the basin structures 235 on the optical axis X is H; a distance between the first surface 232 and the second surface 233 of the light blocking sheet 221 on the optical axis X is T; a number of the basin structures 235 is N, the following conditions of the Table 2 are satisfied.

TABLE 2

| 2nd example | | | |
|---|---|---|---|
| r (mm) | 2.8 | f/2r | 5.036 |
| R (mm) | 4.31 | H (mm) | 0.023 |
| Df (mm) | 4.0 | H/T | 0.82 |
| Dn (mm) | 3.0 | N | 6 |
| (Df-Dn)/(R-r) | 0.66 | θ1 (degrees) | 26.7 |
| Dn/r | 1.071 | θ2 (degrees) | 116.7 |
| Df/R | 0.928 | sum(θ) (degrees) | 340.2 |
| Dn-r (mm) | 0.2 | A (mm$^2$) | 0.0899 |
| R-Df (mm) | 0.31 | ratio(A) (%) | 6.20 |
| r/R | 0.65 | | |

3rd Example

Figure 3A:
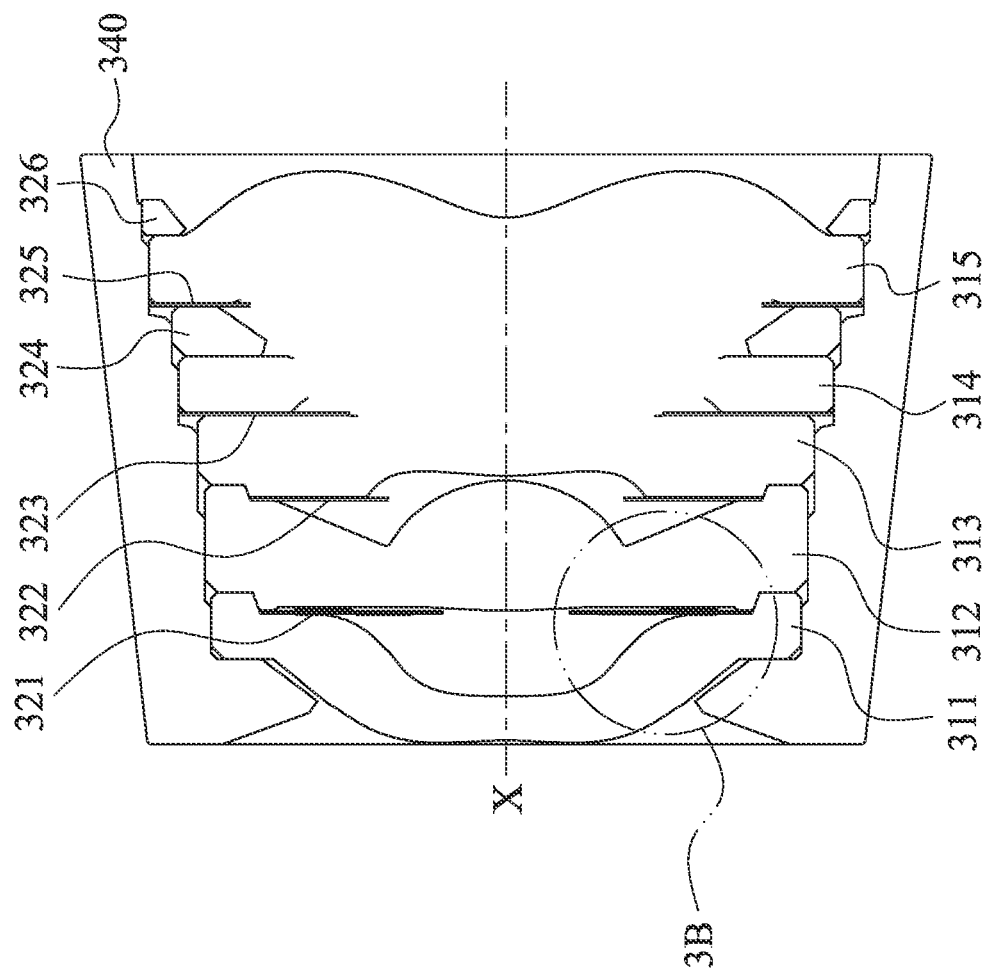
FIG. 3A is a schematic view of an imaging lens assembly according to the 3rd example of the present disclosure.

FIG. 3A is a schematic view of an imaging lens assembly 300 according to the 3rd example of the present disclosure. In FIG. 3A, the imaging lens assembly 300 has an optical axis X, and includes a plurality of optical elements and a lens barrel 340. It should be mentioned that the imaging lens assembly 300 can further include a plurality of lens barrels, each of the lens barrels includes at least one optical element, and the optical elements are arranged along the optical axis X, but the present disclosure is not limited thereto.

Furthermore, the optical elements can be a lens element, a flat lens element, a light blocking sheet, a spacer, a retainer or a light-folding element, wherein the imaging lens assembly 300 can focus, the light path can be adjusted or the imaging quality can be improved by the aforementioned optical elements, and the lens barrel 340 can accommodate the optical elements. According to the 3rd example, the imaging lens assembly 300, in order from an object side to an image side, includes a lens element 311, a light blocking sheet 321, a lens element 312, a light blocking sheet 322, a lens element 313, a light blocking sheet 323, a lens element 314, a spacer 324, a light blocking sheet 325, a lens element 315 and a retainer 326. Further, numbers, structures, surface shapes and so on of the optical elements can be disposed according to different imaging demand, other optical elements can be disposed on demands, and the present disclosure is not limited thereto.

Figure 3B:
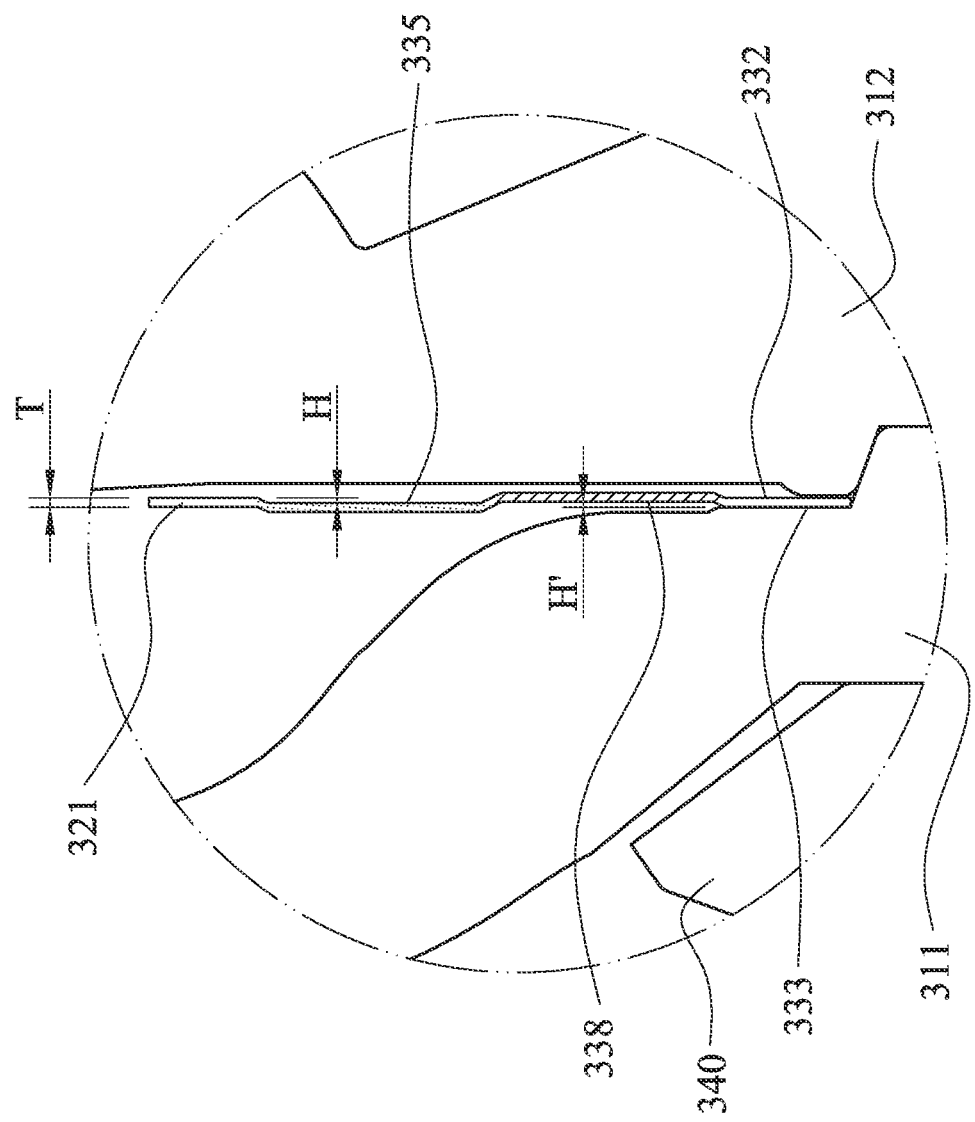
FIG. 3B is a partial enlarged view of the imaging lens assembly according to the 3rd example in FIG. 3A.
Figure 3D:
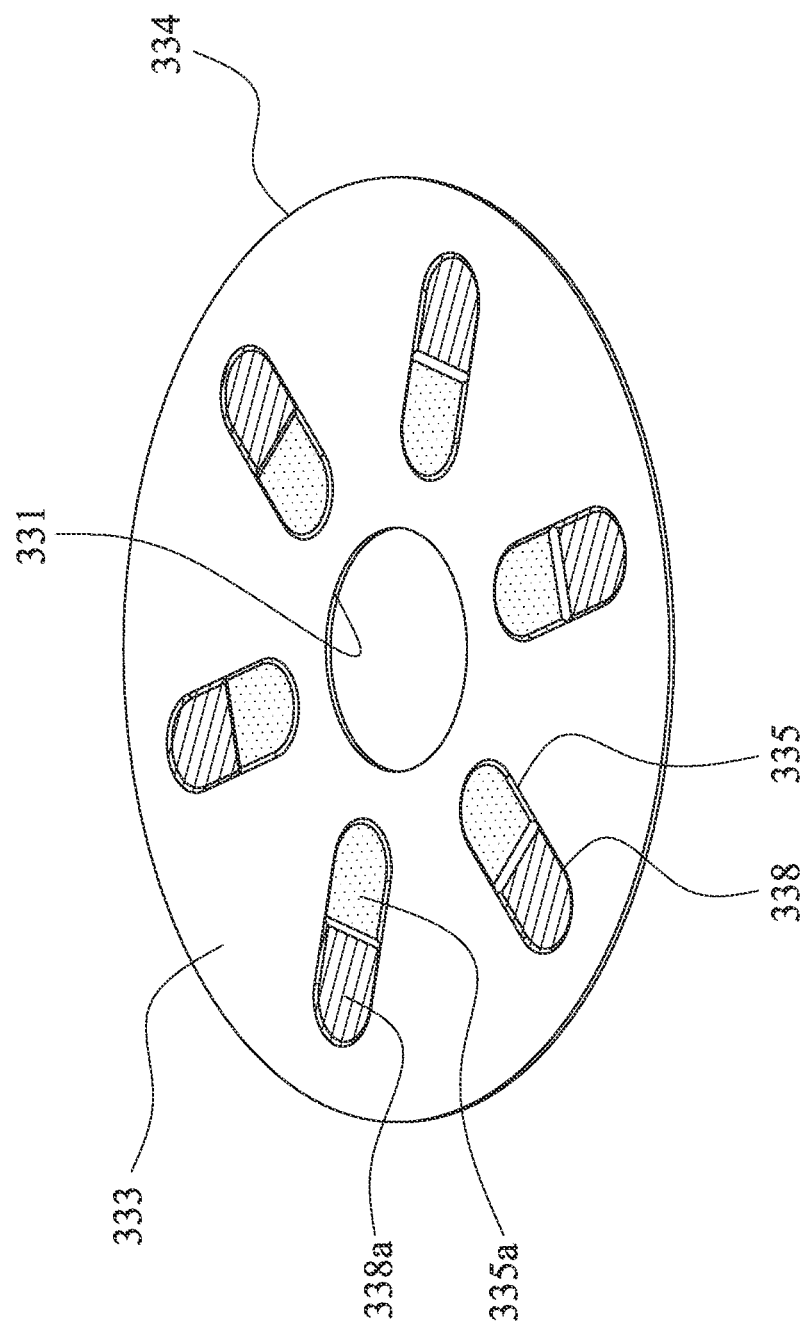
FIG. 3D is another schematic view of the light blocking sheet according to the 3rd example in FIG. 3A.
Figure 3E:
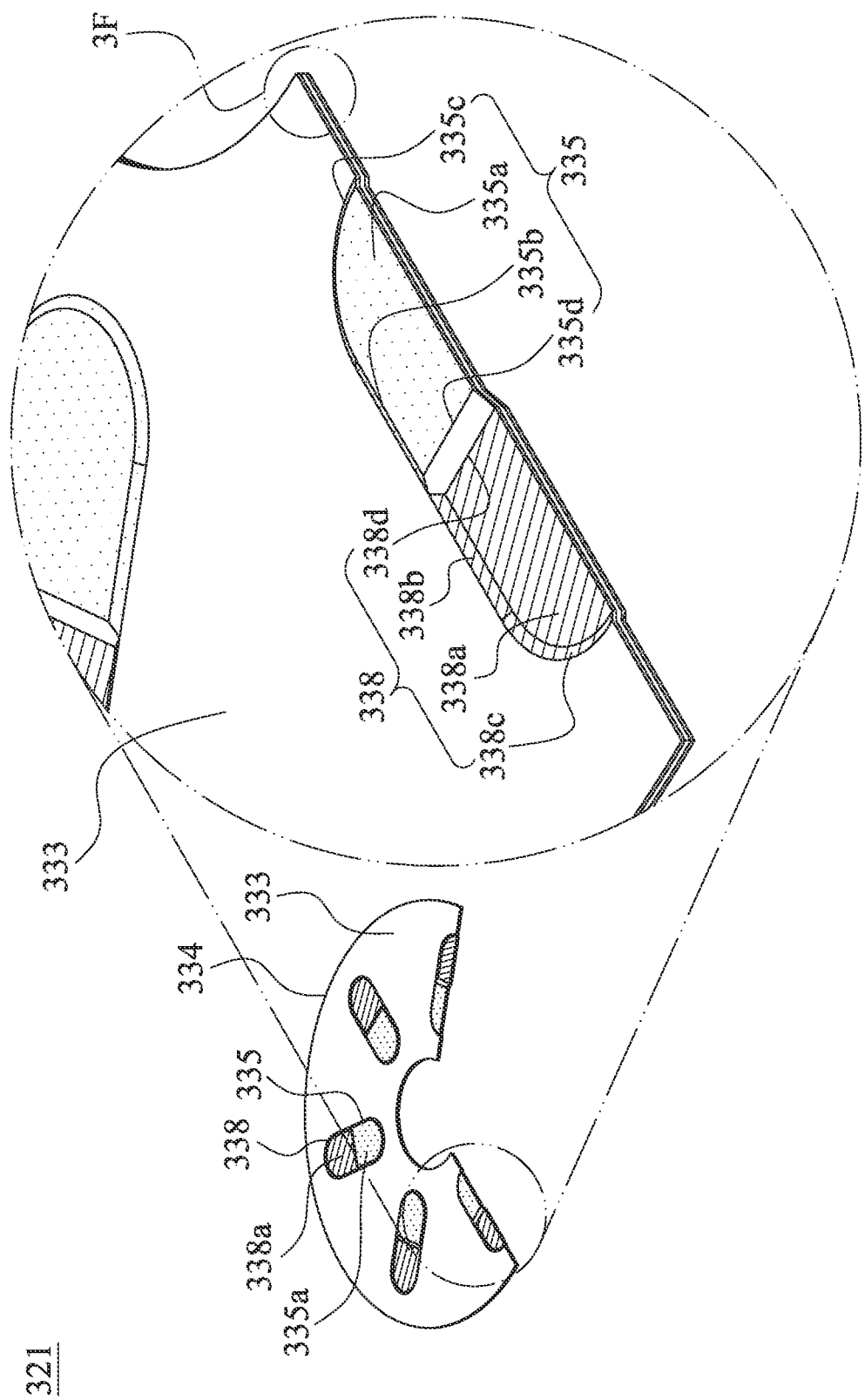
FIG. 3E is a partial cross-sectional view of the light blocking sheet according to the 3rd example in FIG. 3A.

FIG. 3B is a partial enlarged view of the imaging lens assembly 300 according to the 3rd example in FIG. 3A. FIG. 3C is a schematic view of the light blocking sheet 321 according to the 3rd example in FIG. 3A. FIG. 3D is another schematic view of the light blocking sheet 321 according to the 3rd example in FIG. 3A. FIG. 3E is a partial cross-sectional view of the light blocking sheet 321 according to the 3rd example in FIG. 3A. In FIGS. 3B to 3E, the light blocking sheet 321 includes a through hole surface 331, a first surface 332, a second surface 333, a peripheral surface 334, a plurality of basin structures 335 and a plurality of reverse basin structures 338, and each of the basin structures 335 and each of the reverse basin structures 338 can be seen a U-shaped structure from a cross-section parallel to the optical axis X. The through hole surface 331 surrounds the optical axis X to form an aperture stop of the imaging lens assembly 300. In particular, a through hole is formed by the through hole surface 331 surrounding the optical axis X, and the through hole can be the aperture stop of the imaging lens assembly 300. The first surface 332 is connected to and surrounds the through hole surface 331. The second surface 333 is connected to and surrounds the through hole surface 331, and the first surface 332 and the second surface 333 are relatively disposed. The peripheral surface 334 is connected to the first surface 332 and the second surface 333, and the peripheral surface 334 is farther from the optical axis X than the through hole surface 331 from the optical axis X.

In detail, the light blocking sheet 321 can be used to block the non-imaging light and adjust the clear aperture. Further, the light blocking sheet 321 can be manufactured via the stamping process. The residual stress is possibly acted on the light blocking sheet 321 after the stamping process, and the light blocking sheet 321 may be deformed by the residual stress. The imaging quality would be influenced by the deformation of the light blocking sheet 321. Especially, when the through hole of the light blocking sheet 321 is deformed or shifted, the occurrence of unexpected stray light may take place. Hence, the resistant to the deformation along the optical axis X of the light blocking sheet 321 can be provided by the basin structures 335 and the reverse basin structures 338 of the light blocking sheet 321, and the deformation and the displacement of the through hole can be reduced. Therefore, the imaging quality can be maintained, the imaging quality is hardly changed over time, and the foreign factors, which influence the light blocking sheet 321, can be further resisted. In particular, the foreign factors are the impact caused by falling, the temperature variation, the humidity variation or the high temperature and high humidity environment, but the present disclosure is not limited thereto.

In FIG. 3B, the first surface 332 of the light blocking sheet 321 faces towards an image side of the imaging lens assembly 300, the second surface 333 of the light blocking sheet 321 faces towards an object side of the imaging lens assembly 300, the light blocking sheet 321 is interposed between the lens elements 311, 312, and the interposing position is farther from the optical axis X than the basin structures 335 and the reverse basin structures 338 from the optical axis X.

In FIGS. 3C and 3D, the basin structures 335 are arranged in interval and around the optical axis X, each of the basin structures 335 is caved in from the first surface 332 to the second surface 333, and each of the basin structures 335 protrudes on the second surface 333 to form a concave surface 335a; each of the reverse basin structures 338 is arranged in interval and around the optical axis X, and each of the reverse basin structures 338 is caved in from the second surface 333 to the first surface 332, and each of the reverse basin structures 338 protrudes on the first surface 332 to form a convex surface 338a. The displacement of the through hole along the optical axis X can be further resisted by the cooperation between the basin structures 335 and the reverse basin structures 338.

Each of the basin structures 335 can extend towards a direction away from the optical axis X, the basin structures 335 and the reverse basin structures 338 are arranged along the direction away from the optical axis X, and the basin structures 335 are further connected to the reverse basin structures 338, wherein each of the reverse basin structures 338 is farther from the optical axis X than each of the basin structures 335 from the optical axis X, and both of a number of the basin structures 335 and a number of the reverse basin structures 338 are six.

Figure 3F:
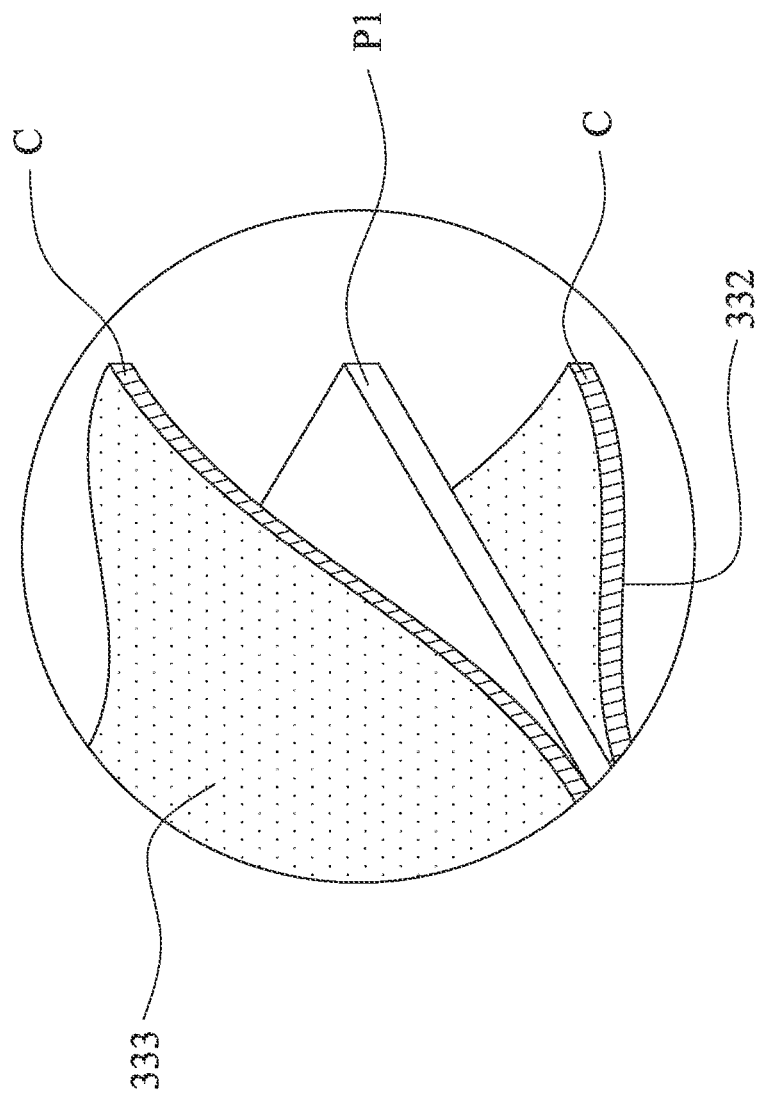
FIG. 3F is a coating schematic view of the light blocking sheet according to the 3rd example in FIG. 3A.

In detail, each of the concave surfaces 335a has two parallel line segments 335b, an arc line 335c and a straight-line segment 335d, wherein the parallel line segments 335b extend towards the direction away from the optical axis X, the arc line 335c is connected to one side of each of the parallel line segments 335b close to the optical axis X, the straight-line segment 335d is connected to the other end of each of the parallel line segments 335b away from the optical axis X; each of the reverse basin structures 338 has two parallel line segments 338b, an arc line 338c and a straight-line segment 338d, wherein the parallel line segments 338b extend towards the direction away from the optical axis X, the arc line 338c is connected to one side of each of the parallel line segments 338b away from the optical axis X, the straight-line segment 338d is connected to the other end of each of the parallel line segments 338b close to the optical axis X FIG. 3F is a coating schematic view of the light blocking sheet 321 according to the 3rd example in FIG. 3A. In FIG. 3F, the light blocking sheet 321 can be made of a plastic material, and the light blocking sheet 321 further includes a coating layer C formed on at least one of the first surface 332 and the second surface 333. In particular, the plastic material can be PA, PE, PET, PI, PMMA or PP. According to the 3rd example, the light blocking sheet 321 is a transparent plastic flake P1, both sides (that is, an object side and an image side) of the transparent plastic flake P1 are coated via the coating layer C. That is, the coating layer C is formed on the first surface 332 and the second surface 333. By the coating layer C, the transmittance of the light blocking sheet 321 can be lowered, the reflectivity of the light blocking sheet 321 can be lowered, the color of the light blocking sheet 321 can be changed, the invisible light can be absorbed, and one of or multiple of the aforementioned effects can be obtained, but the present disclosure is not limited thereto. In FIG. 3F, it should be mentioned that a thickness ratio of the coating layer C to the transparent plastic flake P1 is not illustrated according to the real ratio in order to clearly indicate the composition of the light blocking sheet 321.

Figure 3G:
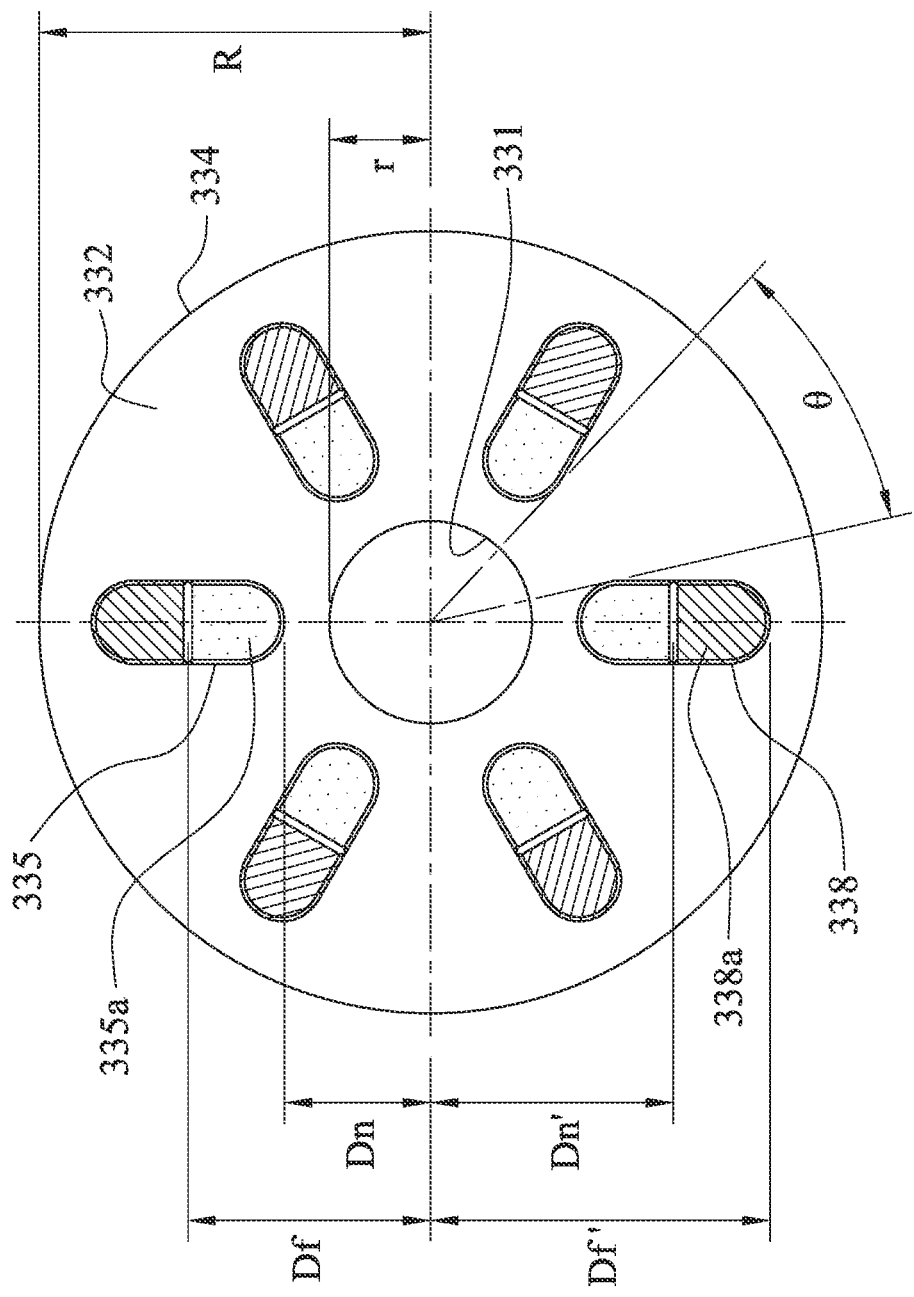
FIG. 3G is a schematic view of parameters of the light blocking sheet according to the 3rd example in FIG. 3A.

FIG. 3G is a schematic view of parameters of the light blocking sheet 321 according to the 3rd example in FIG. 3A. In FIGS. 3B and 3G, when on a direction passing through each of the basin structures 335 and vertical to the optical axis X, a nearest distance between each of the basin structures 335 and the optical axis X is Dn, a farthest distance between each of the basin structures 335 and the optical axis X is Df, a distance between the through hole surface 331 and the optical axis X is r, and a distance between the peripheral surface 334 and the optical axis X is R; a nearest distance between each of the reverse basin structures 338 and the optical axis X is Dn', a farthest distance between each of the reverse basin structures 338 and the optical axis X is Df'; a focal length of the imaging lens assembly 300 is f; a minimum spacing angle between two adjacent of the basin structures 335 on the first surface 332 centered on the optical axis X is θ, each of the minimum spacing angles of each two adjacent of the basin structures 335 is the same, and a total of all of the minimum spacing angles is sum(θ), an area of the concave surface 335a is A, and a ratio between a total of the areas of the concave surfaces 335a of the basin structures 335 and an area of the first surface 332 is ratio(A); on the first surface 332, a depth of each of the basin structures 335 on the optical axis X is H; on the first surface 332, a depth of each of the reverse basin structures 338 on the optical axis X is H'; a distance between the first surface 332 and the second surface 333 of the light blocking sheet 321 on the optical axis X is T; a number of the basin structures 335 is N; a number of the reverse basin structures 338 is N', the following conditions of the Table 3 are satisfied.

TABLE 3

| 3rd example | | | |
|---|---|---|---|
| r (mm) | 0.485 | Dn' (mm) | 1.1625 |
| R (mm) | 1.875 | (Df-Dn')/(R-r) | 0.33 |
| Df (mm) | 1.1625 | H (mm) | 0.01 |
| Dn (mm) | 0.7 | H/T | 0.56 |
| (Df-Dn)/(R-r) | 0.33 | H' (mm) | 0.01 |
| Dn/r | 1.443 | N | 6 |
| Df/R | 0.62 | N' | 6 |
| Dn-r (mm) | 0.215 | θ (degrees) | 34.3 |
| R-Df (mm) | 0.7125 | sum(θ) (degrees) | 205.8 |
| r/R | 0.259 | A (mm$^2$) | 0.1382 |
| f/2r | 2.103 | ratio(A) (%) | 8.05 |
| Df' (mm) | 1.625 | | |

4th Example

Figure 4A:
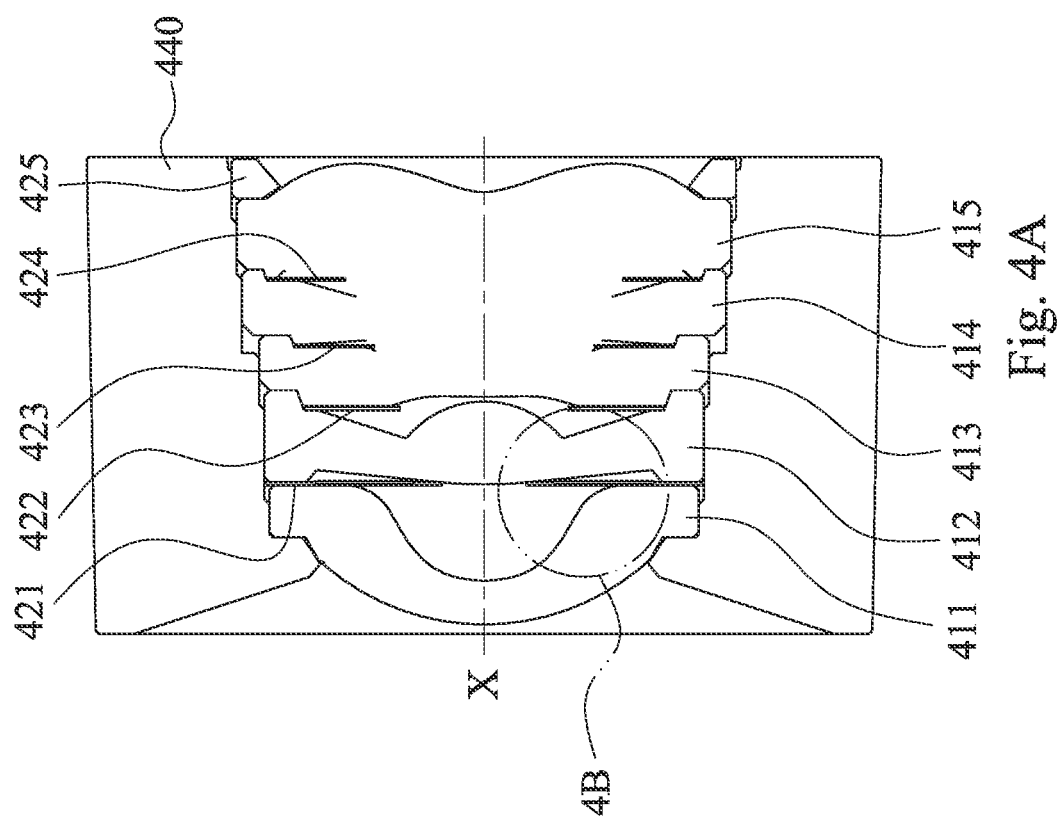
FIG. 4A is a schematic view of an imaging lens assembly according to the 4th example of the present disclosure.

FIG. 4A is a schematic view of an imaging lens assembly 400 according to the 4th example of the present disclosure. In FIG. 4A, the imaging lens assembly 400 has an optical axis X, and includes a plurality of optical elements and a lens barrel 440. It should be mentioned that the imaging lens assembly 400 can further include a plurality of lens barrels, each of the lens barrels includes at least one optical element, and the optical elements are arranged along the optical axis X, but the present disclosure is not limited thereto.

Furthermore, the optical elements can be a lens element, a flat lens element, a light blocking sheet, a spacer, a retainer or a light-folding element, wherein the imaging lens assembly 400 can focus, the light path can be adjusted or the imaging quality can be improved by the aforementioned optical elements, and the lens barrel 440 can accommodate the optical elements. According to the 4th example, the imaging lens assembly 400, in order from an object side to an image side, includes a lens element 411, a light blocking sheet 421, a lens element 412, a light blocking sheet 422, a lens element 413, a light blocking sheet 423, a lens element 414, a light blocking sheet 424, a lens element 415 and a retainer 425. Further, numbers, structures, surface shapes and so on of the optical elements can be disposed according to different imaging demand, other optical elements can be disposed on demands, and the present disclosure is not limited thereto.

Figure 4B:
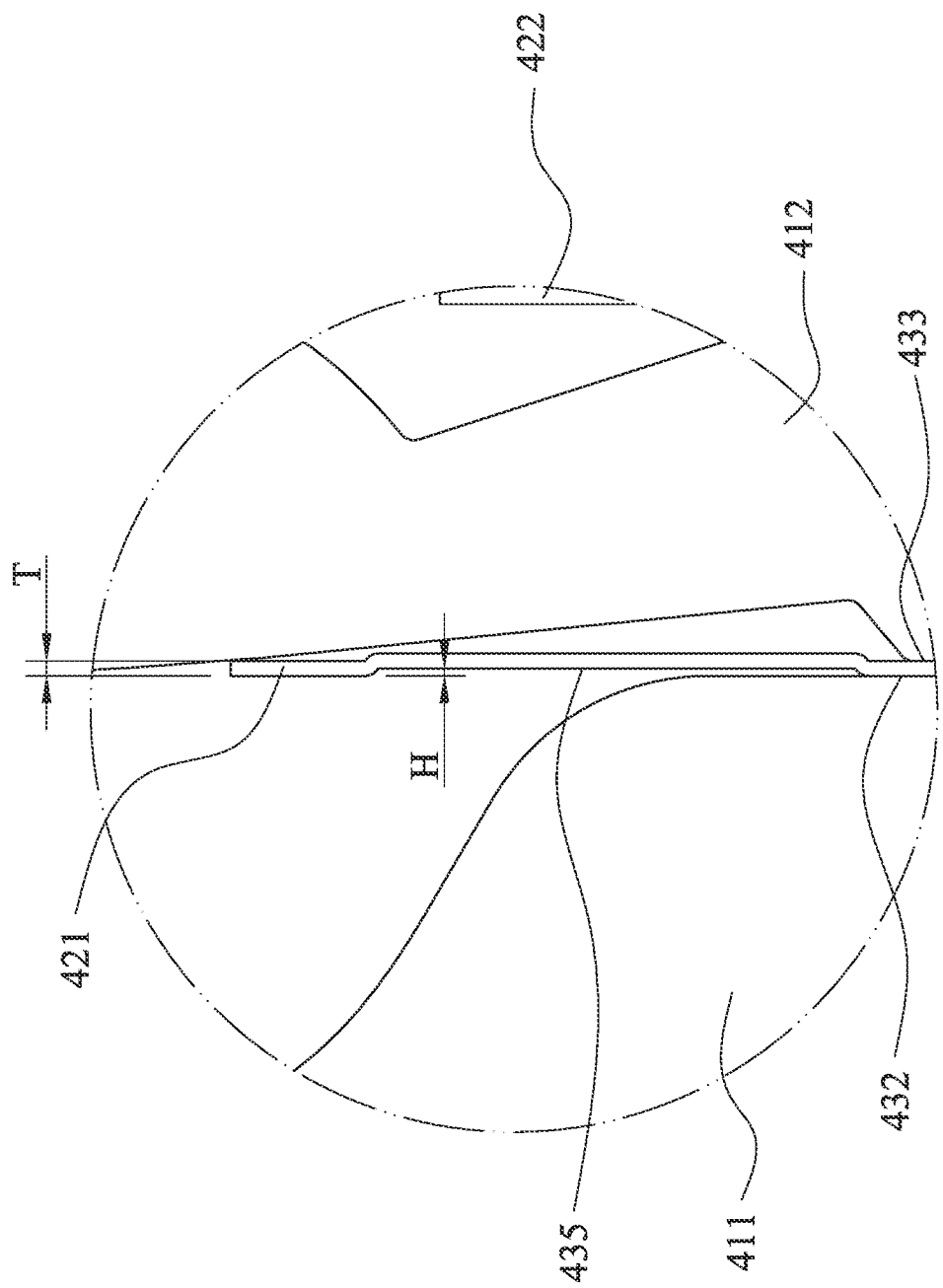
FIG. 4B is a partial enlarged view of the imaging lens assembly according to the 4th example in FIG. 4A.
Figure 4C:
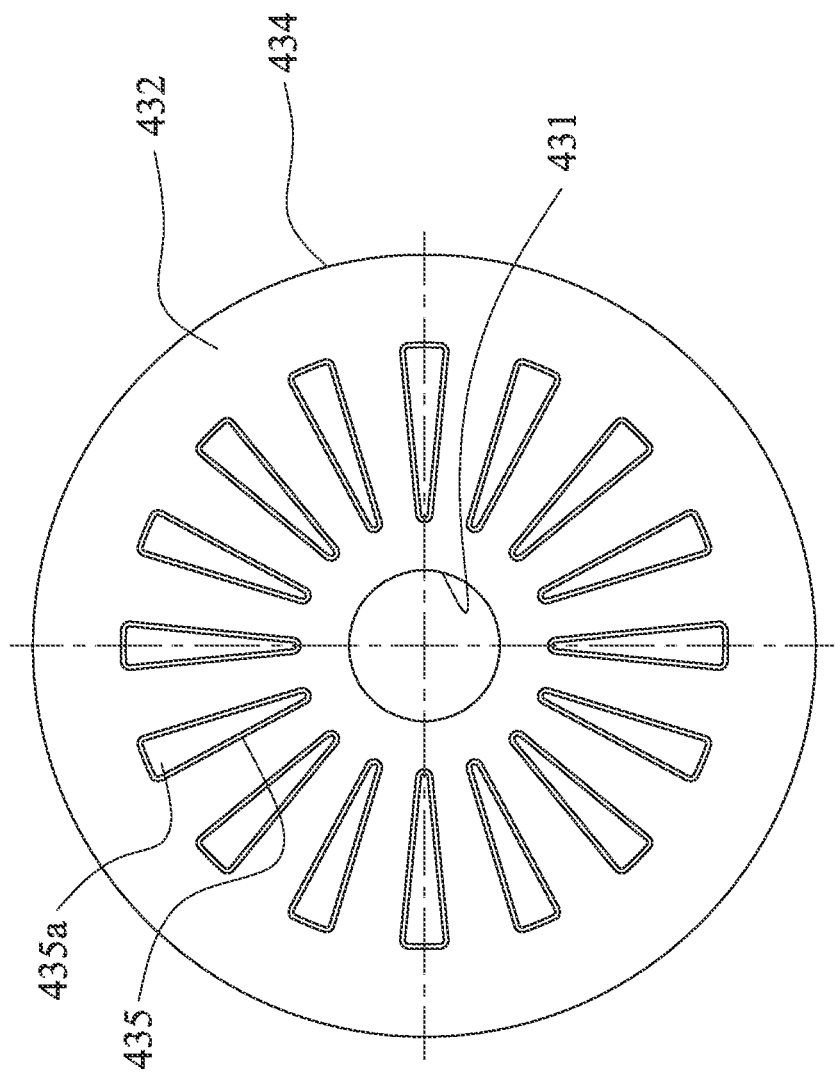
FIG. 4C is a schematic view of the light blocking sheet according to the 4th example in FIG. 4A.
Figure 4D:
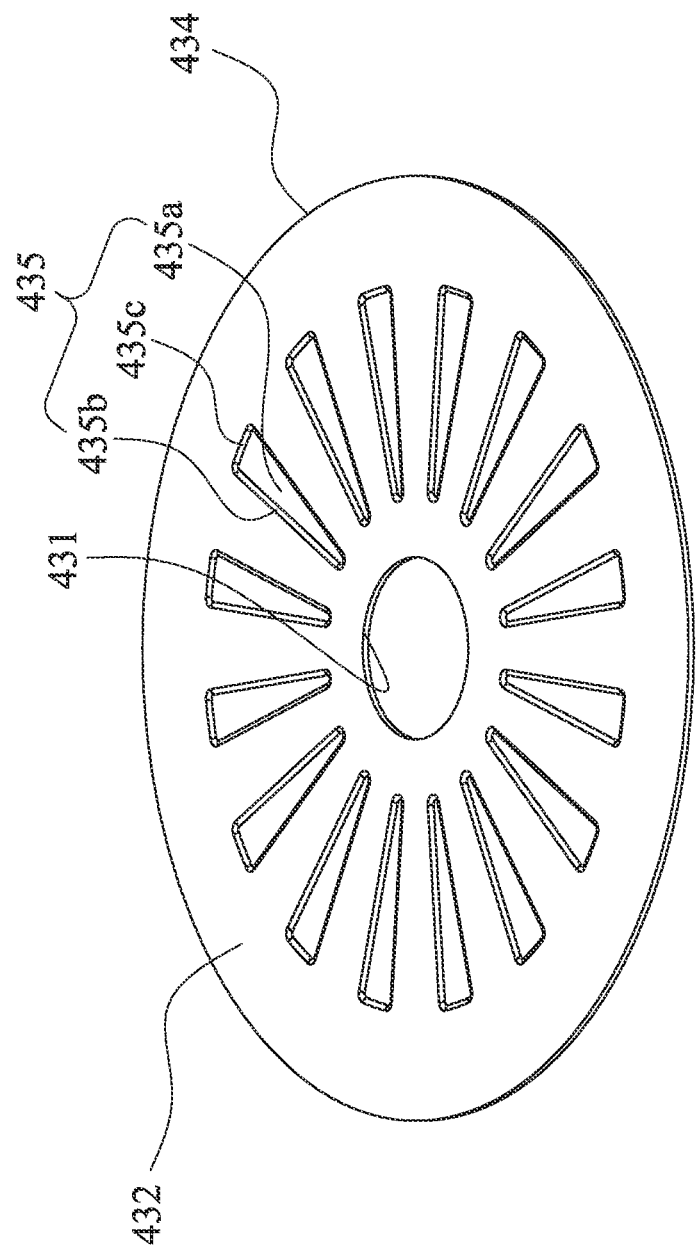
FIG. 4D is another schematic view of the light blocking sheet according to the 4th example in FIG. 4A.

FIG. 4B is a partial enlarged view of the imaging lens assembly 400 according to the 4th example in FIG. 4A. FIG. 4C is a schematic view of the light blocking sheet 421 according to the 4th example in FIG. 4A. FIG. 4D is another schematic view of the light blocking sheet 421 according to the 4th example in FIG. 4A. In FIGS. 4B to 4D, the light blocking sheet 421 includes a through hole surface 431, a first surface 432, a second surface 433, a peripheral surface 434 and a plurality of basin structures 435. The through hole surface 431 surrounds the optical axis X to form an aperture stop of the imaging lens assembly 400. In particular, a through hole is formed by the through hole surface 431 surrounding the optical axis X, and the through hole can be the aperture stop of the imaging lens assembly 400. The first surface 432 is connected to and surrounds the through hole surface 431. The second surface 433 is connected to and surrounds the through hole surface 431, and the first surface 432 and the second surface 433 are relatively disposed. The peripheral surface 434 is connected to the first surface 432 and the second surface 433, and the peripheral surface 434 is farther from the optical axis X than the through hole surface 431 from the optical axis X.

In detail, the light blocking sheet 421 can be used to block the non-imaging light and adjust the clear aperture. Further, the light blocking sheet 421 can be manufactured via the stamping process. The residual stress is possibly acted on the light blocking sheet 421 after the stamping process, and the light blocking sheet 421 may be deformed by the residual stress. The imaging quality would be influenced by the deformation of the light blocking sheet 421. Especially, when the through hole of the light blocking sheet 421 is deformed or shifted, the occurrence of unexpected stray light may take place. Hence, the resistant to the deformation along the optical axis X of the light blocking sheet 421 can be provided by the basin structures 435 of the light blocking sheet 421, and the deformation and the displacement of the through hole can be reduced. Therefore, the imaging quality can be maintained, the imaging quality is hardly changed over time, and the foreign factors, which influence the light blocking sheet 421, can be further resisted. In particular, the foreign factors are the impact caused by falling, the temperature variation, the humidity variation or the high temperature and high humidity environment, but the present disclosure is not limited thereto.

In FIGS. 4A and 4B, the first surface 432 of the light blocking sheet 421 faces towards an object side of the imaging lens assembly 400, the second surface 433 of the light blocking sheet 421 faces towards an image side of the imaging lens assembly 400, the light blocking sheet 421 is interposed between the lens elements 411, 412, and the interposing position is farther from the optical axis X than the basin structures 435 from the optical axis X. Moreover, the peripheral surface 434 of the light blocking sheet 421 is directly contacted with the lens barrel 440.

In FIGS. 4C and 4D, the basin structures 435 are arranged in interval and around the optical axis X, each of the basin structures 435 is caved in from the first surface 432 to the second surface 433, and each of the basin structures 435 protrudes on the second surface 433 to form a concave surface 435a. In detail, each of the concave surfaces 435a has two parallel line segments 435b and an arc line 435c, the parallel line segments 435b extend and gradually expand towards a direction away from the optical axis X, a side, which is away from the optical axis X, of each of the parallel line segments 435b is connected to the arc line 435c, and a closed shape is formed by the other end, which is close to the optical axis X, of the each of the parallel line segments 435b connected to a fillet (its reference numeral is omitted). Hence, each of the basin structures 435 extends and gradually expands towards the direction away from the optical axis X. Further, the fillet can be further disposed on each of the connecting portions between each of the parallel line segments 435b and the arc line 435c.

Figure 4E:
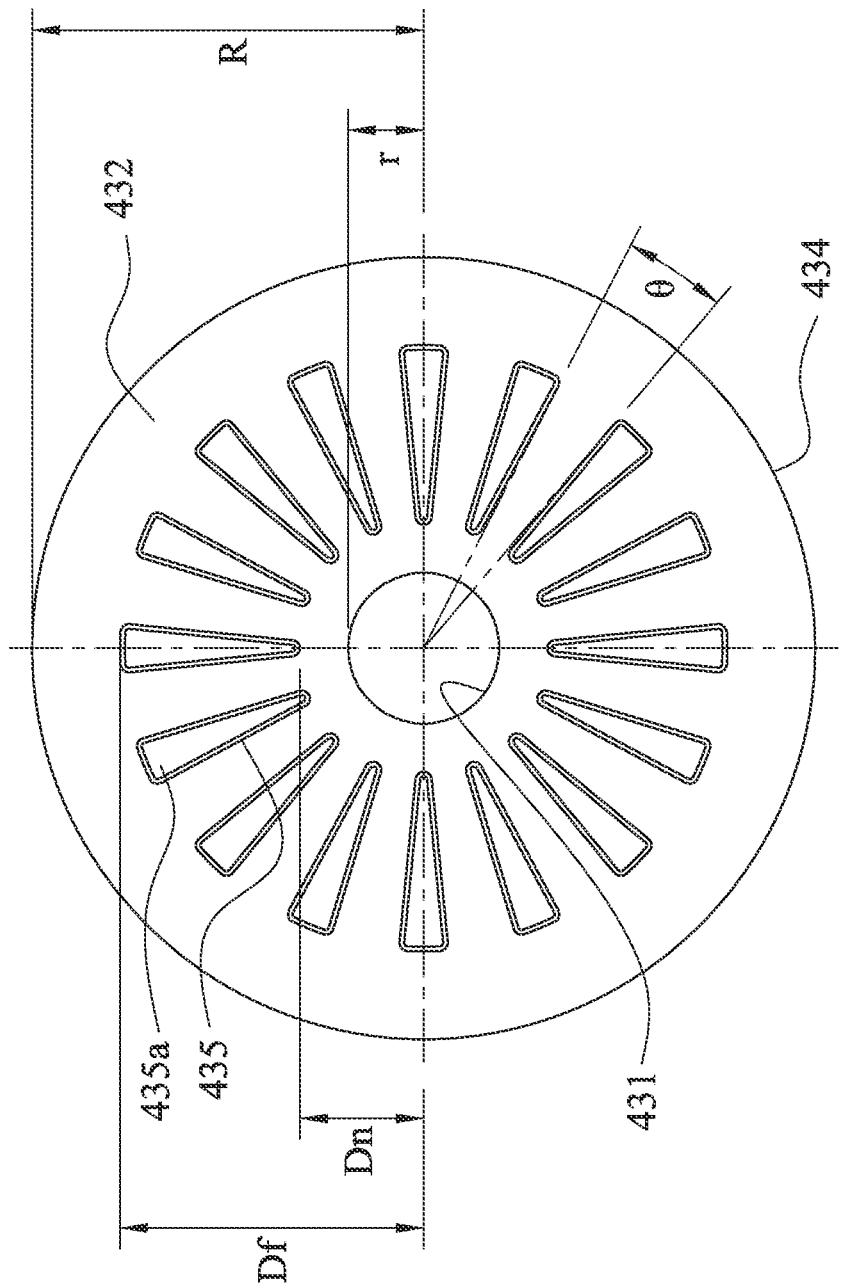
FIG. 4E is a schematic view of parameters of the light blocking sheet according to the 4th example in FIG. 4A.

FIG. 4E is a schematic view of parameters of the light blocking sheet 421 according to the 4th example in FIG. 4A. In FIGS. 4B and 4E, when on a direction passing through each of the basin structures 435 and vertical to the optical axis X, a nearest distance between each of the basin structures 435 and the optical axis X is Dn, a farthest distance between each of the basin structures 435 and the optical axis X is Df, a distance between the through hole surface 431 and the optical axis X is r, and a distance between the peripheral surface 434 and the optical axis X is R; a focal length of the imaging lens assembly 400 is f; a minimum spacing angle between two adjacent of the basin structures 435 on the first surface 432 centered on the optical axis X is θ, each of the minimum spacing angles of each two adjacent of the basin structures 435 is the same, and a total of all of the minimum spacing angles is sum(θ); an area of the concave surface 435a is A, and a ratio between a total of the areas of the concave surfaces 435a of the basin structures 435 and an area of the first surface 432 is ratio(A); on the first surface 432, a depth of each of the basin structures 435 on the optical axis X is H; a distance between the first surface 432 and the second surface 433 of the light blocking sheet 421 on the optical axis X is T; a number of the basin structures 435 is N, the following conditions of the Table 4 are satisfied.

TABLE 4

4th example

| r (mm) | 0.425 | r/R | 0.193 |
|---|---|---|---|
| R (mm) | 2.2 | f/2r | 1.824 |
| Df (mm) | 1.7055 | H (mm) | 0.015 |
| Dn (mm) | 0.6945 | H/T | 0.50 |
| (Df-Dn)/(R-r) | 0.57 | N | 16 |
| Dn/r | 1.634 | θ (degrees) | 13.1 |
| Df/R | 0.775 | sum(θ) (degrees) | 209.6 |
| Dn-r (mm) | 0.2695 | A (mm$^2$) | 0.1228 |
| R-Df (mm) | 0.4945 | ratio(A) (%) | 13.42 |

5th Example

Figure 5A:
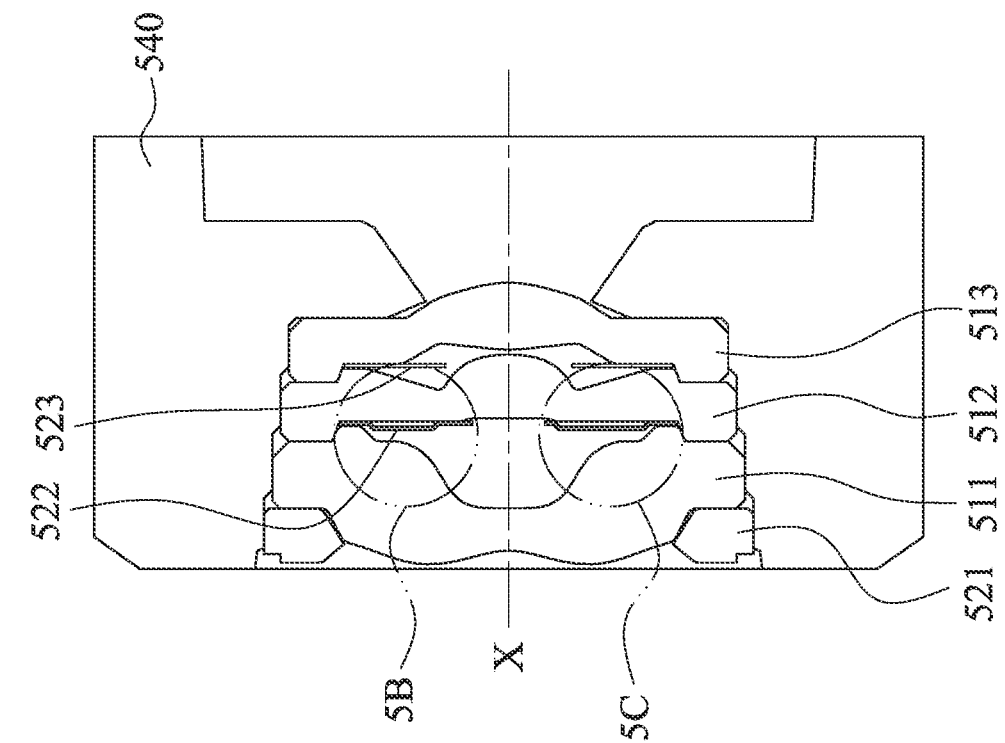
FIG. 5A is a schematic view of an imaging lens assembly according to the 5th example of the present disclosure.

FIG. 5A is a schematic view of an imaging lens assembly 500 according to the 5th example of the present disclosure. In FIG. 5A, the imaging lens assembly 500 has an optical axis X, and includes a plurality of optical elements and a lens barrel 540. It should be mentioned that the imaging lens assembly 500 can further include a plurality of lens barrels, each of the lens barrels includes at least one optical element, and the optical elements are arranged along the optical axis X, but the present disclosure is not limited thereto.

Furthermore, the optical elements can be a lens element, a flat lens element, a light blocking sheet, a spacer, a retainer or a light-folding element, wherein the imaging lens assembly 500 can focus, the light path can be adjusted or the imaging quality can be improved by the aforementioned optical elements, and the lens barrel 540 can accommodate the optical elements. According to the 5th example, the imaging lens assembly 500, in order from an object side to an image side, includes a retainer 521, a lens element 511, a light blocking sheet 522, a lens element 512, a light blocking sheet 523 and a lens element 513. Further, numbers, structures, surface shapes and so on of the optical elements can be disposed according to different imaging demand, other optical elements can be disposed on demands, and the present disclosure is not limited thereto.

Figure 5C:
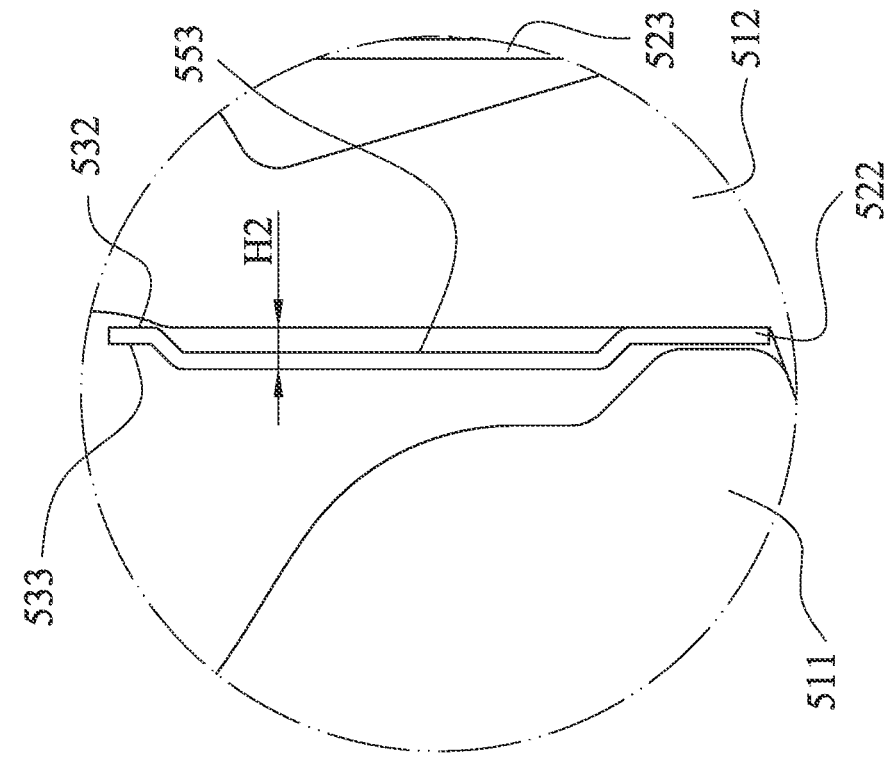
FIG. 5C is another partial enlarged view of the imaging lens assembly according to the 5th example in FIG. 5A.
Figure 5B:
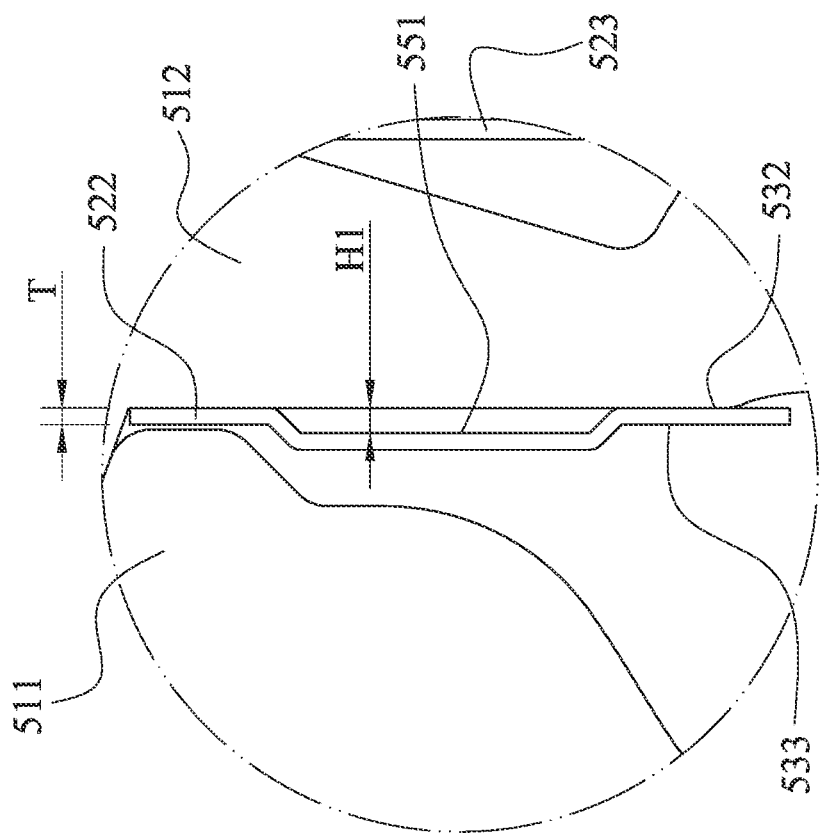
FIG. 5B is a partial enlarged view of the imaging lens assembly according to the 5th example in FIG. 5A.
Figure 5D:
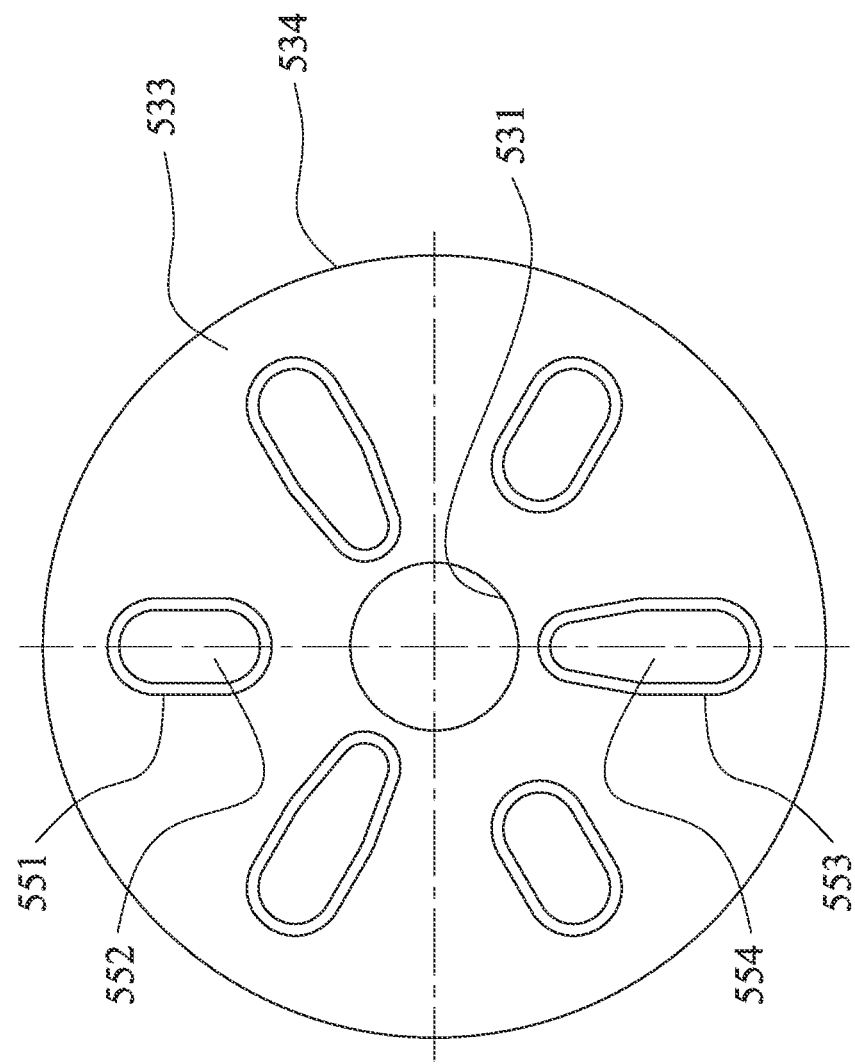
FIG. 5D is a schematic view of the light blocking sheet according to the 5th example in FIG. 5A.
Figure 5E:
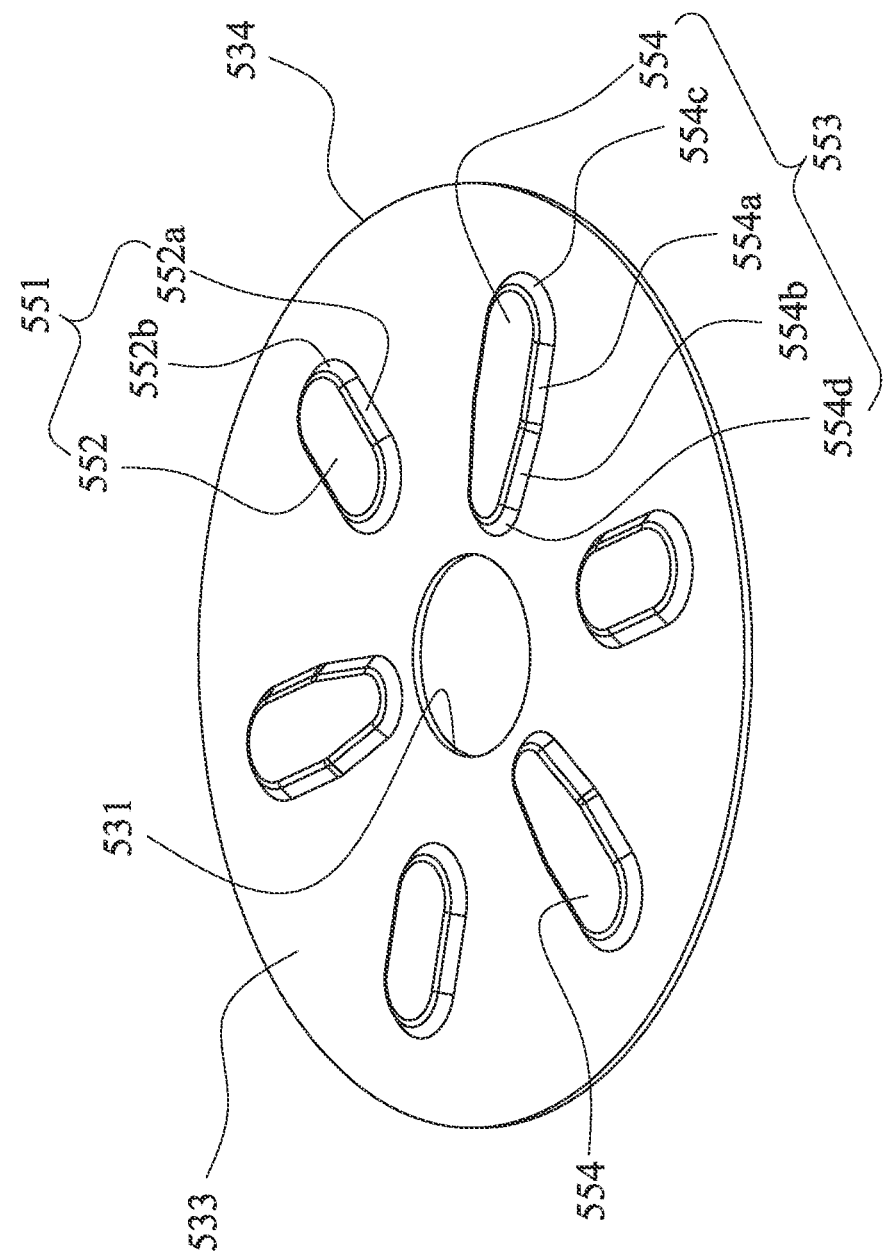
FIG. 5E is another schematic view of the light blocking sheet according to the 5th example in FIG. 5A.

FIG. 5B is a partial enlarged view of the imaging lens assembly 500 according to the 5th example in FIG. 5A. FIG. 5C is another partial enlarged view of the imaging lens assembly 500 according to the 5th example in FIG. 5A. FIG. 5D is a schematic view of the light blocking sheet 522 according to the 5th example in FIG. 5A. FIG. 5E is another schematic view of the light blocking sheet 522 according to the 5th example in FIG. 5A. In FIGS. 5B to 5E, the light blocking sheet 522 includes a through hole surface 531, a first surface 532, a second surface 533, a peripheral surface 534, a plurality of first basin structures 551 and a plurality of second basin structures 553. The through hole surface 531 surrounds the optical axis X to form an aperture stop of the imaging lens assembly 500. In particular, a through hole is formed by the through hole surface 531 surrounding the optical axis X, and the through hole can be the aperture stop of the imaging lens assembly 500. The first surface 532 is connected to and surrounds the through hole surface 531. The second surface 533 is connected to and surrounds the through hole surface 531, and the first surface 532 and the second surface 533 are relatively disposed. The peripheral surface 534 is connected to the first surface 532 and the second surface 533, and the peripheral surface 534 is farther from the optical axis X than the through hole surface 531 from the optical axis X.

In detail, the light blocking sheet 522 can be used to block the non-imaging light and adjust the clear aperture. Further, the light blocking sheet 522 can be manufactured via the stamping process. The residual stress is possibly acted on the light blocking sheet 522 after the stamping process, and the light blocking sheet 522 may be deformed by the residual stress. The imaging quality would be influenced by the deformation of the light blocking sheet 522. Especially, when the through hole of the light blocking sheet 522 is deformed or shifted, the occurrence of unexpected stray light may take place. Hence, the resistant to the deformation along the optical axis X of the light blocking sheet 522 can be provided by the first basin structures 551 and the second basin structures 553 of the light blocking sheet 522, and the deformation and the displacement of the through hole can be reduced. Therefore, the imaging quality can be maintained, the imaging quality is hardly changed over time, and the foreign factors, which influence the light blocking sheet 522, can be further resisted. In particular, the foreign factors are the impact caused by falling, the temperature variation, the humidity variation or the high temperature and high humidity environment, but the present disclosure is not limited thereto.

In FIGS. 5B and 5C, the first surface 532 of the light blocking sheet 522 faces towards an image side of the imaging lens assembly 500, the second surface 533 of the light blocking sheet 522 faces towards an object side of the imaging lens assembly 500, the light blocking sheet 522 is interposed between the lens elements 511, 512, and the interposing position is farther from the optical axis X than the first basin structures 551 and the second basin structures 553 from the optical axis X.

In FIGS. 5D and 5E, the first basin structures 551 and the second basin structures 553 are arranged in interval and around the optical axis X, and the first basin structures 551 and the second basin structures 553 are adjacently arranged on a circumferential direction centered on the optical axis X. A length of each of the second basin structures 553 at a radiation direction centered on the optical axis X is longer than a length of each of the first basin structures 551 at the radiation direction centered on the optical axis X, and the second basin structures 553 is closer to the through hole surface 531 than the first basin structures 551 to the through hole surface 531.

Each of the first basin structures 551 is caved in from the first surface 532 to the second surface 533, and each of the first basin structures 551 protrudes on the second surface 533 to form a first concave surface 552. Each of the second basin structures 553 is caved in from the first surface 532 to the second surface 533, and each of the second basin structures 553 protrudes on the second surface 533 to form a second concave surface 554. In detail, the shape of each of the first concave surfaces 552 is oblong, wherein each of the first concave surfaces 552 has two parallel line segments 552a and two semi arcs 552b, the parallel line segments 552a extend towards a direction away from the optical axis X and are parallel to each other, and the semi arcs 552b are connected to two sides of the parallel line segments 552a away from the optical axis X and the other two sides of the parallel line segments 552a close to the optical axis X, respectively; the shape of each the second concave surfaces 554 is bullet-shaped, wherein each of the second concave surfaces 554 has two parallel line segments 554a, two straight-line segments 554b, an arc 554c and a fillet 554d, the parallel line segments 554a extend towards the direction away from the optical axis X and are parallel to each other, the straight-line segments 554b extend and gradually expand towards the direction away from the optical axis X, the arc 554c is connected to a side of each of the parallel line segments 554a away from the optical axis X, and the fillet 554d is connected to a side of each of straight-line segments 554b close to the optical axis X.

Figure 5F:
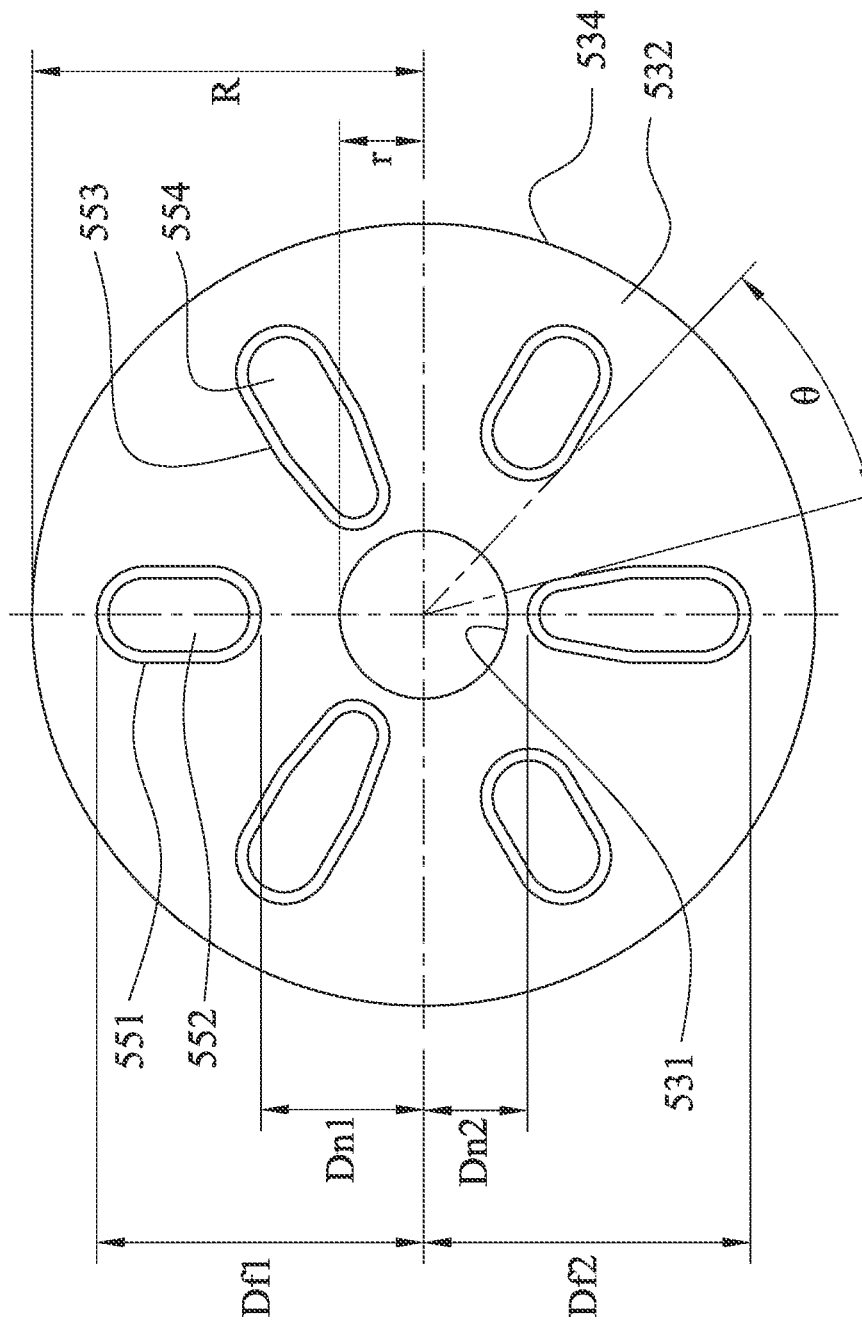
FIG. 5F is a schematic view of parameters of the light blocking sheet according to the 5th example in FIG. 5A.

FIG. 5F is a schematic view of parameters of the light blocking sheet 522 according to the 5th example in FIG. 5A. In FIGS. 5B, 5C and 5F, when on a direction passing through each of the first basin structures 551 and vertical to the optical axis X, a nearest distance between each of the first basin structures 551 and the optical axis X is Dn1, a farthest distance between each of the first basin structures 551 and the optical axis X is Df1, a distance between the through hole surface 531 and the optical axis X is r, and a distance between the peripheral surface 534 and the optical axis X is R; a nearest distance between each of the second basin structures 553 and the optical axis X is Dn2, a farthest distance between each of the second basin structures 553 and the optical axis X is Df2; a focal length of the imaging lens assembly 500 is f; a minimum spacing angle between two adjacent of the basin structures (according to the 5th example, the basin structures are the first basin structures 551 and the second basin structures 553) on the first surface 532 centered on the optical axis X is θ, each of the minimum spacing angles of each adjacent of the first basin structures 551 and the second basin structures 553 is the same, and a total of all of the minimum spacing angles is sum(θ), an area of the first concave surfaces 552 is A1, an area of the second concave surfaces 554 is A2, and a ratio between a total of the areas of the concave surfaces of the basin structures (according to the 5th example, the total of the areas of the concave surfaces is the total of the area of the first concave surfaces 552 of the first basin structures 551 and the total of the second concave surfaces 554 of the second basin structures 553) and an area of the first surface 532 is ratio(A); on the first surface 532, a depth of each of the first basin structures 551 on the optical axis X is H1, and a depth of each of the second basin structures 553 on the optical axis X is H2; a distance between the first surface 532 and the second surface 533 of the light blocking sheet 522 on the optical axis X is T; a number of the first basin structures 551 is N1, and a number of the second basin structures 553 is N2, the following conditions of the Table 5 are satisfied.

TABLE 5

| 5th example | | | |
|---|---|---|---|
| r (mm) | 0.215 | Dn2 (mm) | 0.265 |
| R (mm) | 1.0 | (Df2-Dn2)/(R-r) | 0.73 |
| Df1 (mm) | 0.835 | H1 (mm) | 0.03 |
| Dn1 (mm) | 0.415 | H1/T | 1.50 |
| (Df1-Dn1)/(R-r) | 0.54 | H2 (mm) | 0.03 |
| Dn1/r | 1.930 | N1 | 3 |
| Df1/R | 0.835 | N2 | 3 |
| Dn1-r (mm) | 0.2 | θ (degrees) | 31.8 |
| R-Df1 (mm) | 0.165 | sum(θ) (degrees) | 190.8 |
| r/R | 0.215 | A1 (mm²) | 0.0598 |
| f/2r | 0.791 | A2 (mm²) | 0.0808 |
| Df2 (mm) | 0.835 | ratio(A) (%) | 14.08 |

6th Example

FIG. 6A is a schematic view of an imaging lens assembly 600 according to the 6th example of the present disclosure. In FIG. 6A, the imaging lens assembly 600 has an optical axis X, and includes a plurality of optical elements and a lens barrel 640. It should be mentioned that the imaging lens assembly 600 can further include a plurality of lens barrels, each of the lens barrels includes at least one optical element, and the optical element is arranged along the optical axis X, but the present disclosure is not limited thereto.

Furthermore, the optical element can be a lens element, a flat lens element, a light blocking sheet, a spacer, a retainer or a light-folding element, wherein the imaging lens assembly 600 can focus, the light path can be adjusted or the imaging quality can be improved by the aforementioned optical elements, and the lens barrel 640 can accommodate the optical elements. According to the 6th example, the imaging lens assembly 600, in order from an object side to an image side, includes a lens element 611, a lens element 612, a light blocking sheet 621, a lens element 613, a light blocking sheet 622, a lens element 614, a light blocking sheet 623, a lens element 615, a spacer 624, a lens element 616, a spacer 625, a light blocking sheet 626, a lens element 617 and a retainer 627. Further, numbers, structures, surface shapes and so on of the optical elements can be disposed according to different imaging demand, other optical elements can be disposed on demands, and the present disclosure is not limited thereto.

Figure 6B:
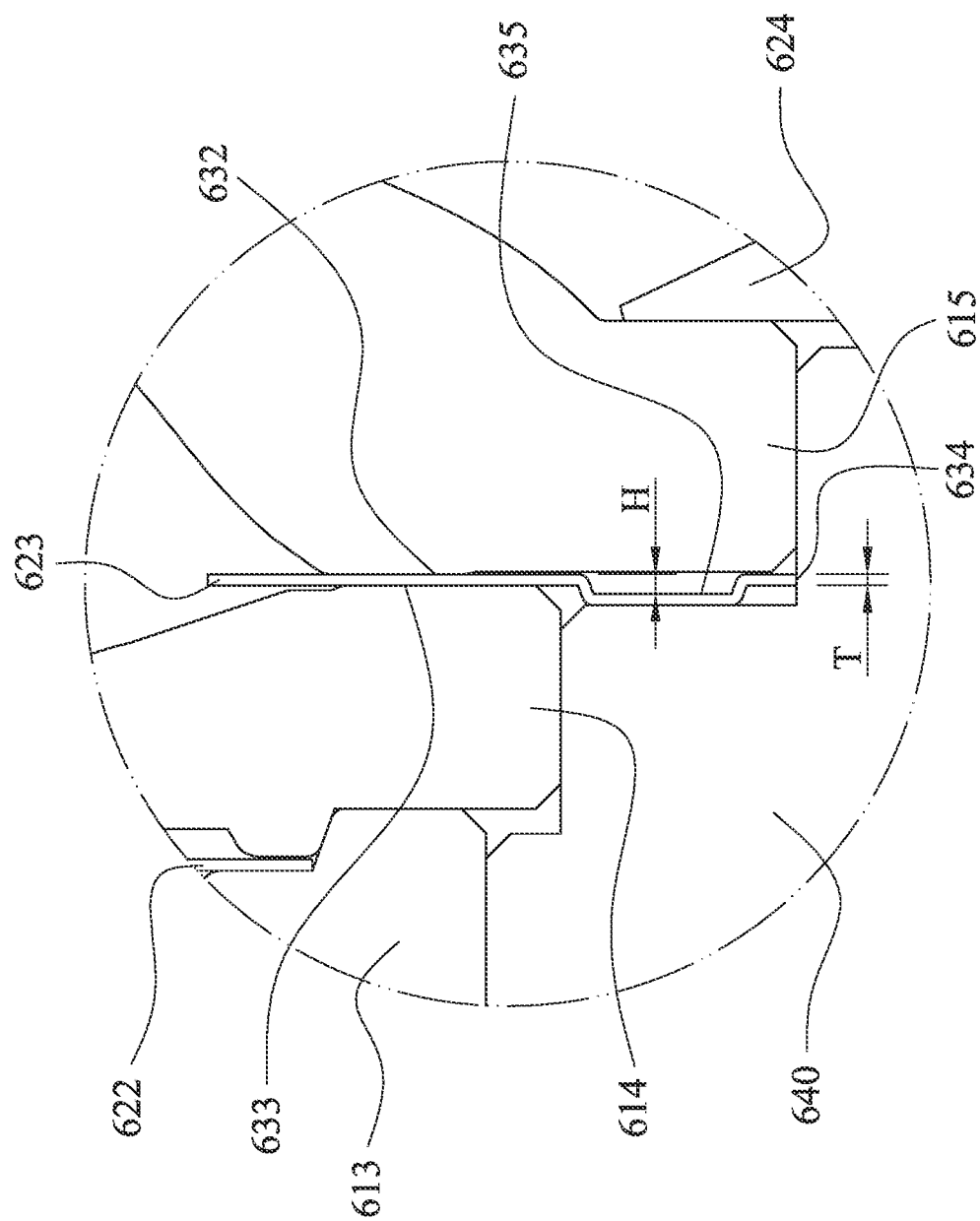
FIG. 6B is a partial enlarged view of the imaging lens assembly according to the 6th example in FIG. 6A.
Figure 6C:
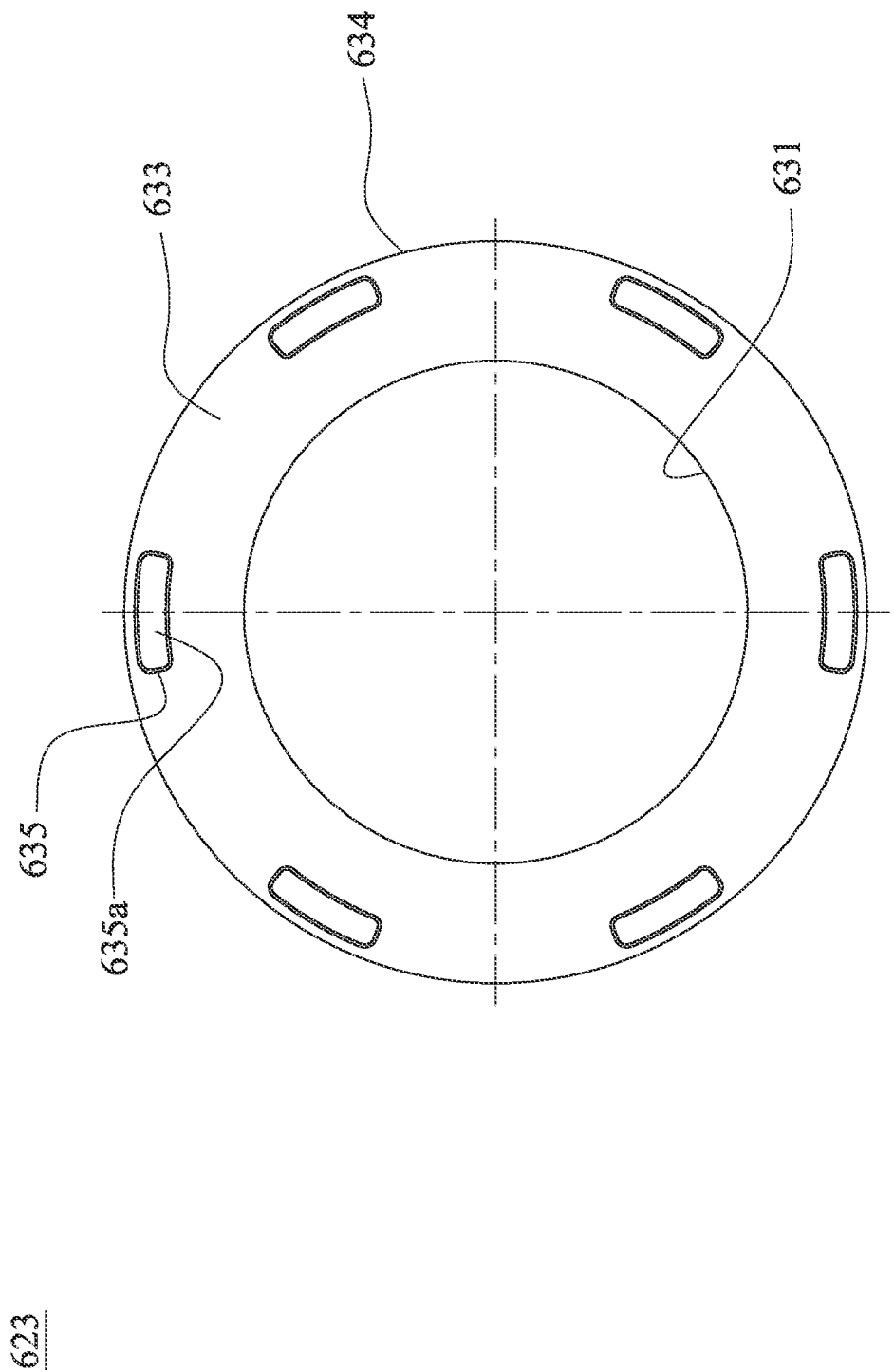
FIG. 6C is a schematic view of the light blocking sheet according to the 6th example in FIG. 6A.
Figure 6D:
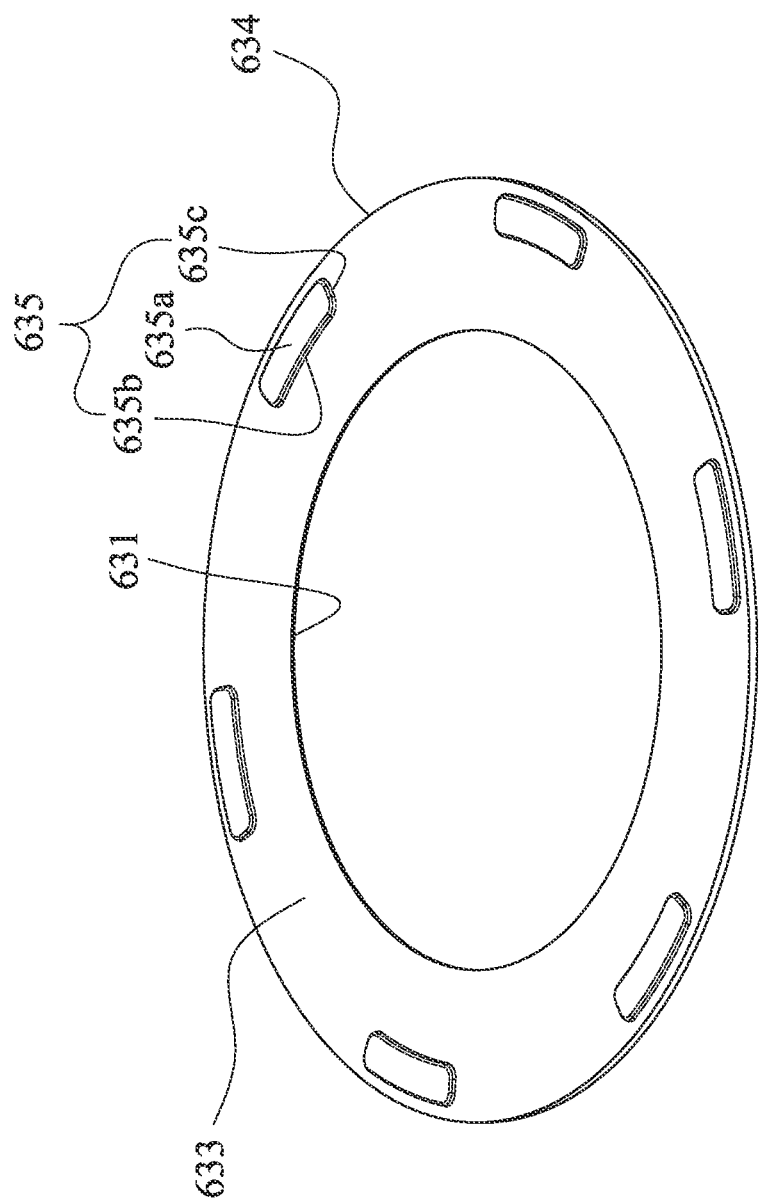
FIG. 6D is another schematic view of the light blocking sheet according to the 6th example in FIG. 6A.

FIG. 6B is a partial enlarged view of the imaging lens assembly 600 according to the 6th example in FIG. 6A. FIG. 6C is a schematic view of the light blocking sheet 623 according to the 6th example in FIG. 6A. FIG. 6D is another schematic view of the light blocking sheet 623 according to the 6th example in FIG. 6A. In FIGS. 6B to 6D, the light blocking sheet 623 includes a through hole surface 631, a first surface 632, a second surface 633, a peripheral surface 634 and a plurality of basin structures 635. The through hole surface 631 surrounds the optical axis X to form an aperture stop of the imaging lens assembly 600. In particular, a through hole is formed by the through hole surface 631 surrounding the optical axis X, and the through hole can be the aperture stop of the imaging lens assembly 600. The first surface 632 is connected to and surrounds the through hole surface 631. The second surface 633 is connected to and surrounds the through hole surface 631, and the first surface 632 and the second surface 633 are relatively disposed. The peripheral surface 634 is connected to the first surface 632 and the second surface 633, and the peripheral surface 634 is farther from the optical axis X than the through hole surface 631 from the optical axis X.

In detail, the light blocking sheet 623 can be used to block the non-imaging light and adjust the clear aperture. Further, the light blocking sheet 623 can be manufactured via the stamping process. The residual stress is possibly acted on the light blocking sheet 623 after the stamping process, and the light blocking sheet 623 may be deformed by the residual stress. The imaging quality would be influenced by the deformation of the light blocking sheet 623. Especially, when the through hole of the light blocking sheet 623 is deformed or shifted, the occurrence of unexpected stray light may take place. Hence, the resistant to the deformation along the optical axis X of the light blocking sheet 623 can be provided by the basin structures 635 of the light blocking sheet 623, and the deformation and the displacement of the through hole can be reduced. Therefore, the imaging quality can be maintained, the imaging quality is hardly changed over time, and the foreign factors, which influence the light blocking sheet 623, can be further resisted. In particular, the foreign factors are the impact caused by falling, the temperature variation, the humidity variation or the high temperature and high humidity environment, but the present disclosure is not limited thereto.

In FIG. 6B, the first surface 632 of the light blocking sheet 623 faces towards an image side of the imaging lens assembly 600, the second surface 633 of the light blocking sheet 623 faces towards an object side of the imaging lens assembly 600, the light blocking sheet 623 is interposed between the lens elements 614, 615, and the interposing position is closer to the optical axis X than the basin structures 635 to the optical axis X. In particular, the peripheral surface 634 of the light blocking sheet 623 is directly contacted with the lens barrel 640, and the basin structure 635 can further face towards the lens barrel 640 of the imaging lens assembly 600.

In FIGS. 6C and 6D, the basin structures 635 extend and gradually expand towards a direction away from the optical axis X, and the basin structures 635 are arranged in interval and around the optical axis X. Each of the basin structures 635 is caved in from the first surface 632 to the second surface 633, and each of the basin structures 635 protrudes on the second surface 633 to form a concave surface 635a. In detail, each of the concave surfaces 635a has two straight-line segments 635b and two arc lines 635c, wherein the straight-line segments 635b gradually expand towards the direction away from the optical axis X, each of the straight-line segments 635b is connected to two sides of the arc lines 635c, each of the arc lines 635c has different radii centered on the optical axis X, and a closed shape is formed by the straight-line segments 635b and the arc lines 635c. Furthermore, fillets can be disposed on the connections between the straight-line segments 635b and the arc lines 635c.

Figure 6E:
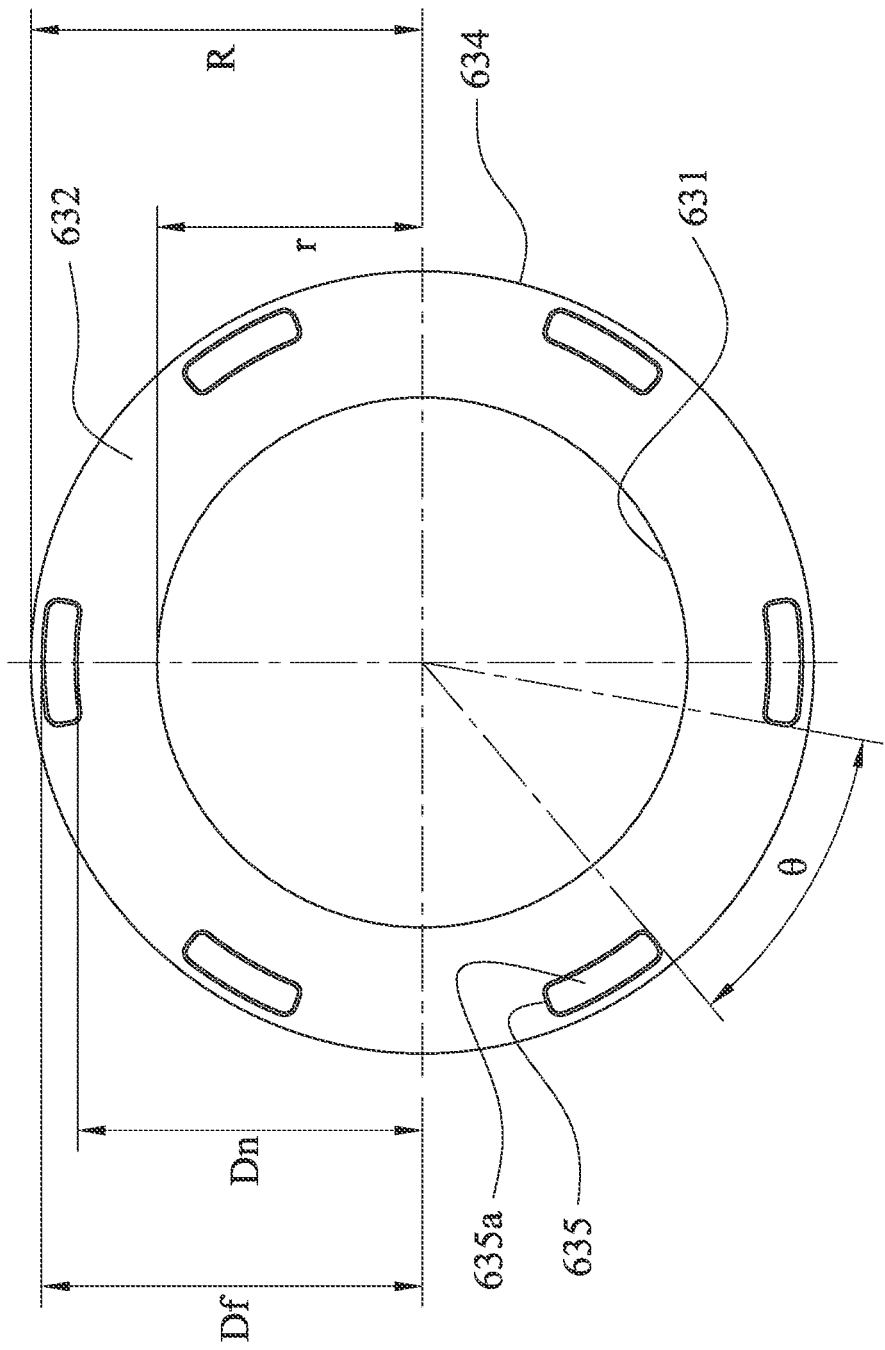
FIG. 6E is a schematic view of parameters of the light blocking sheet according to the 6th example in FIG. 6A.

FIG. 6E is a schematic view of parameters of the light blocking sheet 623 according to the 6th example in FIG. 6A. In FIGS. 6B and 6E, when on a direction passing through each of the basin structures 635 and vertical to the optical axis X, a nearest distance between each of the basin structures 635 and the optical axis X is Dn, a farthest distance between each of the basin structures 635 and the optical axis X is Df, a distance between the through hole surface 631 and the optical axis X is r, and a distance between the peripheral surface 634 and the optical axis X is R; a focal length of the imaging lens assembly 600 is f; a minimum spacing angle between two adjacent of the basin structures 635 on the first surface 632 centered on the optical axis X is θ, each of the minimum spacing angles of each two adjacent of the basin structures 635 is the same, and a total of all of the minimum spacing angles is sum(θ), an area of the concave surface 635a is A, and a ratio between a total of the areas of the concave surfaces 635a of the basin structures 635 and an area of the first surface 632 is ratio(A); on the first surface 632, a depth of each of the basin structures 635 on the optical axis X is H; a distance between the first surface 632 and the second surface 633 of the light blocking sheet 623 on the optical axis X is T; a number of the basin structures 635 is N, the following conditions of the Table 6 are satisfied.

TABLE 6

| 6th example | | | |
|---|---|---|---|
| r (mm) | 2.49 | r/R | 0.680 |
| R (mm) | 3.675 | f/2r | 1.367 |
| Df (mm) | 3.575 | H (mm) | 0.04 |

TABLE 6-continued

| 6th example | | | |
|---|---|---|---|
| Dn (mm) | 3.235 | H/T | 1.74 |
| (Df-Dn)/(R-r) | 0.29 | N | 6 |
| Dn/r | 1.299 | θ (degrees) | 40.0 |
| Df/R | 0.973 | sum(θ) (degrees) | 240.0 |
| Dn-r (mm) | 0.745 | A (mm²) | 0.3072 |
| R-Df (mm) | 0.1 | ratio(A) (%) | 8.03 |

7th Example

Figure 7A:
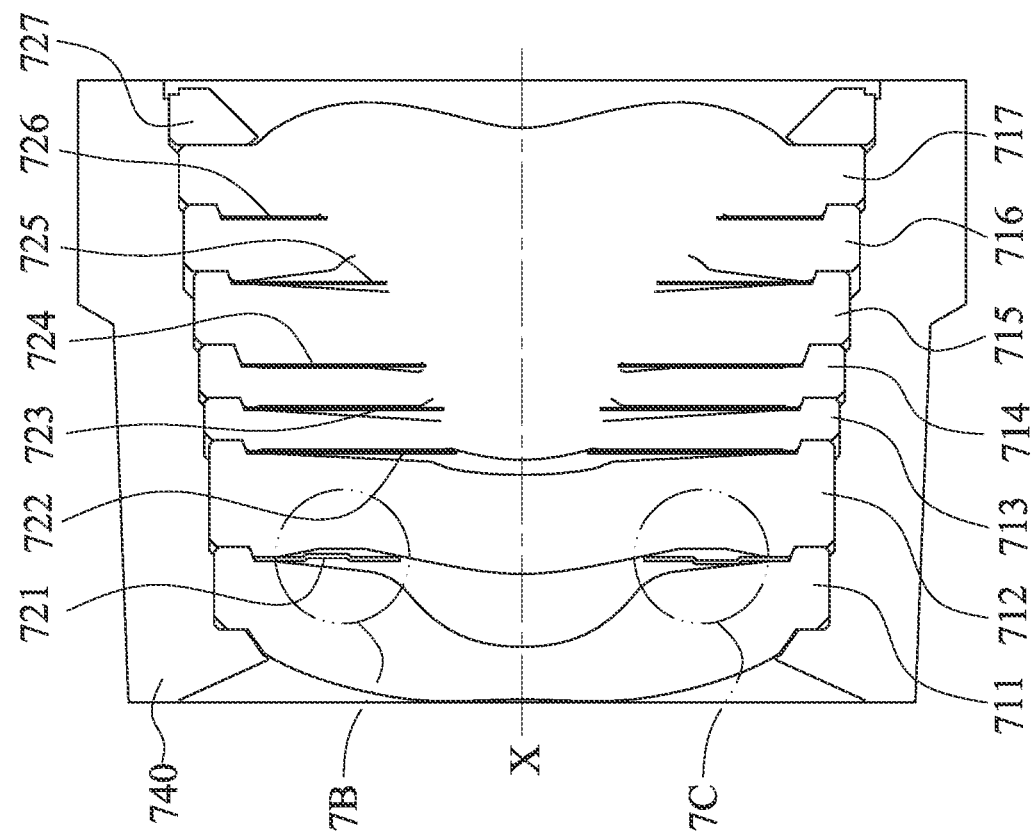
FIG. 7A is a schematic view of an imaging lens assembly according to the 7th example of the present disclosure.

FIG. 7A is a schematic view of an imaging lens assembly 700 according to the 7th example of the present disclosure. In FIG. 7A, the imaging lens assembly 700 has an optical axis X, and includes a plurality of optical elements and a lens barrel 740. It should be mentioned that the imaging lens assembly 700 can further include a plurality of lens barrels, each of the lens barrels includes at least one optical element, and the optical element is arranged along the optical axis X, but the present disclosure is not limited thereto.

Furthermore, the optical element can be a lens element, a flat lens element, a light blocking sheet, a spacer, a retainer or a light-folding element, wherein the imaging lens assembly 700 can focus, the light path can be adjusted or the imaging quality can be improved by the aforementioned optical elements, and the lens barrel 740 can accommodate the optical elements. According to the 7th example, the imaging lens assembly 700, in order from an object side to an image side, includes a lens element 711, a light blocking sheet 721, a lens element 712, a light blocking sheet 722, a lens element 713, a light blocking sheet 723, a lens element 714, a light blocking sheet 724, a lens element 715, a light blocking sheet 725, a lens element 716, a light blocking sheet 726, a lens element 717 and a retainer 727. Further, numbers, structures, surface shapes and so on of the optical elements can be disposed according to different imaging demand, other optical elements can be disposed on demands, and the present disclosure is not limited thereto.

Figure 7D:
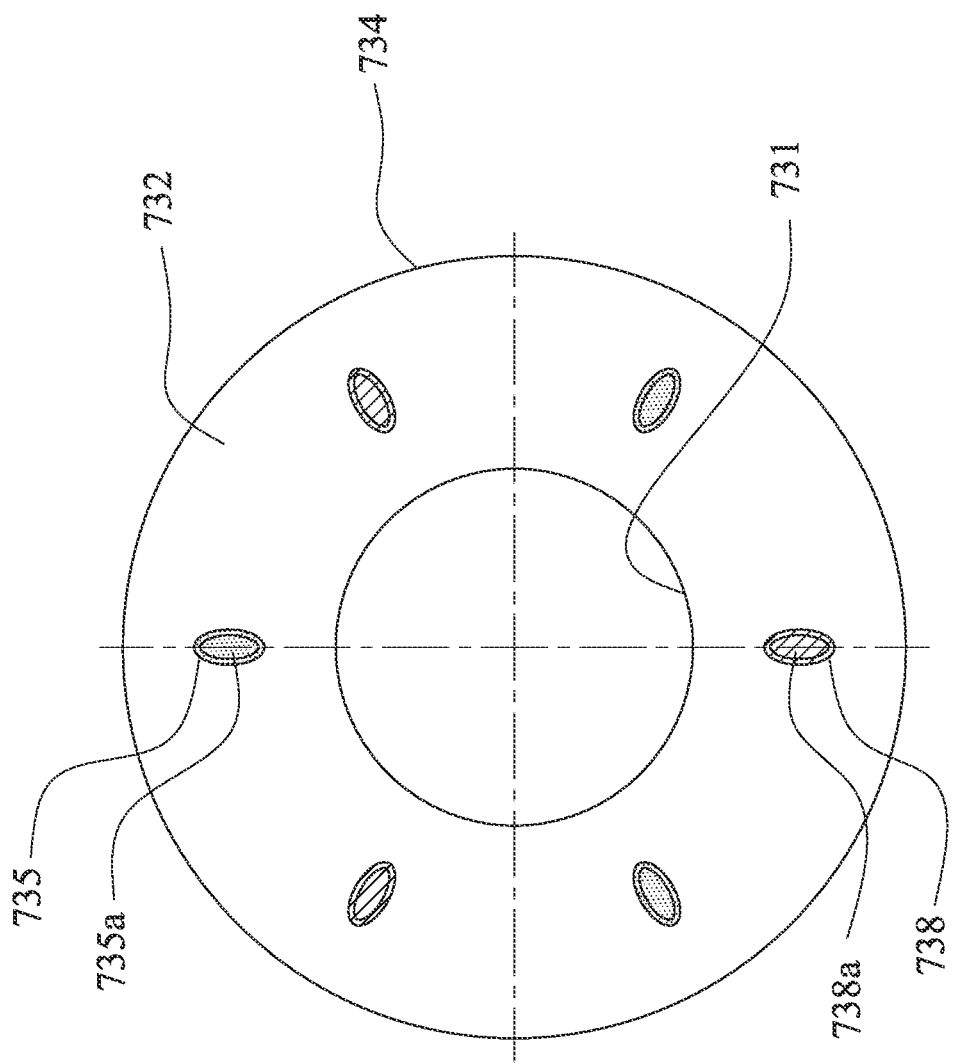
FIG. 7D is a schematic view of the light blocking sheet according to the 7th example in FIG. 7A.
Figure 7E:
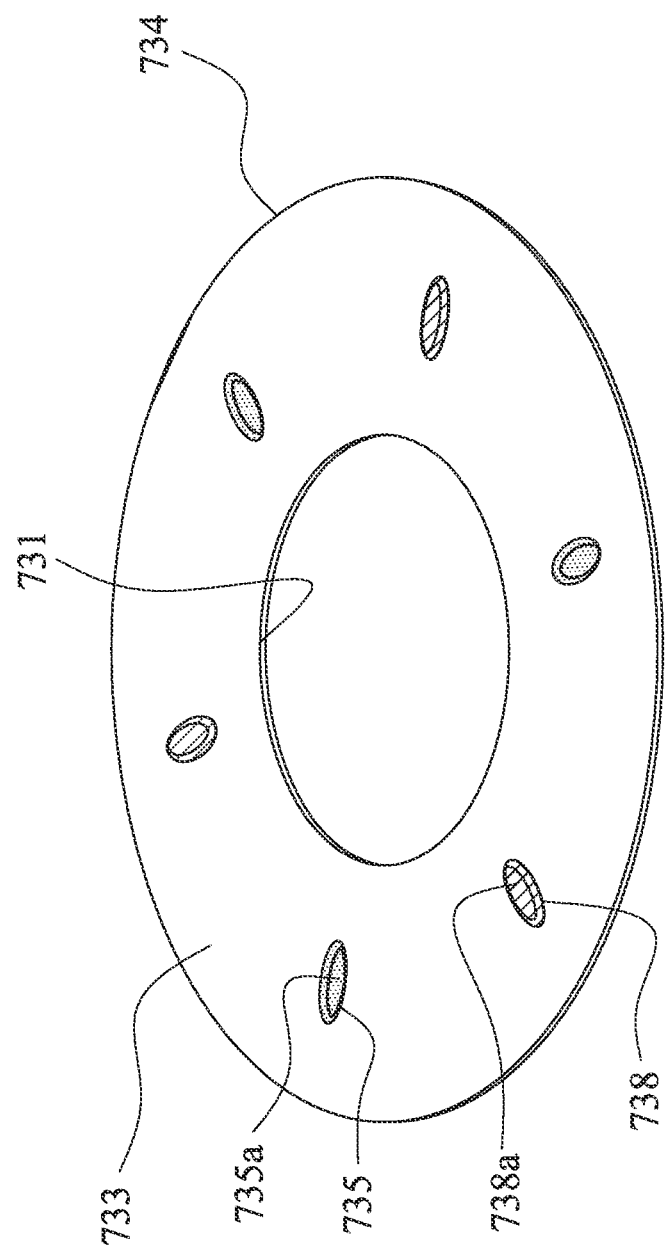
FIG. 7E is another schematic view of the light blocking sheet according to the 7th example in FIG. 7A.

FIG. 7B is a partial enlarged view of the imaging lens assembly 700 according to the 7th example in FIG. 7A. FIG. 7C is another partial enlarged view of the imaging lens assembly 700 according to the 7th example in FIG. 7A. FIG. 7D is a schematic view of the light blocking sheet 721 according to the 7th example in FIG. 7A. FIG. 7E is another schematic view of the light blocking sheet 721 according to the 7th example in FIG. 7A. In FIGS. 7B to 7E, the light blocking sheet 721 includes a through hole surface 731, a first surface 732, a second surface 733, a peripheral surface 734, a plurality of basin structures 735 and a plurality of reverse basin structures 738. The through hole surface 731 surrounds the optical axis X to form an aperture stop of the imaging lens assembly 700. In particular, a through hole is formed by the through hole surface 731 surrounding the optical axis X, and the through hole can be the aperture stop of the imaging lens assembly 700. The first surface 732 is connected to and surrounds the through hole surface 731. The second surface 733 is connected to and surrounds the through hole surface 731, and the first surface 732 and the second surface 733 are relatively disposed. The peripheral surface 734 is connected to the first surface 732 and the second surface 733, and the peripheral surface 734 is farther from the optical axis X than the through hole surface 731 from the optical axis X.

In detail, the light blocking sheet 721 can be used to block the non-imaging light and adjust the clear aperture. Further, the light blocking sheet 721 can be manufactured via the stamping process. The residual stress is possibly acted on the light blocking sheet 721 after the stamping process, and the light blocking sheet 721 may be deformed by the residual stress. The imaging quality would be influenced by the deformation of the light blocking sheet 721. Especially, when the through hole of the light blocking sheet 721 is deformed or shifted, the occurrence of unexpected stray light may take place. Hence, the resistant to the deformation along the optical axis X of the light blocking sheet 721 can be provided by the basin structures 735 and the reverse basin structures 738 of the light blocking sheet 721, and the deformation and the displacement of the through hole can be reduced. Therefore, the imaging quality can be maintained, the imaging quality is hardly changed over time, and the foreign factors, which influence the light blocking sheet 721, can be further resisted. In particular, the foreign factors are the impact caused by falling, the temperature variation, the humidity variation or the high temperature and high humidity environment, but the present disclosure is not limited thereto.

In FIGS. 7B and 7C, the first surface 732 of the light blocking sheet 721 faces towards an object side of the imaging lens assembly 700, the second surface 733 of the light blocking sheet 721 faces towards an image side of the imaging lens assembly 700, the light blocking sheet 721 is interposed between the lens elements 711, 712, and the interposing position is farther from the optical axis X than the basin structures 735 and the reverse basin structures 738 from the optical axis X.

In FIGS. 7D and 7E, the basin structures 735 and the reverse basin structures 738 are arranged in interval and around the optical axis X, wherein each of the basin structures 735 is caved in from the first surface 732 to the second surface 733, and each of the basin structures 735 protrudes on the second surface 733 to form a concave surface 735$a$; each of the reverse basin structures 738 is caved in from the second surface 733 to the first surface 732, and each of the reverse basin structures 738 protrudes on the first surface 732 to form a convex surface 738$a$. The displacement of the through hole along the optical axis X can be further resisted by the cooperation between the basin structures 735 and the reverse basin structures 738.

The shape of each of the concave surfaces 735$a$ of the of the basin structures 735 is oval, wherein the basin structures 735 gradually expand towards the direction away from the optical axis X and then gradually shrink and seal towards the direction away from the optical axis X. Further, the shape of each of the convex surfaces 738$a$ of the reverse basin structure 738 is the same as the shape of each of the concave surfaces 735$a$, and both of a number of the basin structures 735 and a number of the reverse basin structures 738 are three.

Figure 7F:
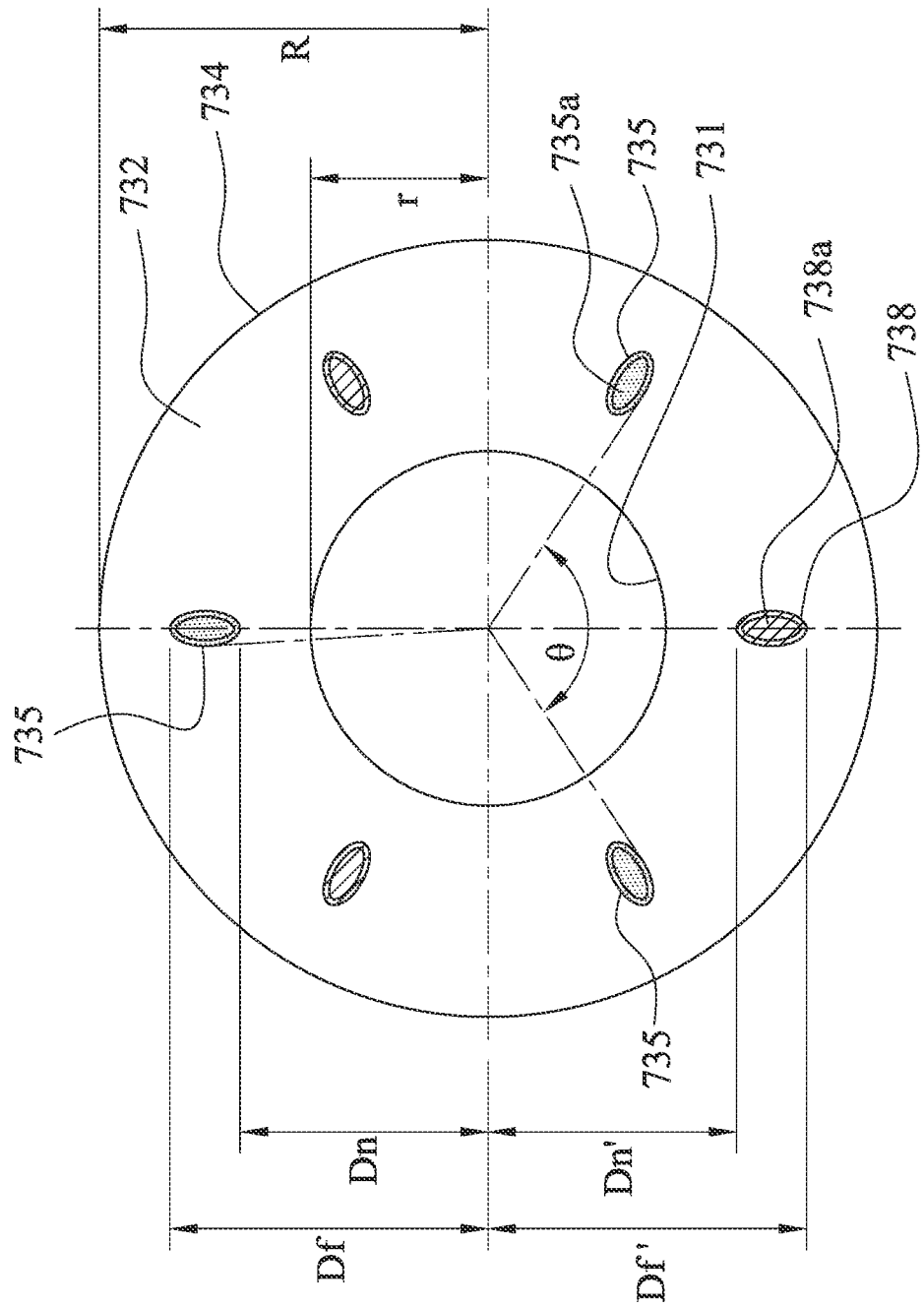
FIG. 7F is a schematic view of parameters of the light blocking sheet according to the 7th example in FIG. 7A.

FIG. 7F is a schematic view of parameters of the light blocking sheet 721 according to the 7th example in FIG. 7A. In FIGS. 7B, 7C and 7F, when on a direction passing through each of the basin structures 735 and vertical to the optical axis X, a nearest distance between each of the basin structures 735 and the optical axis X is Dn, a farthest distance between each of the basin structures 735 and the optical axis X is Df, a distance between the through hole surface 731 and the optical axis X is r, and a distance between the peripheral surface 734 and the optical axis X is R; a nearest distance between each of the reverse basin structures 738 and the optical axis X is Dn', a farthest distance between each of the reverse basin structures 738 and the optical axis X is Df; a focal length of the imaging lens assembly 700 is f; a minimum spacing angle between two adjacent of the basin structures 735 on the first surface 732 centered on the optical axis X is θ, each of the minimum spacing angles of each two adjacent of the basin structures 735 is the same, and a total of all of the minimum spacing angles is sum(θ); an area of the concave surface 735$a$ is A, and a ratio between a total of the areas of the concave surfaces 735$a$ of the basin structures 735 and an area of the first surface 732 is ratio(A); on the first surface 732, a depth of each of the basin structures 735 on the optical axis X is H; on the first surface 732, a depth of each of the reverse basin structures 738 on the optical axis X is H'; a distance between the first surface 732 and the second surface 733 of the light blocking sheet 721 on the optical axis X is T; a number of the basin structures 735 is N; a number of the reverse basin structures 738 is N', the following conditions of the Table 7 are satisfied.

TABLE 7

| 7th example | | | |
|---|---|---|---|
| r (mm) | 1.21 | Dn' (mm) | 1.69 |
| R (mm) | 2.65 | (Df-Dn')/(R-r) | 0.33 |
| Df (mm) | 2.17 | H (mm) | 0.03 |
| Dn (mm) | 1.69 | H/T | 0.75 |
| (Df-Dn)/(R-r) | 0.33 | H' (mm) | 0.03 |
| Dn/r | 1.397 | N | 3 |
| Df/R | 0.819 | N' | 3 |
| Dn-r (mm) | 0.48 | θ (degrees) | 112.8 |
| R-Df (mm) | 0.48 | sum(θ) (degrees) | 338.4 |
| r/R | 0.457 | A (mm$^2$) | 0.0496 |
| f/2r | 0.806 | ratio(A) (%) | 0.85 |
| Df (mm) | 2.17 | | |

8th Example

Figure 8A:
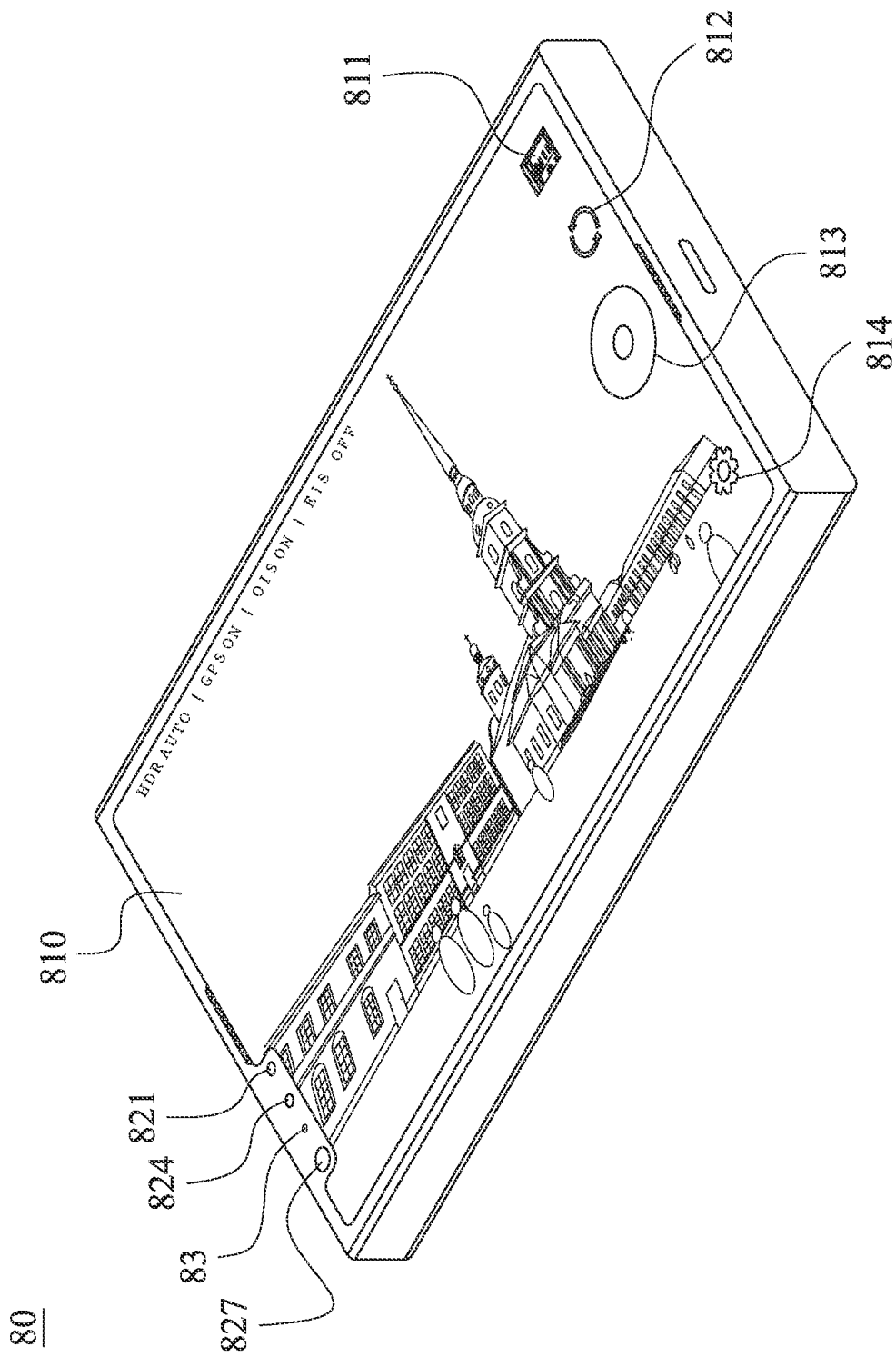
FIG. 8A is a schematic view of an electronic device according to the 8th example of the present disclosure.
Figure 8B:
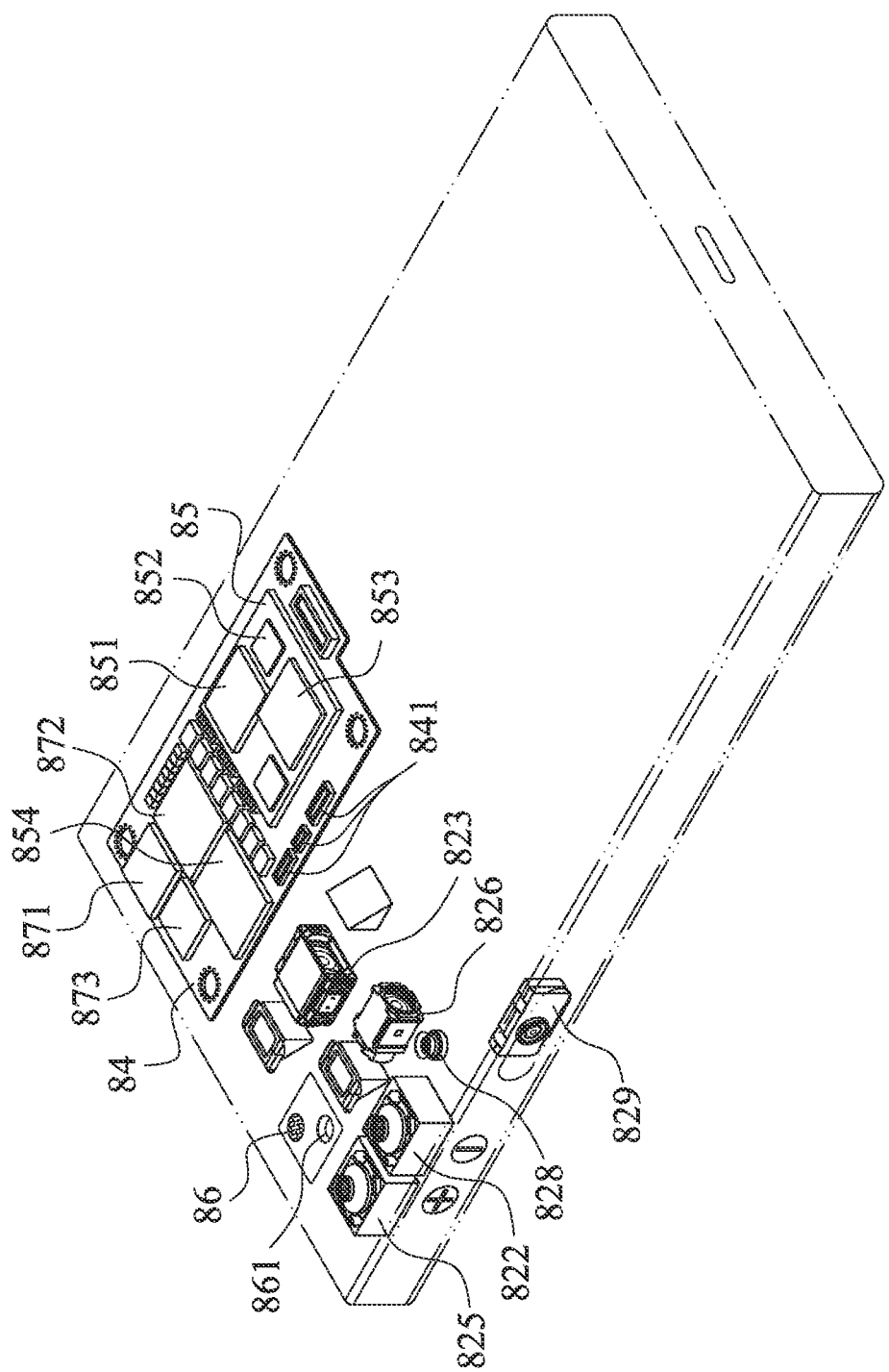
FIG. 8B is another schematic view of the electronic device according to the 8th example in FIG. 8A.

FIG. 8A is a schematic view of an electronic device 80 according to the 8th example of the present disclosure. FIG. 8B is another schematic view of the electronic device 80 according to the 8th example in FIG. 8A. In FIGS. 8A and 8B, the electronic device 80 is a smart phone. Further, the electronic device also can be a laptop, a tablet or a tachograph, but the present disclosure is not limited thereto. The electronic device 80 includes an image capturing apparatus (its reference numeral is omitted), an image sensor (not shown) and a imaging control interface 810, wherein the image capturing apparatus includes an imaging lens assembly, the image sensor is corresponding to the image capturing apparatus, and the image sensor is disposed on an image surface (not shown) of the imaging lens assembly.

According to the 8th example, the imaging lens assembly includes ultra-wide angle image capturing apparatuses 821, 822, an ultra-telephoto image capturing apparatus 823, wide-angle image capturing apparatuses 824, 825, a telephoto image capturing apparatus 826, a time-of-flight (TOF) module 827, a macro image capturing apparatus 828 and a biometric sensing image capturing apparatus 829, wherein the TOF module 827 and the biometric sensing image capturing apparatus 829 can be another image capturing apparatuses with other functions, but the disposition is not limited thereto. In particular, the imaging lens assembly can be one of the imaging lens assemblies according to the aforementioned 1st example to the 7th example, but the present disclosure is not limited thereto.

According to the 8th example, the ultra-wide angle image capturing apparatus 821, the wide-angle image capturing apparatus 824 and the TOF module 827 are disposed on a front of the electronic device 80, the ultra-wide angle image capturing apparatus 822, the ultra-telephoto image capturing apparatus 823, the wide-angle image capturing apparatus 825, the telephoto image capturing apparatus 826 and the macro image capturing apparatus 828 are disposed on a back of the electronic device 80, and the biometric sensing image capturing apparatus 829 is disposed on a side of the electronic device 80.

The imaging control interface 810 can be touch screen for displaying the scene and having the touch function, and the shooting angle can be manually adjusted. In detail, the imaging control interface 810 includes an image replay button 811, an image capturing switching button 812, a focus capturing button 813 and an integrated menu button 814. Furthermore, users enter a shooting mode via the imaging control interface 810, the image capturing switching button 812 is configured to switch one of the ultra-wide angle image capturing apparatuses 821, 822, the ultra-telephoto image capturing apparatus 823, the wide-angle image capturing apparatuses 824, 825, the telephoto image capturing apparatus 826 and the macro image capturing apparatus 828 to capture the image, the users use the focus capturing button 813 to undergo image capturing after capturing the images and confirming one of the ultra-wide angle image capturing apparatuses 821, 822, the ultra-telephoto image capturing apparatus 823, the wide-angle image capturing apparatuses 824, 825, the telephoto image capturing apparatus 826 and the macro image capturing apparatus 828, the users can view the images by the image replay button 811 after undergoing image capturing, and the integrated menu button 814 is configured to adjust the details of the image capturing (such as timed photo, photo ratio, and etc.).

The electronic device 80 can further include a reminding light 83, and the reminding light 83 is disposed on the front of the electronic device 80 and can be configured to remind the users of unread messages, missed calls and the condition of the phone.

Moreover, after entering the shooting mode via the imaging control interface 810 of the electronic device 80, the imaging light is gathered on the image sensor via the imaging lens assembly, and an electronic signal about an image is output to an image signal processor (ISP) 851 of a single chip system 85. The single chip system 85 can further include a random access memory (RAM) 852, a central processing unit 853 and a storage unit 854. Also, the single chip system 85 can further include, but not be limited to, a display, a control unit, a read-only memory (ROM), or the combination thereof.

To meet a specification of the electronic device 80, the electronic device 80 can further include an optical anti-shake mechanism (not shown). Furthermore, the electronic device 80 can further include at least one focusing assisting module 86 and at least one sensing element (not shown). The focusing assisting module 86 can include a flash module 861 for compensating a color temperature, an infrared distance measurement component (not shown), a laser focus module (not shown), etc. The sensing element can have functions for sensing physical momentum and kinetic energy, such as an accelerator (not shown), a gyroscope 871, a Hall Effect Element (not shown), a position locator 872, a signal transmitter module 873, to sense shaking or jitters applied by hands of the user or external environments. Accordingly, the electronic device 80 equipped with an auto-focusing mechanism and the optical anti-shake mechanism can be enhanced to achieve the superior image quality. Furthermore, the electronic device 80 according to the present disclosure can have a capturing function with multiple modes, such as taking optimized selfies, high dynamic range (HDR) under a low light condition, 4K resolution recording, etc. Furthermore, the users can visually see a captured image of the camera through the imaging control interface 810 and manually operate the view finding range on the imaging control interface 810 to achieve the autofocus function of what you see is what you get.

Moreover, the imaging lens assembly, the image sensor, the optical anti-shake mechanism, the sensing element and the focusing assisting module 86 can be disposed on a circuit board 84 and electrically connected to the associated components via a connector 841 to perform a capturing process, wherein the circuit board 84 can be a flexible printed circuit board (FPC). Since the current electronic devices, such as smart phones, have a tendency of being compact, the way of firstly disposing the imaging lens assembly and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the imaging lens assembly can also be controlled more flexibly via the touch screen of the electronic device. According to the 8th embodiment, the sensing elements and the focusing assisting modules 86 are disposed on the circuit board 84 and at least one other flexible printed circuit board (not shown) and electrically connected to the associated components, such as the image signal processor, via corresponding connectors to perform the capturing process. In other embodiments (not shown), the sensing elements and the focusing assisting modules can also be disposed on the main board of the electronic device or carrier boards of other types according to requirements of the mechanical design and the circuit layout.

Figure 8C:
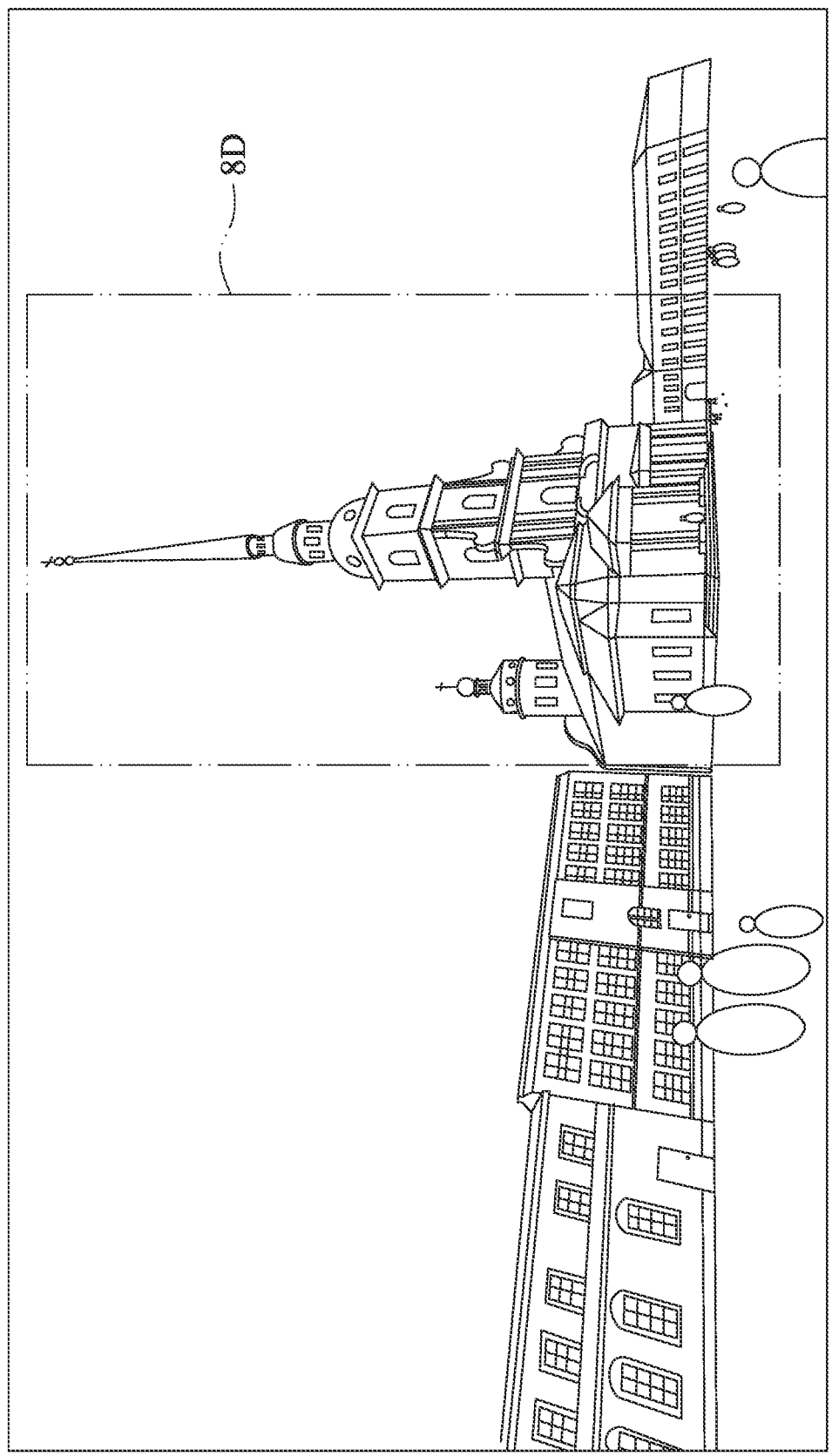
FIG. 8C is a schematic view of an image captured by the ultra-wide angle image capturing apparatuses according to the 8th example in FIG. 8A.

FIG. 8C is a schematic view of the image captured by the ultra-wide angle image capturing apparatuses 821, 822 according to the 8th example in FIG. 8A. In FIG. 8C, comparing with the image captured via the wide angle image capturing apparatuses 824, 825, the image captured via the ultra-wide angle image capturing apparatuses 821, 822 has wider visual angle and wider depth of field, but the image captured via the image captured via the ultra-wide angle image capturing apparatuses 821, 822 also has greater distortion. According to FIG. 8C, the visual angle is 105 degrees to 125 degrees, the equivalent focal length is 11 mm to 14 mm, and the magnification ratio is 0.5 times.

Figure 8D:
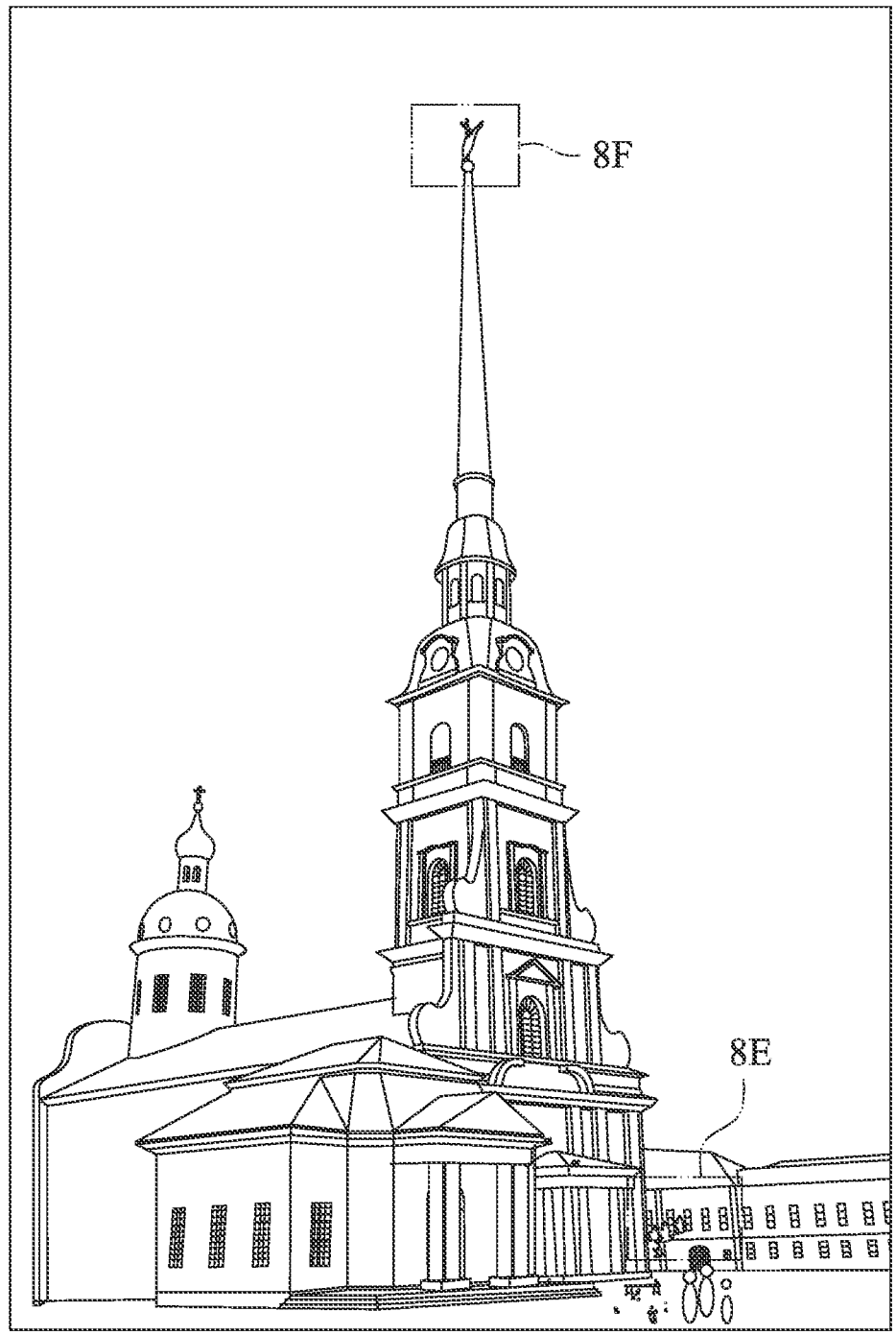
FIG. 8D is a schematic view of an image captured by the wide angle image capturing apparatuses according to the 8th example in FIG. 8A.

FIG. 8D is a schematic view of an image captured by the wide angle image capturing apparatuses 824, 825 according to the 8th example in FIG. 8A. In FIG. 8D, the image of the certain range with the high resolution can be captured via the image capturing apparatuses 824, 825, and the image capturing apparatuses 824, 825 have the function of the high resolution and the low deformation. In particular, FIG. 8D is the partial enlarged view of FIG. 8C. According to FIG. 8D, the visual angle is 70 degrees to 90 degrees, the equivalent focal length is 22 mm to 30 mm, and the magnification ratio is 1 time.

Figure 8E:
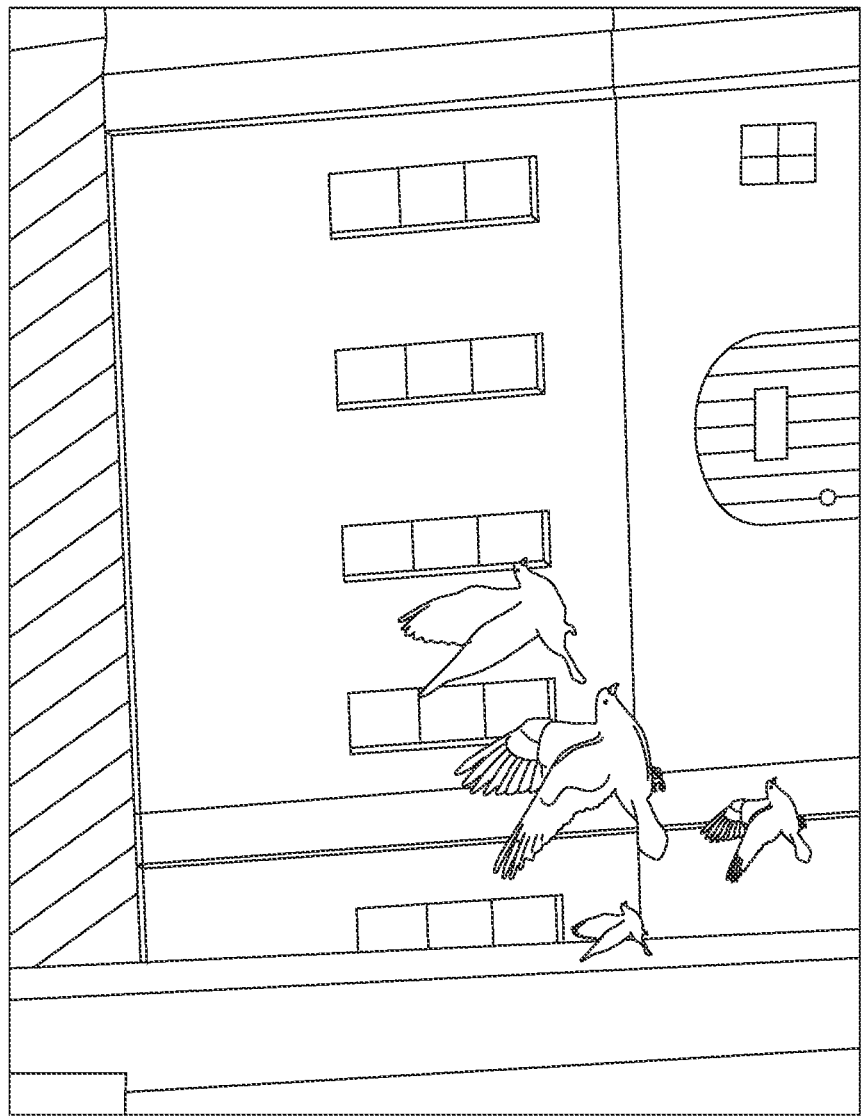
FIG. 8E is a schematic view of an image captured by the telephoto image capturing apparatus according to the 8th example in FIG. 8A.

FIG. 8E is a schematic view of an image captured by the telephoto image capturing apparatus 826 according to the 8th example in FIG. 8A. In FIG. 8E, comparing with the image captured via the wide angle image capturing apparatuses 824, 825, the image captured via the telephoto image capturing apparatus 826 has narrower visual angle and narrower depth of field. Hence, the telephoto image capturing apparatus 826 can be configured to capture the moving targets, that is, the telephoto image capturing apparatus 826 can be driven via an actuator (not shown) of the electronic device 80 to quick and continuous auto focus the moving targets, so as to make the image of the moving targets is not fuzzy owing to defocus. In particular, FIG. 8E is the partial enlarged view of FIG. 8D. According to FIG. 8E, the visual angle is 15 degrees to 30 degrees, the equivalent focal length is 100 mm to 150 mm, and the magnification ratio is 5 times.

Figure 8F:
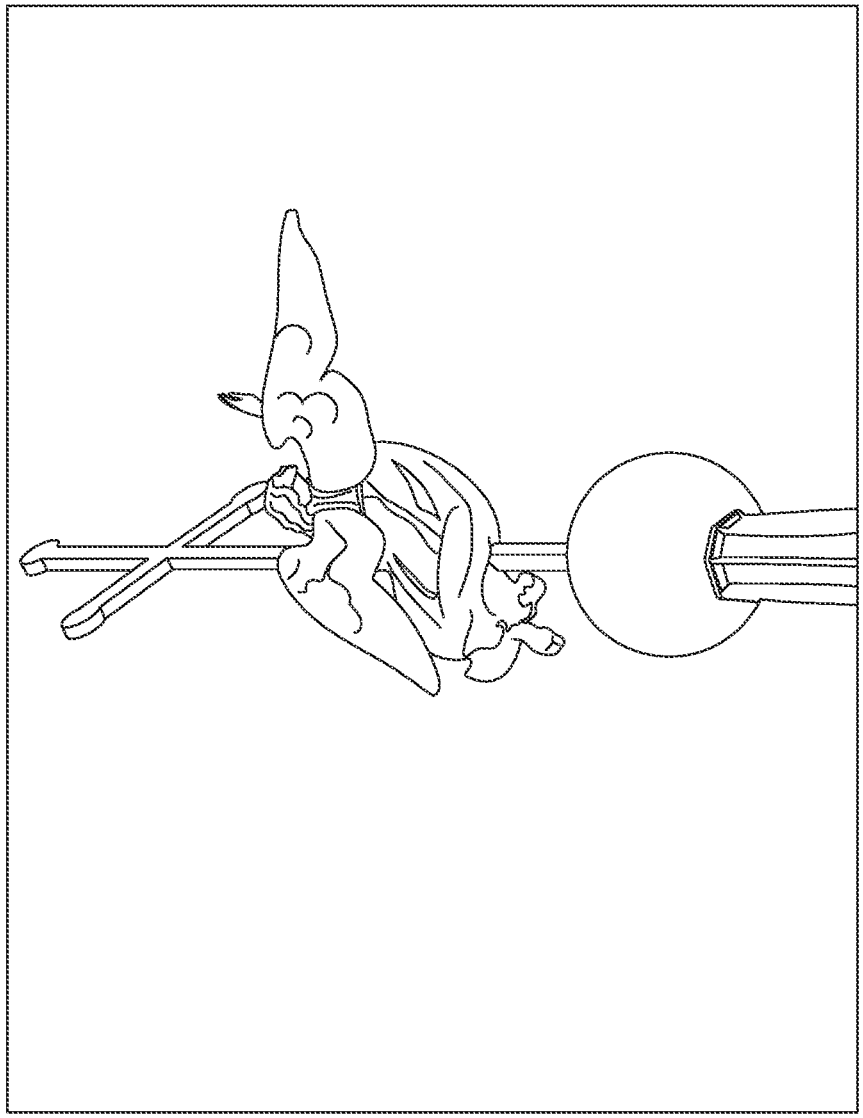
FIG. 8F is a schematic view of an image captured by the ultra-telephoto image capturing apparatus according to the 8th example in FIG. 8A.

FIG. 8F is a schematic view of an image captured by the ultra-telephoto image capturing apparatus 823 according to the 8th example in FIG. 8A. In FIG. 8F, comparing with the image captured via the telephoto image capturing apparatus 826, the image captured via the ultra-telephoto image capturing apparatus 823 has narrower visual angle and narrower depth of field, and the image captured by the ultra-telephoto image capturing apparatus 823 is easily fuzzy due to the shaking. Hence, the actuator is configure to provide the driving force to make the ultra-telephoto image capturing apparatus 823 focus on the targets, and the actuator is also configure to provide the feedback of modifying the shaking to obtain the effect of the optical image stabilization. In particular, FIG. 8F is the partial enlarged view of FIG. 8D. According to FIG. 8F, the visual angle is 4 degrees to 8 degrees, the equivalent focal length is 400 mm to 600 mm, and the magnification ratio is 20 times.

In FIGS. 8C to 8F, the zooming function can be obtained via the electronic device 80, when the scene is captured via the imaging lens assembly with different focal lengths cooperated with the function of image processing.

The foregoing description, for purpose of explanation, has been described with reference to specific examples. It is to be noted that Tables show different data of the different examples; however, the data of the different examples are obtained from experiments. The examples were chosen and described in order to best explain the principles of the disclosure and its practical applications, to thereby enable others skilled in the art to best utilize the disclosure and various examples with various modifications as are suited to the particular use contemplated. The examples depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, having an optical axis, and comprising:
   a plurality of optical elements arranged along the optical axis, wherein the optical elements comprise a light blocking sheet, and the light blocking sheet comprises:
   a through hole surface surrounding the optical axis;
   a first surface connected to and surrounding the through hole surface;
   a second surface connected to and surrounding the through hole surface, and the first surface and the second surface relatively disposed;
   a peripheral surface connected to the first surface and the second surface, and the peripheral surface farther from the optical axis than the through hole surface from the optical axis; and
   a plurality of basin structures arranged in interval and around the optical axis, each of the basin structures caved in from the first surface to the second surface, and each of the basin structures protruding on the second surface;
   wherein on a direction passing through each of the basin structures and vertical to the optical axis, a nearest distance between each of the basin structures and the optical axis is Dn, a farthest distance between each of the basin structures and the optical axis is Df, a distance between the through hole surface and the optical axis is r, a distance between the peripheral surface and the optical axis is R, and the following condition is satisfied:

$0.2 \leq (Df-Dn)/(R-r) \leq 0.98$.

2. The imaging lens assembly of claim 1, wherein on the direction passing through each of the basin structures and vertical to the optical axis, the nearest distance between each of the basin structures and the optical axis is Dn, the farthest distance between each of the basin structures and the optical axis is Df, the distance between the through hole surface and the optical axis is r, the distance between the peripheral surface and the optical axis is R, and the following condition is satisfied:

$0.45 \leq (Df-Dn)/(R-r) \leq 0.95$.

3. The imaging lens assembly of claim 1, wherein on the direction passing through each of the basin structures and vertical to the optical axis, the nearest distance between each of the basin structures and the optical axis is Dn, the farthest distance between each of the basin structures and the optical axis is Df, the distance between the through hole surface and the optical axis is r, the distance between the peripheral surface and the optical axis is R, and the following conditions are satisfied:

$1.01 \leq Dn/r \leq 2$; and $0.5 \leq Df/R \leq 0.99$.

4. The imaging lens assembly of claim 3, wherein on the direction passing through each of the basin structures and vertical to the optical axis, the nearest distance between each of the basin structures and the optical axis is Dn, the distance between the through hole surface and the optical axis is r, and the following condition is satisfied:

$0.03 \text{ mm} \leq Dn-r \leq 2.0 \text{ mm}$.

5. The imaging lens assembly of claim 3, wherein on the direction passing through each of the basin structures and vertical to the optical axis, the farthest distance between each of the basin structures and the optical axis is Df, the distance between the peripheral surface and the optical axis is R, and the following condition is satisfied:

$0.05 \text{ mm} \leq R-Df \leq 3.0 \text{ mm}$.

6. The imaging lens assembly of claim 1, wherein on the direction passing through each of the basin structures and vertical to the optical axis, the distance between the peripheral surface and the optical axis is R, the distance between the through hole surface and the optical axis is r, and the following condition is satisfied:

$0.1 \leq r/R \leq 0.6$.

7. The imaging lens assembly of claim 1, wherein a focal length of the imaging lens assembly is f, on the direction passing through each of the basin structures and vertical to the optical axis, the distance between the through hole surface and the optical axis is r, and the following condition is satisfied:

$0.5 \leq f/2r \leq 6.4$.

8. The imaging lens assembly of claim 7, wherein an aperture stop of the imaging lens assembly is formed by the through hole surface surrounding the optical axis.

9. The imaging lens assembly of claim 1, wherein a minimum spacing angle between two adjacent of the basin structures on the first surface centered on the optical axis is θ, and the following condition is satisfied:

1.5 degrees≤θ<180 degrees.

10. The imaging lens assembly of claim 9, wherein the minimum spacing angle between the two adjacent of the basin structures on the first surface centered on the optical axis is θ, a total of all of the minimum spacing angles is sum(θ), and the following condition is satisfied:

10 degrees≤sum(θ)≤350 degrees.

11. The imaging lens assembly of claim 1, wherein each of the basin structures is caved in from the first surface to the second surface to form a concave surface, an area of the concave surface is A, and the following condition is satisfied:

0.02 mm²≤A≤1.2 mm².

12. The imaging lens assembly of claim 11, wherein the area of the concave surface is A, a ratio between a total of the areas of the concave surfaces of the basin structures and an area of the first surface is ratio(A), and the following condition is satisfied:

0.2%≤ratio(A)≤63.0%.

13. The imaging lens assembly of claim 11, wherein each of the basin structures extends and gradually expands towards a direction away from the optical axis.

14. The imaging lens assembly of claim 1, wherein on the first surface, a depth of each of the basin structures on the optical axis is H, and the following condition is satisfied:

0.005 mm≤H≤0.07 mm.

15. The imaging lens assembly of claim 14, wherein on the first surface, the depth of each of the basin structures on the optical axis is H, and the following condition is satisfied:

0.015 mm≤H≤0.05 mm.

16. The imaging lens assembly of claim 14, wherein a distance between the first surface and the second surface of the light blocking sheet on the optical axis is T, on the first surface, the depth of each of the basin structures on the optical axis is H, and the following condition is satisfied:

0.2≤H/T≤5.0.

17. The imaging lens assembly of claim 1, wherein a number of the basin structures is N, and the following condition is satisfied:

3≤N≤32.

18. The imaging lens assembly of claim 17, wherein the number of the basin structures is N, and the following condition is satisfied:

4≤N≤12.

19. The imaging lens assembly of claim 1, wherein the first surface of the light blocking sheet faces towards one of an object side and an image side of the imaging lens assembly.

20. The imaging lens assembly of claim 1, wherein the light blocking sheet further comprises a plurality of reverse basin structures arranged in interval and around the optical axis, each of the reverse basin structures is caved in from the second surface to the first surface, and each of the reverse basin structures protrudes on the first surface to form a convex surface.

21. The imaging lens assembly of claim 20, wherein the basin structures and the reverse basin structures are arranged in interval on a circumferential direction centered on the optical axis.

22. The imaging lens assembly of claim 20, wherein the reverse basin structures are farther from the optical axis than the basin structures from the optical axis.

23. The imaging lens assembly of claim 1, wherein the light blocking sheet is made of a plastic material, and the light blocking sheet further comprises a coating layer formed on at least one of the first surface and the second surface.

24. An image capturing apparatus, comprising:
the imaging lens assembly of claim 1.

25. An electronic device, comprising:
the image capturing apparatus of claim 24; and
an image sensor corresponding to the image capturing apparatus, and the image sensor disposed on an image surface of the imaging lens assembly.

* * * * *